(12) United States Patent
Phelps et al.

(10) Patent No.: US 8,346,647 B1
(45) Date of Patent: Jan. 1, 2013

(54) SYSTEMS AND METHODS RELATING TO BOND LIQUIDITY

(75) Inventors: Bruce D. Phelps, Darien, CT (US);
Siddhartha Dastidar, New York, NY (US); Ariel Edelstein, Woodmere, NY (US)

(73) Assignee: Barclays Capital Inc., New York, NY (US)

( * ) Notice: Subject to any disclaimer, the term of this patent is extended or adjusted under 35 U.S.C. 154(b) by 0 days.

(21) Appl. No.: 12/896,368

(22) Filed: Oct. 1, 2010

Related U.S. Application Data

(60) Provisional application No. 61/248,205, filed on Oct. 2, 2009.

(51) Int. Cl.
*G06Q 40/00* (2012.01)
(52) U.S. Cl. ............... 705/36 R; 705/35; 705/37
(58) Field of Classification Search ............... 705/35–37
See application file for complete search history.

(56) References Cited

U.S. PATENT DOCUMENTS

| | | | |
|---|---|---|---|
| 5,101,353 A * | 3/1992 | Lupien et al. ............... | 705/37 |
| 6,912,511 B1 * | 6/2005 | Eliezer et al. ............... | 705/37 |
| 7,403,919 B2 * | 7/2008 | Chacko et al. ............... | 705/36 R |
| 7,769,657 B2 * | 8/2010 | Chacko et al. ............... | 705/35 |
| 8,112,341 B2 * | 2/2012 | Chacko et al. ............... | 705/36 R |
| 8,140,416 B2 * | 3/2012 | Borkovec et al. ............... | 705/35 |
| 2003/0120568 A1 * | 6/2003 | Chacko et al. ............... | 705/35 |
| 2004/0078317 A1 * | 4/2004 | Allen et al. ............... | 705/37 |
| 2007/0294162 A1 * | 12/2007 | Borkovec ............... | 705/37 |
| 2008/0313097 A1 * | 12/2008 | Chacko et al. ............... | 705/36 R |

\* cited by examiner

*Primary Examiner* — Narayanswamy Subramanian
(74) *Attorney, Agent, or Firm* — Cowan, Liebowitz & Latman, P.C.; Steven D. Underwood

(57) ABSTRACT

In one aspect, an embodiment comprises a computer system comprising: (a) a computer readable memory that stores price information for a plurality of bonds; and (b) a processor unit that calculates a liquidity cost score for one or more of said plurality of bonds; wherein said liquidity cost score calculation is based on data regarding quoted bid price and quoted ask price if a bond is a quoted bond, wherein said liquidity cost score calculation is based on a regression analysis if a bond is a non-quoted bond, and wherein said processor unit comprises one or more processors.

14 Claims, 97 Drawing Sheets

The LCS Approach to Estimating Bid-Ask Markets from Bid-Ask Indications

| Quote Status | Benchmark Status | Estimation of Bid-Ask Market |
|---|---|---|
| Trader-Quoted | Benchmark Bond (on-the-run and/or high volume) | Bid-Ask Market = Bid-Ask Indication |
| | Non-Benchmark Bond | Bid-Ask Market = AdjF × Bid-Ask Indication |
| Non-Quoted | Benchmark Bond (on-the-run and/or high volume) | Bid-Ask Market = NQAdjF × Estimated Bid-Ask Indication. Estimated bid-ask indications based on data from trader-quoted bonds. Estimation includes a "benchmark dummy" to reflect better liquidity for non-quoted benchmark bonds. |
| | Non-Benchmark Bond | |

Source: Barclays Capital Quantitative Portfolio Strategy Research

FIG. 1: Index Liquidity Cost Score: Barclays Capital US IG and HY Credit Indices (January 2007-June 2009)
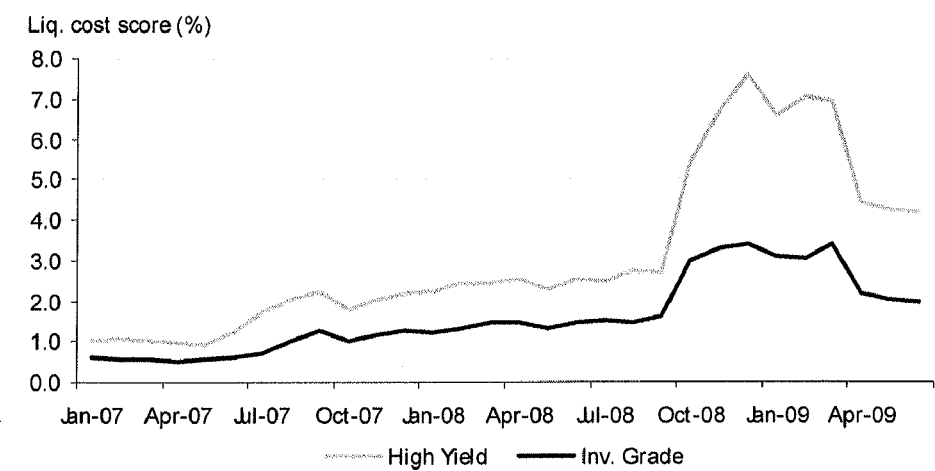

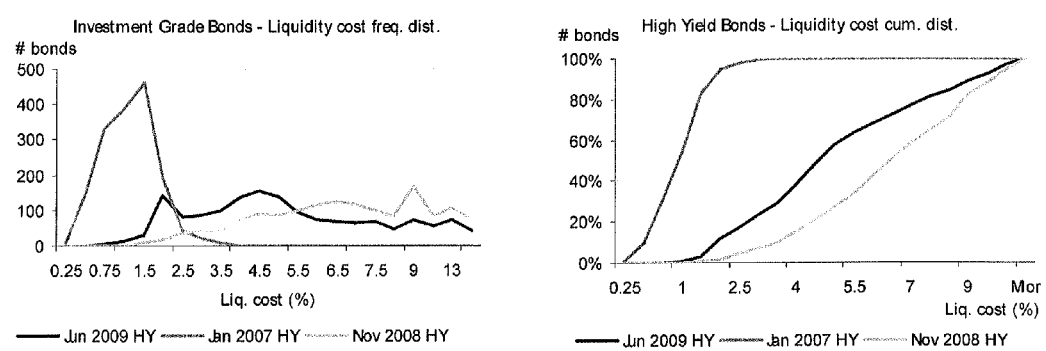
FIG. 2: Distribution of LCS Scores: IG Index(January 2007, November 2008, and June 2009)

FIG. 3: Distribution of LCS Scores by Various Sectors: IG and HY Indices (January 2007-June 2009)
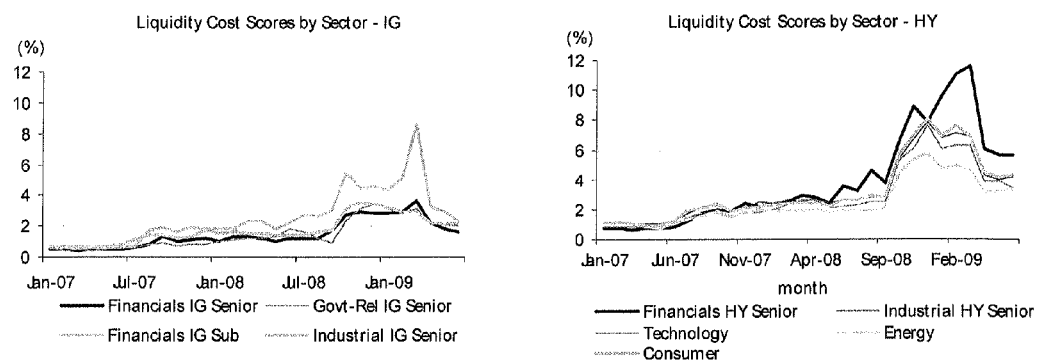
Source: Barclays Capital Quantitative Portfolio Strategy Research FIG. 4: Average LCS by Quintile: IG Index (January 2007-June 2009)
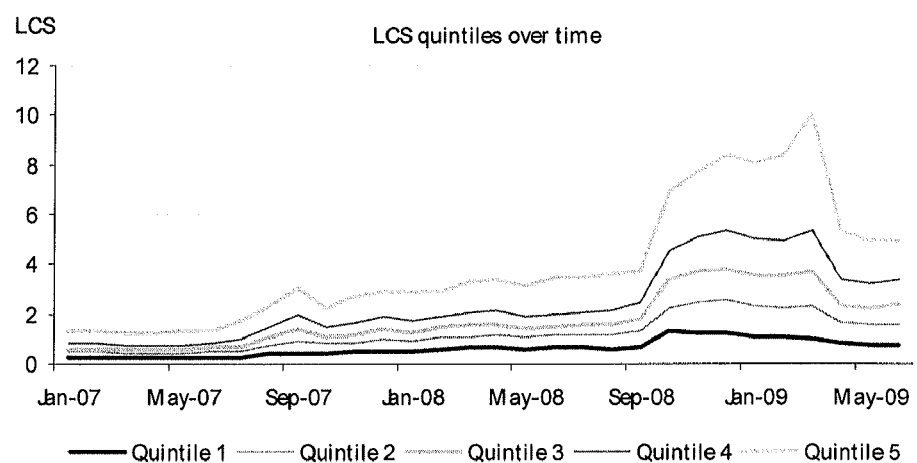
Source: Barclays Capital Quantitative Portfolio Strategy Research FIG. 5: Net LCS Difference and Cumulative Excess Return (versus UST) of Quintile #4 versus Quintile #1 of IG Credit Index (January 2007-June 2009)
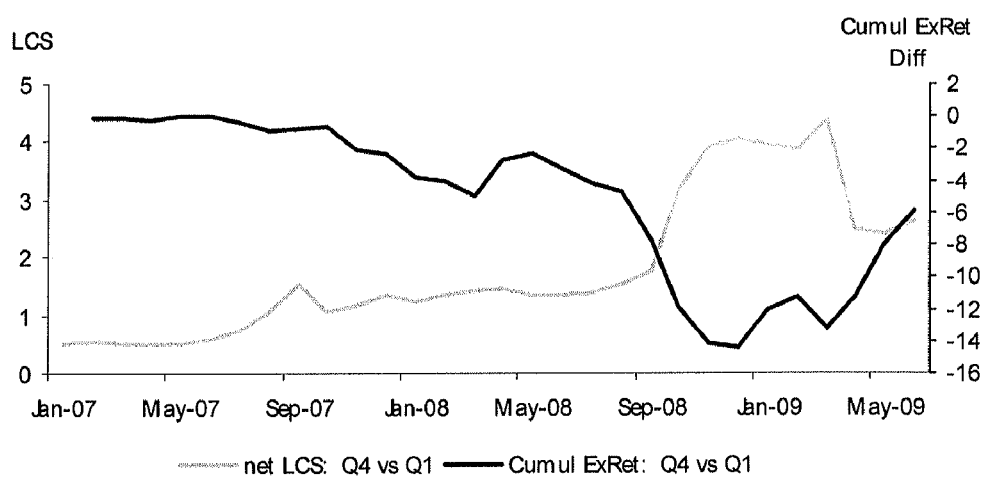
Source: Barclays Capital Quantitative Portfolio Strategy Research

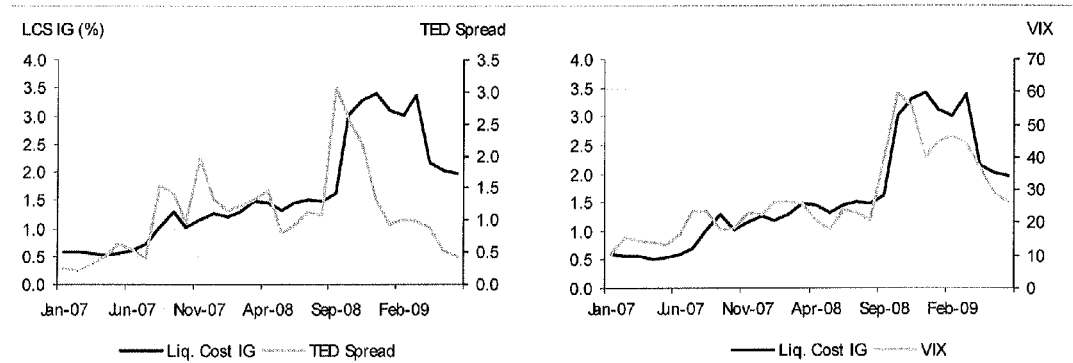
FIG. 6: Relationship between LCS and TED Spread and VIX: IG Index (January 2007-June 2009)
Source: Barclays Capital Quantitative Portfolio Strategy Research FIG. 7: Sample Bloomberg Message Screen Used by Traders to Communicate Bid-Ask Indications
Source: Bloomberg

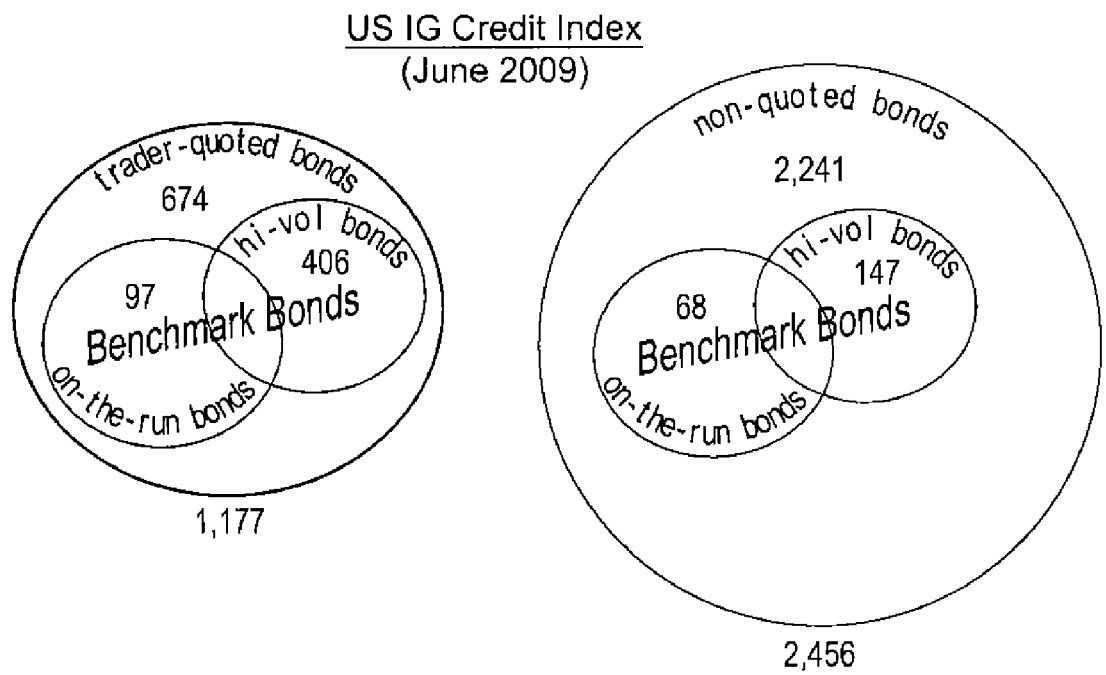
FIG. 8: Composition of the Trader-Quoted Subset of the Barclays Capital US IG Credit Index
Source: Barclays Capital

FIG. 9: The LCS Approach to Estimating Bid-Ask Markets from Bid-Ask Indications

| Quote Status | Benchmark Status | Estimation of Bid-Ask Market |
|---|---|---|
| Trader-Quoted | Benchmark Bond (on-the-run and/or high volume) | Bid-Ask Market = Bid-Ask Indication |
| | Non-Benchmark Bond | Bid-Ask Market = AdjF × Bid-Ask Indication |
| Non-Quoted | Benchmark Bond (on-the-run and/or high volume) | Bid-Ask Market = NQAdjF × Estimated Bid-Ask Indication. Estimated bid-ask indications based on data from trader-quoted bonds. Estimation includes a "benchmark dummy" to reflect better liquidity for non-quoted benchmark bonds. |
| | Non-Benchmark Bond | |

Source: Barclays Capital Quantitative Portfolio Strategy Research

FIG. 10: LCS Results for Quoted LOW Bonds (December 2008)

| Monthly TRACE Vol | cusip | Amt Out | OAS | OASD | DTS | Index P | agelnyrs | rstored | Bid P | Bid Sp | Ask Sp | Bid Ask | original | quoted? | Benchmark? | LCS | implied B-A |
|---|---|---|---|---|---|---|---|---|---|---|---|---|---|---|---|---|---|
| 9,888,000 | 548661CA | 500,000 | 4.73 | 1.4 | 6.4 | 104.00 | 8.6 | 1.5 | 102.89 | 530 | 480 | 50 | 10.0 | YES | NO | 1.059 | 78 |
| 14,664,000 | 548661CM | 550,000 | 4.34 | 3.3 | 14.5 | 100.12 | 1.3 | 3.8 | 99.37 | 440 | 390 | 50 | 5.0 | YES | NO | 2.589 | 77 |
| 12,980,000 | 548661CH | 500,000 | 3.45 | 5.8 | 20.0 | 98.58 | 3.2 | 6.9 | 93.60 | 380 | 330 | 37 | 10.0 | YES | NO | 3.310 | 58 |
| 7,305,000 | 548661CK | 550,000 | 3.50 | 6.3 | 22.2 | 98.74 | 2.2 | 7.9 | | | | | 10.0 | NO | NO | ? | |
| 17,505,000 | 548661CN | 250,000 | 4.14 | 6.7 | 27.6 | 97.36 | 1.3 | 8.8 | | | | | 10.0 | NO | NO | ? | |
| 1,000,000 | 548661AH | 300,000 | 3.85 | 10.3 | 39.6 | 99.34 | 10.9 | 19.2 | | | | | 30.0 | NO | NO | ? | |
| 3,659,000 | 548661AK | 397,740 | 3.98 | 10.7 | 42.6 | 94.25 | 9.9 | 20.3 | | | | | 30.1 | NO | NO | ? | |
| 5,450,000 | 548661CJ | 500,000 | 4.14 | 12.7 | 52.0 | 82.09 | 3.2 | 26.9 | | | | | 30.0 | NO | NO | ? | |
| 10,461,000 | 548661CL | 450,000 | 4.16 | 12.7 | 52.2 | 85.52 | 2.2 | 27.9 | 77.53 | 490 | 465 | 22 | 30.0 | YES | NO | 4.446 | 35 |
| 115,469,000 | 548661CP | 500,000 | 4.22 | 12.4 | 51.7 | 95.25 | 1.3 | 28.8 | 89.10 | 470 | 439 | 30 | 30.0 | YES | YES | 3.762 | 30 |

Source: Barclays Capital Quantitative Portfolio Strategy Research

FIG. 11: Relationship between Quoted Bonds' LCS and Issue Size and Age (June 2009)

| Issue Size | Inv. Grade | | | High Yield | | | Age | Inv. Grade | | | High Yield | | |
|---|---|---|---|---|---|---|---|---|---|---|---|---|---|
| Category | #bonds | Avg. LCS | Std. Dev | #bonds | Avg. LCS | Std. Dev | Category | #bonds | Avg. LCS | Std. Dev | #bonds | Avg. LCS | Std. Dev |
| 1 (small) | 558 | 3.42 | 1.59 | 639 | 5.72 | 3.41 | 1 (young) | 608 | 1.33 | 0.97 | 166 | 3.73 | 2.27 |
| 2 | 1036 | 3.13 | 1.52 | 440 | 4.77 | 3.11 | 2 | 1125 | 1.86 | 1.36 | 437 | 4.58 | 3.23 |
| 3 | 798 | 2.53 | 1.49 | 276 | 4.25 | 2.90 | 3 | 630 | 2.37 | 1.61 | 442 | 4.61 | 3.14 |
| 4 | 335 | 2.12 | 1.43 | 98 | 4.02 | 2.92 | 4 | 520 | 2.36 | 1.38 | 255 | 4.55 | 3.00 |
| 5 | 474 | 1.85 | 1.31 | 64 | 3.64 | 2.64 | 5 | 426 | 1.86 | 1.45 | 149 | 3.66 | 2.60 |
| 6 | 160 | 1.43 | 0.96 | 22 | 3.29 | 2.50 | 6 | 316 | 3.98 | 1.72 | 106 | 6.58 | 3.95 |
| 7 (big) | 272 | 1.13 | 0.93 | 19 | 3.37 | 2.63 | 7 (old) | 8 | 3.07 | 0.64 | 3 | 11.31 | 4.70 |

Source: Barclays Capital Quantitative Portfolio Strategy Research

FIG. 12: Relationship between Quoted Bonds' LCS and OAS and DTS (June 2009)

| OAS | Inv. Grade | | | High Yield | | |
|---|---|---|---|---|---|---|
| Category | #bonds | Avg. LCS | Std. Dev | #bonds | Avg. LCS | Std. Dev |
| 1 (low) | 519 | 1.33 | 0.72 | 0 | | |
| 2 | 777 | 1.77 | 1.08 | 1 | 1.46 | 0.00 |
| 3 | 1293 | 2.01 | 1.37 | 5 | 2.55 | 1.89 |
| 4 | 843 | 2.48 | 1.83 | 455 | 3.01 | 1.54 |
| 5 | 155 | 4.52 | 2.19 | 623 | 4.17 | 2.21 |
| 6 (high) | 46 | 5.15 | 1.86 | 474 | 7.30 | 4.27 |

| DTS | Inv. Grade | | | High Yield | | |
|---|---|---|---|---|---|---|
| Category | #bonds | Avg. LCS | Std. Dev | #bonds | Avg. LCS | Std. Dev |
| 1 (low) | 508 | 1.12 | 0.54 | 11 | 1.45 | 0.49 |
| 2 | 749 | 1.35 | 0.80 | 29 | 2.17 | 0.62 |
| 3 | 1138 | 1.97 | 1.09 | 160 | 2.69 | 1.16 |
| 4 | 788 | 2.82 | 1.65 | 510 | 3.33 | 1.53 |
| 5 | 378 | 3.62 | 2.03 | 400 | 4.31 | 1.93 |
| 6 (high) | 72 | 5.79 | 2.27 | 448 | 8.19 | 4.26 |

Source: Barclays Capital Quantitative Portfolio Strategy Research

FIG. 13: Relationship between LCS and TRACE Trading Volume: IG and HY Sectors (June 2009)
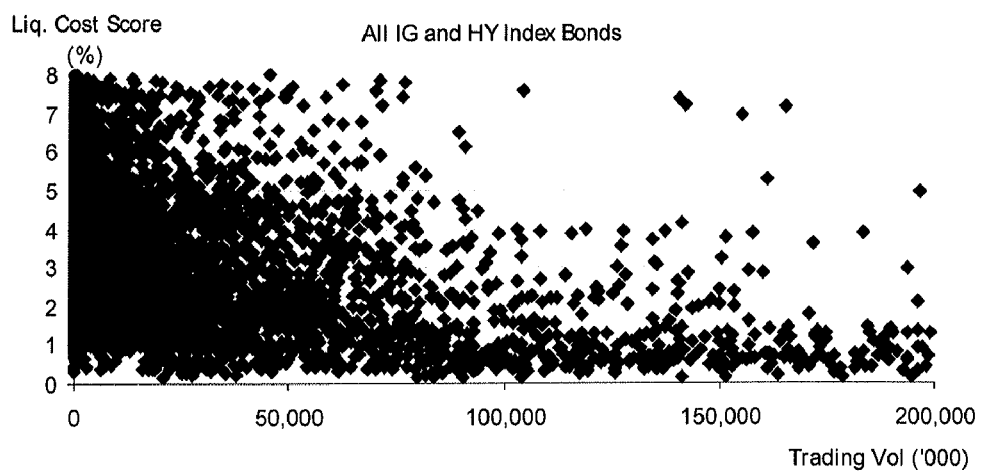
Source: Barclays Capital Quantitative Portfolio Strategy Research

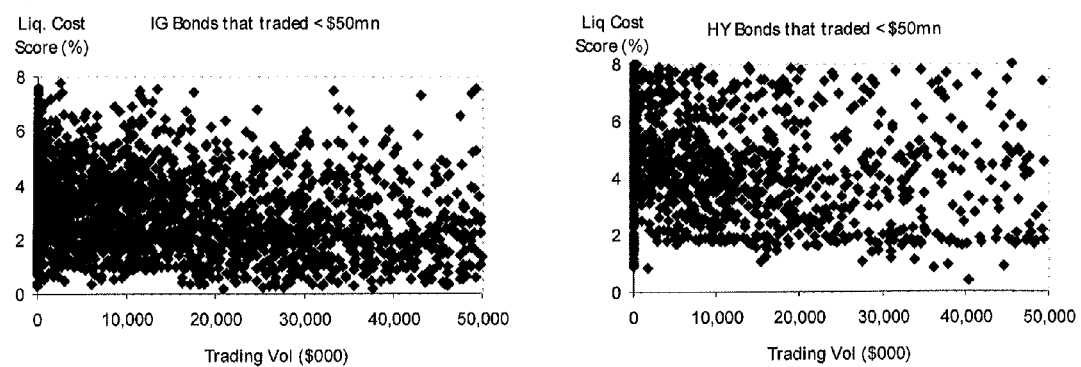
FIG. 14: Relationship between TRACE Volume and LCS Excluding the Most Actively Traded Bonds: IG and HY Sectors
Source: Barclays Capital Quantitative Portfolio Strategy Research FIG. 15: Regression of LCS on Bond Attributes: IG and HY Bonds
(January 2007-June 2009)

| | Dependent Variable—LCS in % | |
|---|---|---|
| | Sample Period - Jan 2007-June 2009 | |
| Explanatory Variables | Coefficient | t-Stat |
| Intercept | 0.2470 | 5.8 |
| Age (years) | 0.0490 | 16.9 |
| Time to Redemption (years) | -0.0539 | -55.4 |
| Issue Size ($bn) | -0.2575 | -20.3 |
| Monthly Trading Vol ($mn) | -0.0016 | -18.4 |
| DTS (year %) | 0.1232 | 182.2 |
| | | |
| Monthly Dummies? | Yes | |
| Number of Observations | 25379 | |
| Adj- R Squared | 0.69 | |

Source: Barclays Capital Quantitative Portfolio Strategy Research

FIG. 16: Comparison of Quoted and Non-Quoted Universes (June 2009)

Average characteristics of bonds with and w/o trader quotes for Jun. 2009

| | Quoted? | No. of Bonds | Age | Yrs to Redeem | DTS | Volume ($) | Size ($000) | Price | No Trades during Month | With Trades |
|---|---|---|---|---|---|---|---|---|---|---|
| HY | No | 958 | 4.70 | 7.00 | 46.02 | 14,824,653 | 412,779 | 78.47 | 250 | 708 |
| | Yes | 604 | 3.76 | 7.08 | 40.63 | 22,753,755 | 511,527 | 82.80 | 129 | 475 |
| IG | No | 2456 | 4.94 | 9.78 | 16.47 | 22,383,059 | 635,897 | 100.01 | 621 | 1835 |
| | Yes | 1177 | 3.03 | 11.47 | 20.37 | 91,630,141 | 1,025,035 | 98.68 | 51 | 1126 |

Source: Barclays Capital Quantitative Portfolio Strategy Research

FIG. 17: Estimated LCS for the Five Non-Quoted LOW Bonds (December 2008)

| Monthly TRACE Vol | cusip | Amt Out | OAS | OASD | DTS | Index P | agcinyrs | yrstomat | Bid P | Bid Sp | Ask Sp | Bid Ask | original | quoted? | Benchmark? | LCS | implied B-A |
|---|---|---|---|---|---|---|---|---|---|---|---|---|---|---|---|---|
| 9,888,000 | 548661CA | 500,000 | 4.73 | 1.4 | 6.4 | 104.00 | 8.6 | 1.5 | 102.89 | 530 | 480 | 50 | 10.0 | YES | NO | 1.059 | 78 |
| 14,664,000 | 548661CM | 550,000 | 4.34 | 3.3 | 14.5 | 100.12 | 1.3 | 3.8 | 99.37 | 440 | 390 | 50 | 5.0 | YES | NO | 2.589 | 77 |
| 12,980,000 | 548661CH | 500,000 | 3.45 | 5.8 | 20.0 | 98.58 | 3.2 | 6.9 | 93.60 | 380 | 330 | 37 | 10.0 | YES | NO | 3.310 | 58 |
| 7,305,000 | 548661CK | 550,000 | 3.50 | 6.3 | 22.2 | 98.74 | 2.2 | 7.9 | | | | | 10.0 | NO | NO | 4.670 | 74 |
| 17,505,000 | 548661CN | 250,000 | 4.14 | 6.7 | 27.6 | 97.36 | 1.3 | 8.8 | | | | | 10.0 | NO | NO | 3.884 | 58 |
| 1,000,000 | 548661AH | 300,000 | 3.85 | 10.3 | 39.6 | 99.34 | 10.9 | 19.2 | | | | | 30.0 | NO | NO | 6.800 | 66 |
| 3,659,000 | 548661AK | 397,740 | 3.98 | 10.7 | 42.6 | 94.25 | 9.9 | 20.3 | | | | | 30.1 | NO | NO | 7.150 | 67 |
| 5,450,000 | 548661CJ | 500,000 | 4.14 | 12.7 | 52.0 | 82.09 | 3.2 | 26.9 | | | | | 30.0 | NO | NO | 5.990 | 47 |
| 10,461,000 | 548661CL | 450,000 | 4.16 | 12.7 | 52.2 | 85.52 | 2.2 | 27.9 | 77.53 | 490 | 465 | 22 | 30.0 | YES | NO | 4.446 | 35 |
| 115,469,000 | 548661CP | 500,000 | 4.22 | 12.4 | 51.7 | 95.25 | 1.3 | 28.8 | 89.10 | 470 | 439 | 30 | 30.0 | YES | YES | 3.762 | 30 |

Source: Barclays Capital Quantitative Portfolio Strategy Research

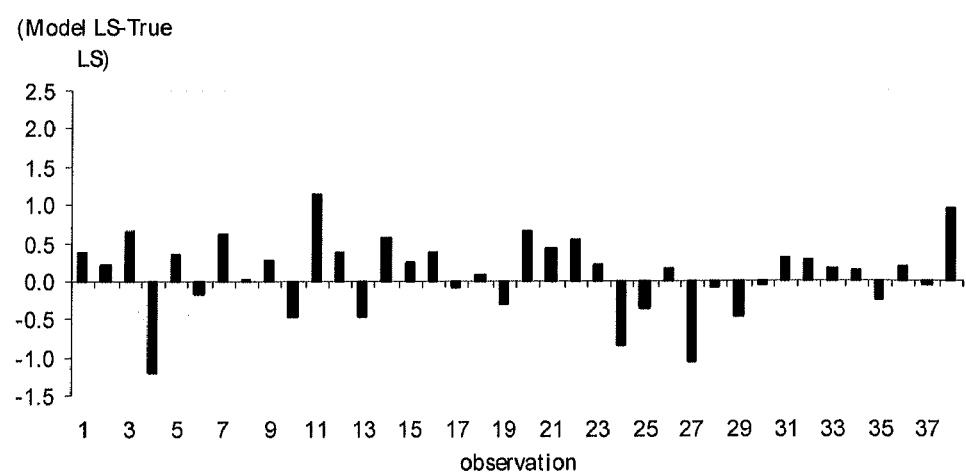
FIG. 18: Out-of-Sample Test: IG Sector (November 2008)
Source: Barclays Capital Quantitative Portfolio Strategy Research

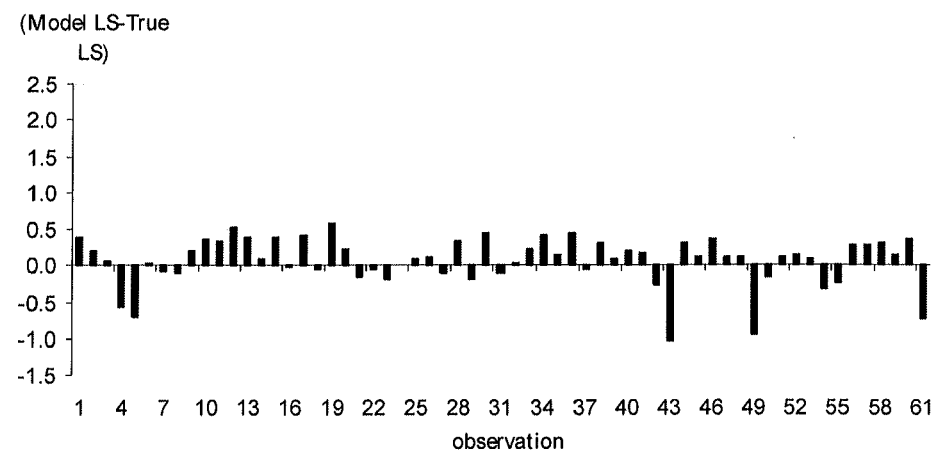
FIG. 19: Out-of-Sample Test: IG Sector (June 2009)

FIG. 20: Out-of-Sample Test; Comparing LCS for LOW's Bonds; December 2008 and June 2009

December 08

| Monthly TRACE Vol. | cusip | Amt Out | OAS | OASD | DTS | Index P | agenyrs | restored | Bid P | Bid Sp | Ask Sp | Bid Ask | or.amt | quoted? | Benchmark? | LCS | implied B-A |
|---|---|---|---|---|---|---|---|---|---|---|---|---|---|---|---|---|---|
| 9,888,000 | 548661CA | 500,000 | 4.75 | 1.4 | 6.4 | 104.00 | 8.6 | 1.5 | 102.89 | 530 | 480 | 50 | 10.0 | YES | NO | 1.059 | 78 |
| 14,664,000 | 548661CM | 550,000 | 4.34 | 3.3 | 14.5 | 100.12 | 1.3 | 3.8 | 99.37 | 440 | 390 | 50 | 5.0 | YES | NO | 2.589 | 77 |
| 12,980,000 | 548661CH | 500,000 | 3.45 | 5.8 | 20.9 | 98.58 | 3.2 | 6.9 | 93.60 | 380 | 330 | 37 | 10.0 | YES | NO | 3.310 | 58 |
| 7,305,000 | 548661CK | 550,000 | 3.50 | 6.3 | 22.2 | 98.74 | 2.2 | 7.9 | | | | | 10.0 | NO | NO | 4.670 | 74 |
| 17,505,000 | 548661CN | 250,000 | 4.14 | 6.7 | 27.6 | 97.36 | 1.3 | 8.8 | | | | | 10.0 | NO | NO | 3.884 | 58 |
| 1,000,000 | 548661AH | 300,000 | 3.85 | 10.3 | 39.6 | 99.34 | 10.9 | 19.2 | | | | | 30.0 | NO | NO | 6.800 | 66 |
| 3,659,000 | 548661AK | 397,740 | 3.98 | 10.7 | 42.6 | 94.25 | 9.9 | 20.3 | | | | | 30.1 | NO | NO | 7.150 | 67 |
| 5,450,000 | 548661CJ | 500,000 | 4.14 | 12.7 | 52.0 | 82.09 | 3.2 | 26.9 | | | | | 30.0 | NO | NO | 5.990 | 47 |
| 10,461,000 | 548661CI | 450,000 | 4.16 | 12.7 | 52.2 | 85.52 | 2.2 | 27.9 | 77.53 | 490 | 465 | 22 | 30.0 | YES | NO | 4.446 | 35 |
| 115,469,000 | 548661CP | 500,000 | 4.22 | 12.4 | 51.7 | 95.25 | 1.3 | 28.8 | 89.10 | 470 | 439 | 30 | 30.0 | YES | YES | 3.762 | 30 |

June 09

| Monthly TRACE Vol. | cusip | Amt Out | OAS | OASD | DTS | Index P | agenyrs | restored | Bid P | Bid Sp | Ask Sp | Bid Ask | or.amt | quoted? | Benchmark? | LCS | implied B-A |
|---|---|---|---|---|---|---|---|---|---|---|---|---|---|---|---|---|---|
| | 548661CA | | | | | out index | | | | | | | | | | | |
| 13,880,000 | 548661CM | 550,000 | 1.68 | 2.9 | 4.9 | 106.57 | 1.8 | 3.3 | 104.74 | 1 | 130 | 20 | 5.0 | YES | NO | 0.988 | 34 |
| 24,610,000 | 548661CH | 500,000 | 1.29 | 5.4 | 7.0 | 104.05 | 3.7 | 6.4 | | | | | 10.0 | NO | NO | 2.390 | 44 |
| 19,260,000 | 548661CK | 550,000 | 1.46 | 6.0 | 8.8 | 104.12 | 2.7 | 7.4 | | | | | 10.0 | NO | NO | 2.558 | 42 |
| 6,800,000 | 548661CN | 250,000 | 1.35 | 6.5 | 8.8 | 108.55 | 1.8 | 8.3 | 108.4303 | 1 | 120 | 16 | 10.0 | YES | NO | 1.236 | 27 |
| 220,000 | 548661AH | 300,000 | 1.86 | 10.5 | 19.5 | 108.38 | 11.4 | 18.7 | | | | | 30.0 | NO | NO | 4.363 | 42 |
| 10,999,000 | 548661AK | 397,740 | 1.90 | 11.0 | 20.8 | 103.79 | 10.4 | 19.8 | | | | | 30.1 | NO | NO | 4.418 | 40 |
| 3,977,000 | 548661CJ | 500,000 | 1.78 | 13.1 | 23.4 | 92.62 | 3.7 | 26.4 | | | | | 30.0 | NO | NO | 4.242 | 32 |
| 13,100,000 | 548661CL | 450,000 | 1.79 | 13.1 | 23.5 | 96.49 | 2.7 | 27.4 | | | | | 30.0 | NO | NO | 4.139 | 31 |
| 17,686,000 | 548661CP | 500,000 | 1.85 | 12.8 | 23.7 | 107.15 | 1.8 | 28.3 | 107.26 | 1 | 165 | 20 | 30.0 | YES | YES | 2.307 | 20 |

Source: Barclays Capital Quantitative Portfolio Strategy Research

FIG. 21: Comparison of LCS and 1-2-3 Ranks by Trader (June 2009)

| Trader | # of Bonds | Average LCS | Average LCS by Ranking Category | | |
|---|---|---|---|---|---|
| | | | Rank=1 | Rank=2 | Rank=3 |
| Trader #1 | 6 | 1.314 | 0.717 | 1.493 | 1.343 |
| Trader #2 | 42 | 1.687 | 1.247 | 0.987 | 3.295 |
| Trader #3 | 26 | 1.159 | 0.634 | 0.605 | 1.389 |
| Trader #4 | 11 | 1.876 | | 0.927 | 2.702 |
| Trader #5 | 32 | 1.545 | 1.422 | 1.307 | 1.734 |
| Trader #6 | 36 | 1.320 | 0.803 | 1.209 | 1.448 |
| Trader #7 | 41 | 1.309 | 0.800 | 1.232 | 1.407 |
| Trader #8 | 4 | 4.274 | | 4.773 | 3.775 |
| Trader #9 | 3 | 2.203 | | | 4.000 |

Source: Barclays Capital Quantitative Portfolio Strategy Research

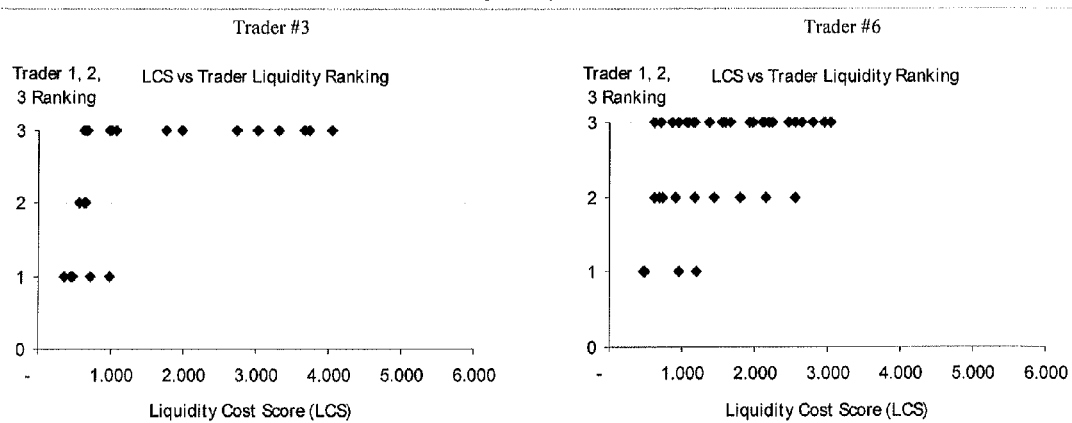
FIG. 22: Distribution of LCS across Different Rank Categories by Trader (June 2009)
Source: Barclays Capital Quantitative Portfolio Strategy Research FIG. 23: Comparison of LCS and 1-2-3 Ranks—
Trader-Quoted versus Non-Quoted, i.e., LCS Modeled (June 2009)

|  | No. of Bonds | Average LCS | | |
| --- | --- | --- | --- | --- |
|  |  | Rank=1 | Rank=2 | Rank=3 |
| Not Quoted | 62 | 1.652 | 1.695 | 1.757 |
| Quoted | 138 | 0.825 | 1.213 | 1.866 |

Source: Barclays Capital Quantitative Portfolio Strategy Research

FIG. 24: LCS Persistence: LCS Summary Statistics of LCS-Sorted Portfolios (in June 2008) over Time

| June 08 LS Category | Jun-07 | Jun-08 | Nov-08 | Jun-09 |
|---|---|---|---|---|
| 1 (Lowest LCS Bucket) | 0.576 | 1.082 | 2.525 | 2.049 |
| | *0.244* | *0.196* | *1.502* | *0.955* |
| 2 | 0.790 | 1.490 | 3.768 | 2.926 |
| | *0.332* | *0.088* | *1.854* | *1.255* |
| 3 | 0.918 | 1.770 | 4.654 | 3.655 |
| | *0.374* | *0.106* | *2.019* | *1.603* |
| 4 | 1.013 | 2.207 | 5.383 | 4.208 |
| | *0.332* | *0.150* | *1.843* | *1.631* |
| 5 | 1.199 | 2.797 | 6.125 | 5.088 |
| | *0.383* | *0.214* | *2.040* | *1.744* |
| 6 (Highest LCS Bucket) | 1.464 | 4.819 | 7.198 | 6.702 |
| | *0.618* | *2.170* | *3.355* | *4.144* |

Source: Barclays Capital Quantitative Portfolio Strategy Research

FIG. 25: Transition Matrices for LCS-Sorted Portfolios Formed in June 2008 across Various Horizons

|  |  |  | Jun-07 | | | | | |
|---|---|---|---|---|---|---|---|---|
|  |  |  | 1 | 2 | 3 | 4 | 5 | 6 |
| Transition from June 2008 to One Year earlier (June 2007) | Jun-08 | 1 | 50.3% | 31.9% | 11.9% | 3.1% | 1.4% | 1.4% |
| | | 2 | 20.0% | 28.6% | 24.4% | 10.3% | 7.2% | 6.4% |
| | | 3 | 11.1% | 17.5% | 26.1% | 24.2% | 8.9% | 9.2% |
| | | 4 | 6.1% | 13.1% | 15.9% | 26.7% | 27.0% | 8.1% |
| | | 5 | 5.8% | 5.0% | 9.2% | 16.1% | 38.9% | 21.9% |
| | | 6 | 5.3% | 2.5% | 9.4% | 15.3% | 14.2% | 50.3% |

|  |  |  | Nov-08 | | | | | |
|---|---|---|---|---|---|---|---|---|
|  |  |  | 1 | 2 | 3 | 4 | 5 | 6 |
| Transition from June 2008 to Six Months Later (November 2008) | Jun-08 | 1 | 60.6% | 22.8% | 7.5% | 6.1% | 1.9% | 1.1% |
| | | 2 | 18.9% | 40.6% | 20.8% | 10.8% | 3.6% | 5.3% |
| | | 3 | 8.9% | 21.7% | 31.7% | 15.6% | 12.8% | 9.4% |
| | | 4 | 4.2% | 8.4% | 22.6% | 28.7% | 23.7% | 12.5% |
| | | 5 | 2.5% | 4.4% | 11.9% | 25.3% | 33.6% | 22.2% |
| | | 6 | 5.0% | 2.2% | 5.6% | 13.3% | 24.4% | 49.4% |

|  |  |  | Jun-09 | | | | | |
|---|---|---|---|---|---|---|---|---|
|  |  |  | 1 | 2 | 3 | 4 | 5 | 6 |
| Transition from June 2008 to One Year Later (June 2009) | Jun-08 | 1 | 54.2% | 31.1% | 9.7% | 3.1% | 1.4% | 0.6% |
| | | 2 | 17.2% | 38.9% | 21.4% | 9.7% | 3.9% | 2.8% |
| | | 3 | 11.7% | 12.2% | 30.8% | 18.3% | 13.9% | 6.9% |
| | | 4 | 7.0% | 7.8% | 15.3% | 30.6% | 22.6% | 10.6% |
| | | 5 | 2.2% | 2.5% | 8.9% | 16.7% | 38.3% | 25.3% |
| | | 6 | 2.2% | 3.3% | 7.8% | 14.4% | 14.7% | 51.4% |

Source: Barclays Capital Quantitative Portfolio Strategy Research

FIG. 26: Bond-Level LCS—Average and Standard Deviation (January 2007-June 2009)

| | LCS | | | |
|---|---|---|---|---|
| | Average | Volatility | Skewness | Kurtosis |
| Cross-sectional Mean | 2.358 | 1.540 | 0.926 | 0.607 |
| Cross-sectional Std.dev | 0.996 | 0.854 | 0.572 | 2.365 |

Source: Barclays Capital Quantitative Portfolio Strategy Research

FIG. 27: Bond-Level LCS—Average and Standard Deviation (January 2007-June 2009)

| Vol(LCS)/Vol(ExRtn) | Correl(LCS(t),ExRtn(t+1)) | Correl(LCS(t)-LCS(t-1),ExRtn(t)) |
|---|---|---|
| 0.476 | 0.297 | -0.458 |
| 0.255 | 0.148 | 0.248 |

Source: Barclays Capital Quantitative Portfolio Strategy Research

FIG. 28: Bond-Level LCS Data in POINT

Source: Barclays Capital Quantitative Portfolio Strategy Research

FIG. 29: Monthly Estimated TEV versus IG Index—Portfolios A, B, and C
(January 2007-June 2009)
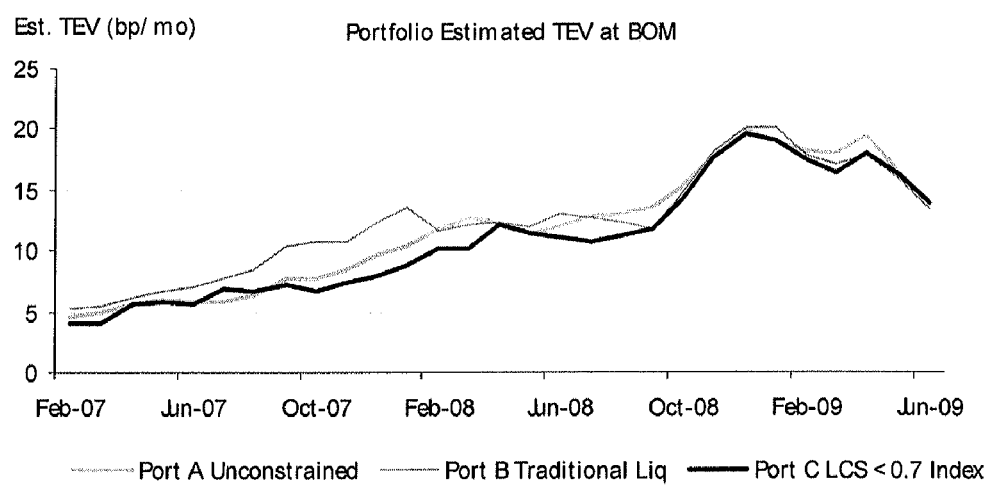
Source: Barclays Capital Quantitative Portfolio Strategy Research FIG. 30: Portfolio and Index-Level LCS (January 2007-June 2009)
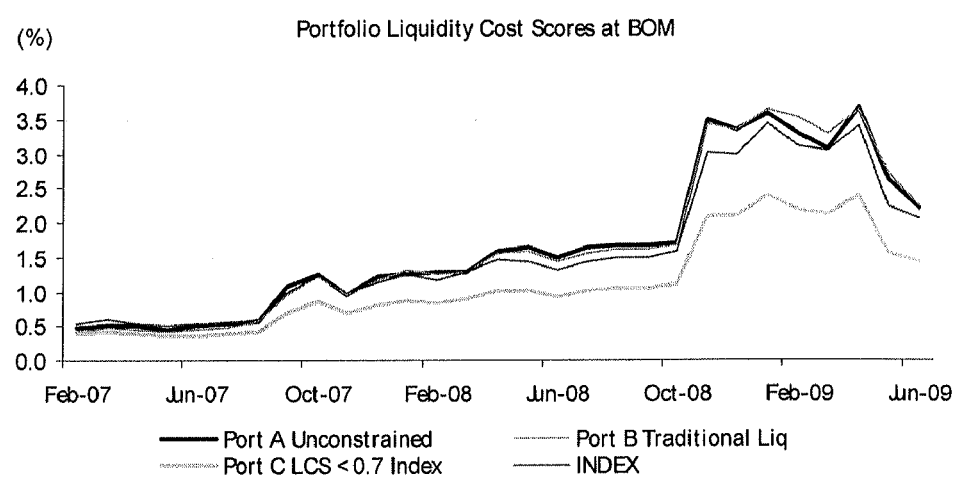
Source: Barclays Capital Quantitative Portfolio Strategy Research FIG. 31: TEV Details - Portfolio A,B, and C (April 2008)
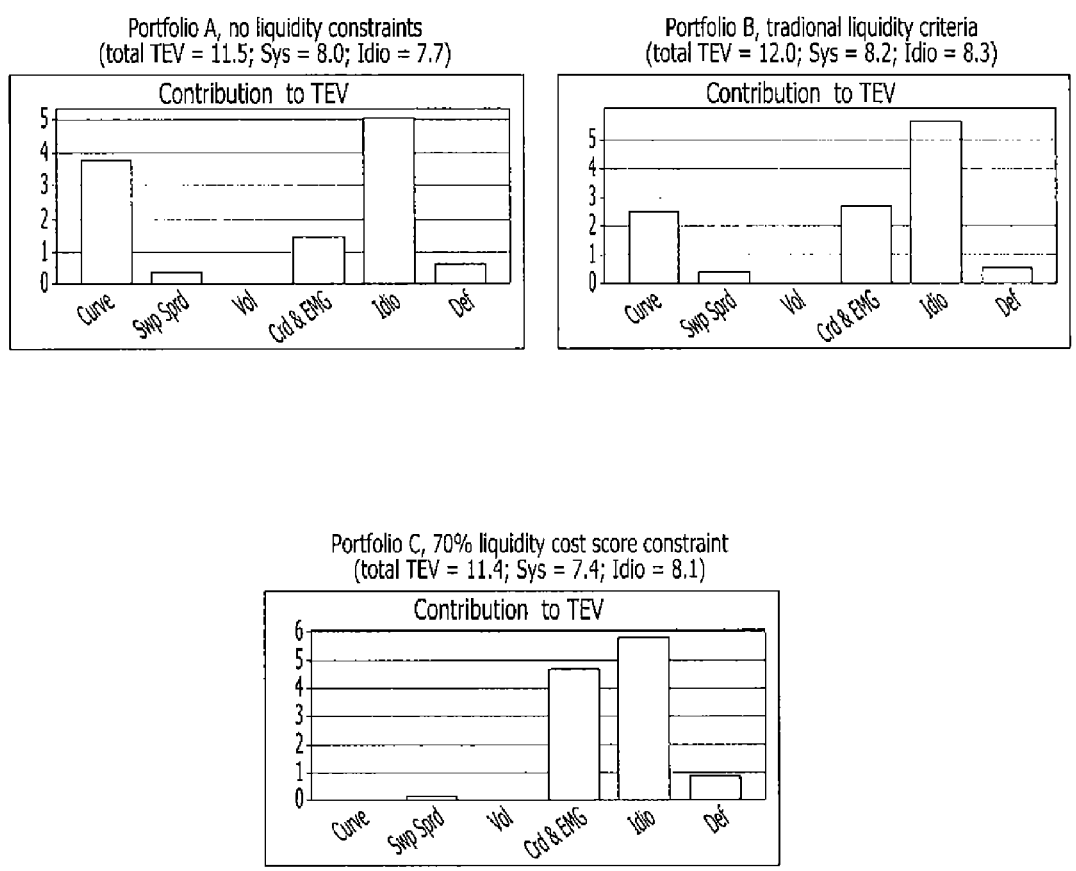
Source: Barclays Capital FIG. 32: Cumulative Excess Return Performance versus Index—Portfolios A, B, and C (February 2007-June 2009)
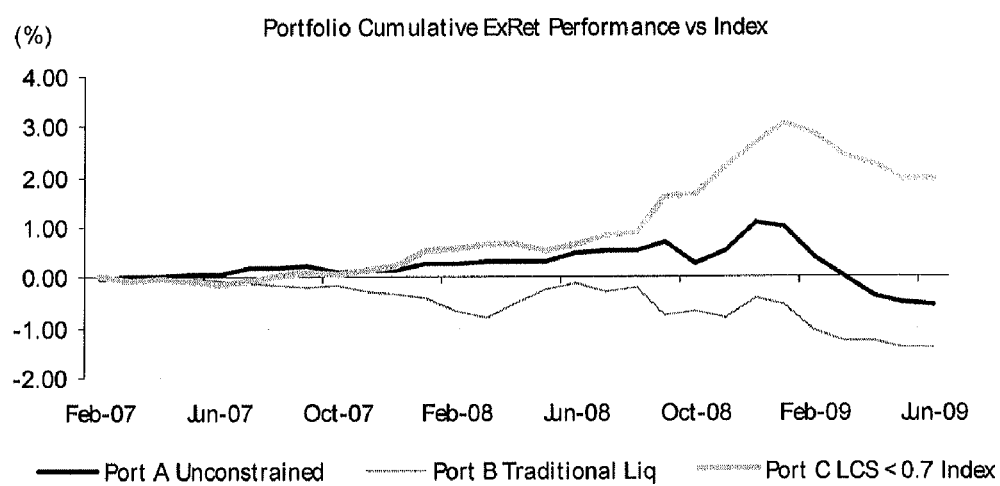

FIG. 33: Cumulative Excess Return Difference—Portfolio C (70% LCS) versus Portfolio B (Issue Size and Age); LCS of IG Index; February 2007-June 2009
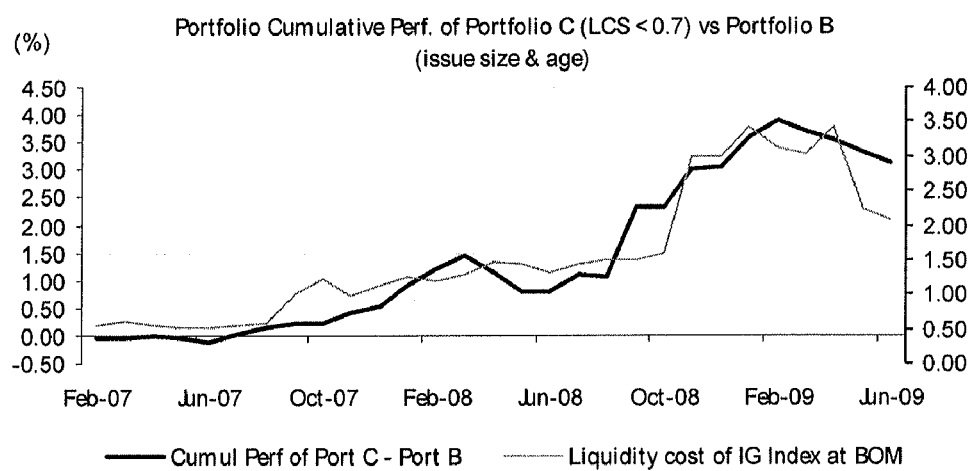
Source: Barclays Capital Quantitative Portfolio Strategy Research FIG. 34: Turnover of Portfolios A, B, and C (February 2007-June 2009)
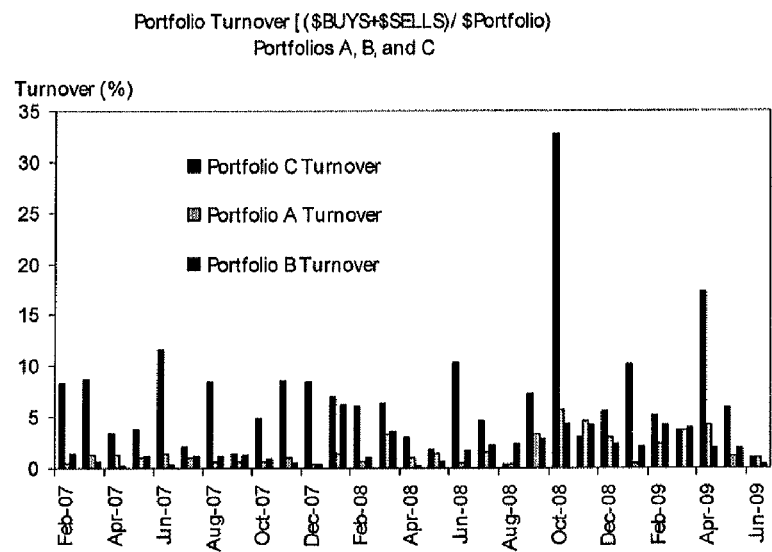
Source: Barclays Capital Quantitative Portfolio Strategy Research

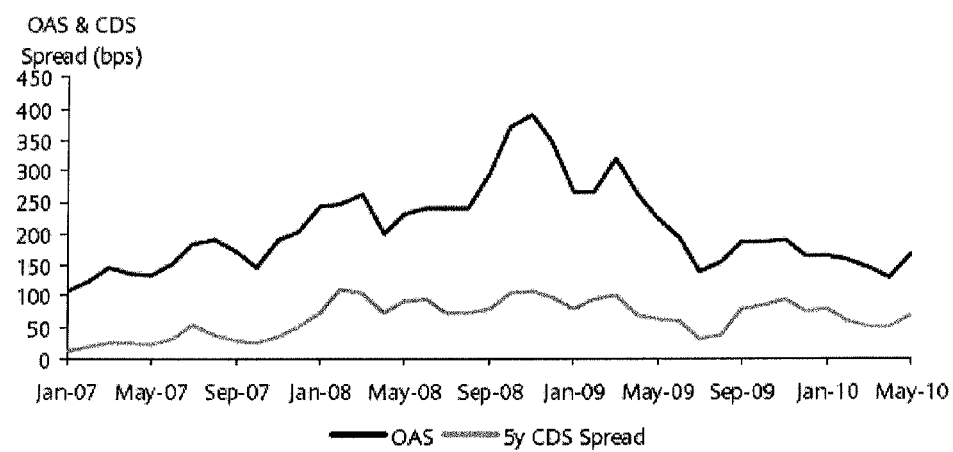
Fig. 35: OAS and CDS Spread for KFT 6.5 of 11/31

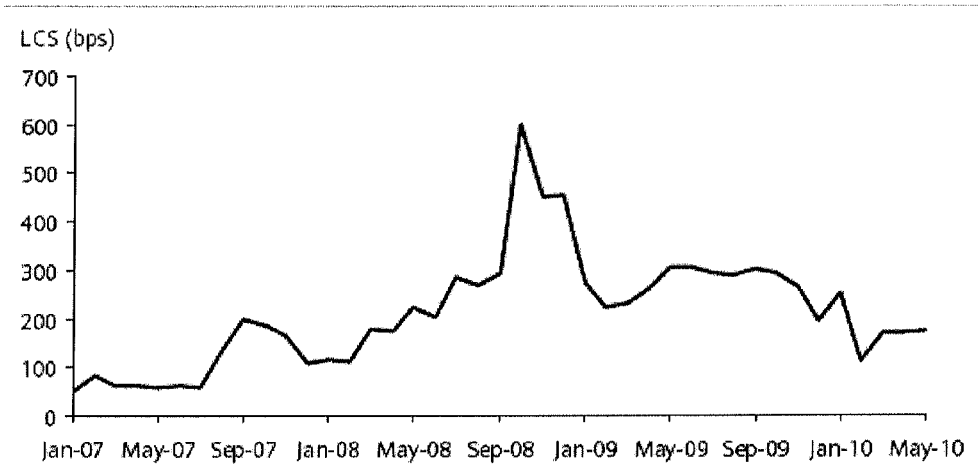
Fig. 36: LCS for KFT 6.5 of 11/31
Source: Barclays Capital

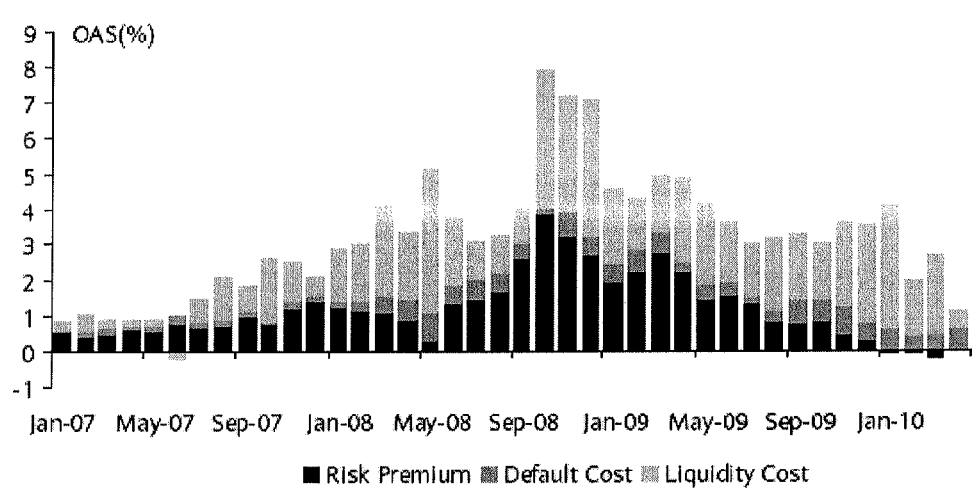
Fig. 37 : Spread Decomposition for KFT 6.5s of 11/31: Risk Premium, Expected Default Losses, and Liquidity Costs
Source: Barclays Capital

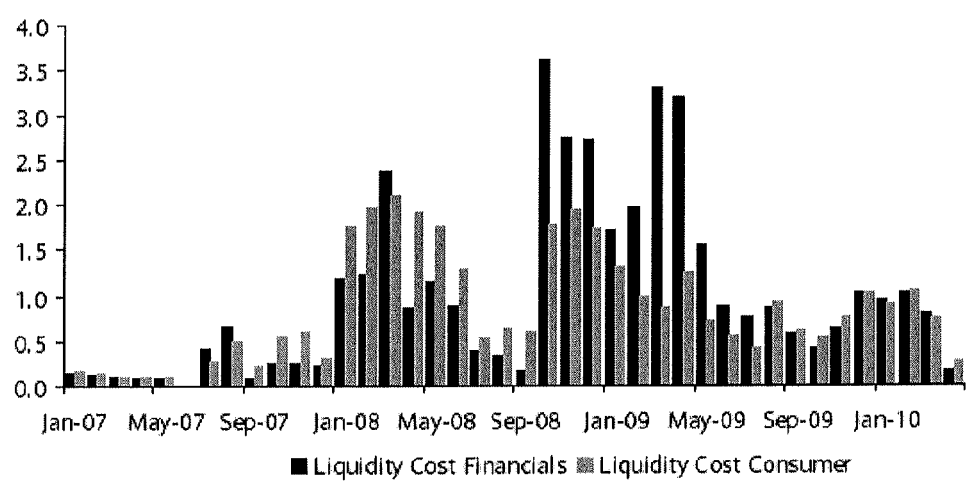
Fig. 38: Liquidity Contribution – Consumer and Financial Sectors
Source: Barclays Capital

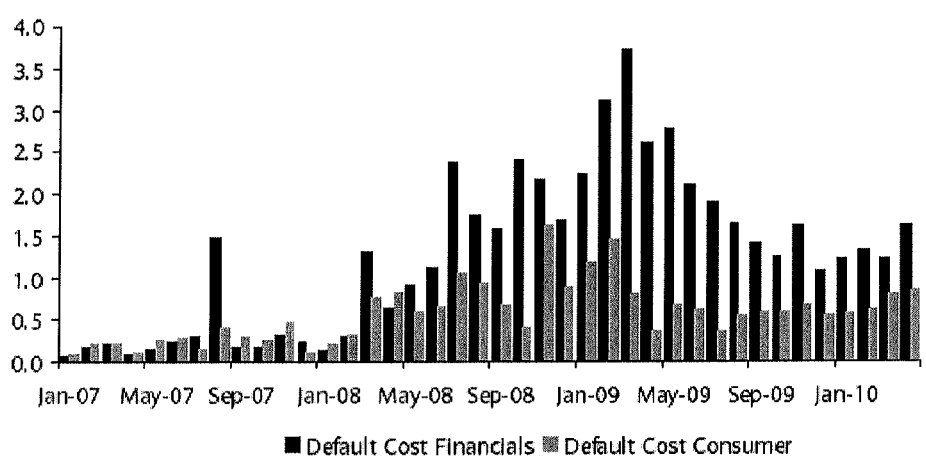
Fig. 39: Default Contribution – Consumer and Financial Sectors

Fig. 40: Investment Grade Bonds – Regression of OAS on CDS Spreads and LCS (April 2010)

| Same in Both Regs | | Specification 1 - Only CDS | | | Specification 2 - Includes CDS and LCS | | | |
|---|---|---|---|---|---|---|---|---|
| Month | # obs | Intercept | CDS | R-sq | Intercept | CDS | LCS | R-sq |
| Apr-10 | 123 | 0.16 | 1.23 | 0.54 | 0.05 | 1.17 | 0.28 | 0.60 |
| | | 1.31 | 12.02 | | 0.40 | 12.05 | 4.27 | |

Source: Barclays Capital

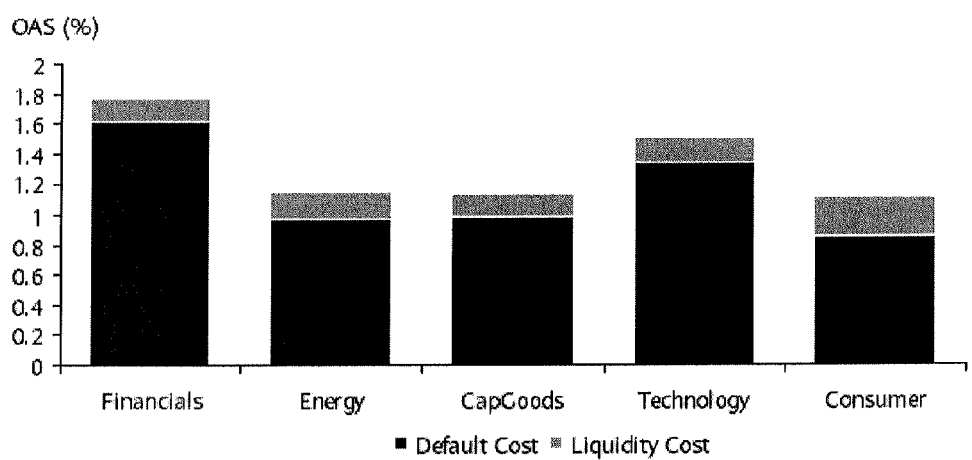
Fig. 41: Sector-wise Spread Decomposition in April 2010 – Default Contribution and Liquidity Contribution Fig. 42 : Investment Grade Bonds only Regression of OAS on CDS and LCS (January 2007 - February 2010) *(t-stats in Italics)*

| Same In Both Regs | | Specification 1 - Only CDS | | | Specification 2 - Includes CDS and LCS | | | |
|---|---|---|---|---|---|---|---|---|
| Month | # obs | Intercept | CDS | R-sq | Intercept | CDS | LCS | R-sq |
| Jan-07 | 116 | 0.67 / 25.45 | 0.36 / 6.32 | 0.25 | 0.54 / 11.56 | 0.27 / 4.47 | 0.57 / 3.16 | 0.31 |
| Feb-07 | 103 | 0.55 / 28.00 | 0.81 / 15.42 | 0.70 | 0.42 / 14.63 | 0.77 / 16.45 | 0.58 / 5.75 | 0.77 |
| Mar-07 | 115 | 0.59 / 36.04 | 0.74 / 19.26 | 0.76 | 0.50 / 16.56 | 0.70 / 18.45 | 0.39 / 3.47 | 0.79 |
| Apr-07 | 116 | 0.72 / 26.64 | 0.30 / 7.39 | 0.32 | 0.64 / 12.56 | 0.27 / 6.08 | 0.36 / 1.89 | 0.33 |
| May-07 | 109 | 0.62 / 28.02 | 0.78 / 14.46 | 0.66 | 0.55 / 16.04 | 0.73 / 13.00 | 0.31 / 2.52 | 0.67 |
| Jun-07 | 99 | 0.70 / 23.43 | 0.56 / 12.60 | 0.62 | 0.77 / 19.90 | 0.66 / 11.46 | -0.37 / -2.59 | 0.64 |
| Jul-07 | 74 | 0.83 / 14.80 | 0.63 / 12.53 | 0.68 | 0.69 / 12.75 | 0.36 / 5.26 | 0.92 / 5.30 | 0.77 |
| Aug-07 | 59 | 1.08 / 11.41 | 0.70 / 20.06 | 0.87 | 0.71 / 5.76 | 0.53 / 10.16 | 0.88 / 4.07 | 0.90 |
| Sep-07 | 78 | 1.17 / 18.90 | 0.52 / 9.51 | 0.54 | 1.00 / 10.94 | 0.48 / 8.47 | 0.34 / 2.47 | 0.57 |
| Oct-07 | 77 | 1.13 / 15.94 | 0.57 / 9.03 | 0.51 | 0.79 / 9.37 | 0.35 / 5.38 | 0.92 / 5.60 | 0.65 |
| Nov-07 | 46 | 1.43 / 11.39 | 0.79 / 7.33 | 0.54 | 1.23 / 8.70 | 0.45 / 2.78 | 0.69 / 2.61 | 0.59 |
| Dec-07 | 36 | 1.51 / 10.61 | 0.57 / 4.35 | 0.34 | 1.38 / 9.07 | 0.32 / 1.74 | 0.51 / 1.95 | 0.39 |
| Jan-08 | 68 | 1.63 / 6.43 | 0.93 / 5.70 | 0.32 | 1.27 / 7.00 | 0.14 / 0.92 | 1.34 / 8.37 | 0.67 |
| Feb-08 | 75 | 1.64 / 6.06 | 0.72 / 5.35 | 0.27 | 1.18 / 6.42 | 0.19 / 1.81 | 1.46 / 9.82 | 0.68 |
| Mar-08 | 71 | 1.76 / 5.34 | 1.03 / 9.06 | 0.54 | 1.08 / 5.11 | 0.49 / 5.76 | 1.41 / 10.85 | 0.83 |
| Apr-08 | 71 | 1.41 / 7.01 | 1.31 / 9.38 | 0.55 | 0.91 / 5.87 | 0.69 / 5.58 | 1.12 / 8.20 | 0.77 |
| May-08 | 80 | 1.35 / 6.25 | 1.19 / 7.67 | 0.42 | 0.33 / 1.55 | 0.83 / 6.41 | 1.80 / 7.34 | 0.66 |
| Jun-08 | 81 | 1.71 / 8.12 | 0.86 / 8.55 | 0.47 | 1.33 / 7.35 | 0.53 / 5.61 | 0.95 / 6.47 | 0.65 |
| Jul-08 | 78 | 1.64 / 20.73 | 0.97 / 32.56 | 0.93 | 1.46 / 17.67 | 0.86 / 22.56 | 0.34 / 4.20 | 0.94 |
| Aug-08 | 81 | 1.84 / 19.06 | 0.80 / 22.21 | 0.86 | 1.67 / 17.65 | 0.68 / 16.43 | 0.40 / 4.51 | 0.89 |
| Sep-08 | 75 | 2.87 / 17.96 | 0.56 / 7.64 | 0.44 | 2.57 / 13.82 | 0.55 / 7.89 | 0.35 / 2.86 | 0.49 |
| Oct-08 | 135 | 5.32 / 24.37 | 0.35 / 15.80 | 0.65 | 3.83 / 22.15 | 0.20 / 11.46 | 0.65 / 14.23 | 0.86 |
| Nov-08 | 148 | 3.54 / 11.13 | 1.23 / 12.36 | 0.51 | 3.26 / 16.80 | 0.60 / 8.30 | 0.71 / 15.82 | 0.82 |
| Dec-08 | 151 | 3.22 / 9.72 | 1.33 / 10.19 | 0.41 | 2.69 / 12.59 | 0.58 / 5.99 | 0.84 / 14.94 | 0.76 |
| Jan-09 | 147 | 2.59 / 9.88 | 1.08 / 11.85 | 0.49 | 1.91 / 9.37 | 0.69 / 9.11 | 0.78 / 10.98 | 0.72 |
| Feb-09 | 170 | 2.56 / 11.42 | 1.04 / 17.70 | 0.65 | 2.22 / 12.61 | 0.69 / 12.27 | 0.61 / 10.65 | 0.79 |
| Mar-09 | 157 | 3.45 / 11.38 | 0.97 / 16.96 | 0.65 | 2.76 / 12.41 | 0.59 / 11.64 | 0.68 / 12.47 | 0.82 |
| Apr-09 | 120 | 4.04 / 12.21 | 0.56 / 14.32 | 0.63 | 2.26 / 7.35 | 0.35 / 9.81 | 0.90 / 9.77 | 0.80 |
| May-09 | 92 | 2.32 / 9.74 | 0.78 / 16.36 | 0.75 | 1.48 / 7.03 | 0.60 / 14.38 | 0.74 / 8.08 | 0.85 |
| Jun-09 | 103 | 2.09 / 8.78 | 0.76 / 12.22 | 0.59 | 1.59 / 7.01 | 0.61 / 9.99 | 0.53 / 5.63 | 0.69 |
| Jul-09 | 86 | 1.82 / 7.91 | 0.81 / 13.56 | 0.68 | 1.32 / 5.91 | 0.66 / 10.86 | 0.50 / 5.18 | 0.76 |
| Aug-09 | 117 | 1.42 / 7.29 | 0.94 / 11.78 | 0.54 | 0.87 / 4.70 | 0.75 / 10.02 | 0.72 / 6.70 | 0.67 |
| Sep-09 | 150 | 1.28 / 10.38 | 0.92 / 14.05 | 0.57 | 0.81 / 6.60 | 0.79 / 13.52 | 0.62 / 7.36 | 0.68 |
| Oct-09 | 153 | 1.19 / 10.50 | 0.83 / 13.39 | 0.54 | 0.83 / 7.25 | 0.74 / 13.10 | 0.54 / 6.49 | 0.64 |
| Nov-09 | 152 | 1.02 / 7.49 | 0.98 / 14.03 | 0.56 | 0.50 / 3.76 | 0.85 / 13.89 | 0.86 / 7.95 | 0.69 |
| Dec-09 | 103 | 1.10 / 7.01 | 0.87 / 8.96 | 0.44 | 0.30 / 2.03 | 0.67 / 8.74 | 1.41 / 8.88 | 0.68 |
| Jan-10 | 167 | 0.78 / 6.93 | 0.91 / 11.91 | 0.46 | -0.02 / -0.17 | 0.80 / 12.73 | 1.38 / 9.67 | 0.65 |
| Feb-10 | 129 | 0.68 / 5.13 | 0.99 / 11.52 | 0.51 | -0.05 / -0.35 | 0.79 / 11.02 | 1.39 / 8.82 | 0.69 |
| Mar-10 | 108 | 0.41 / 2.72 | 1.12 / 8.96 | 0.43 | -0.24 / -1.82 | 0.97 / 10.23 | 1.30 / 9.21 | 0.68 |
| Apr-10 | 123 | 0.16 / 1.31 | 1.23 / 12.02 | 0.54 | 0.05 / 0.40 | 1.17 / 12.05 | 0.28 / 4.27 | 0.60 |

Source: Barclays Capital

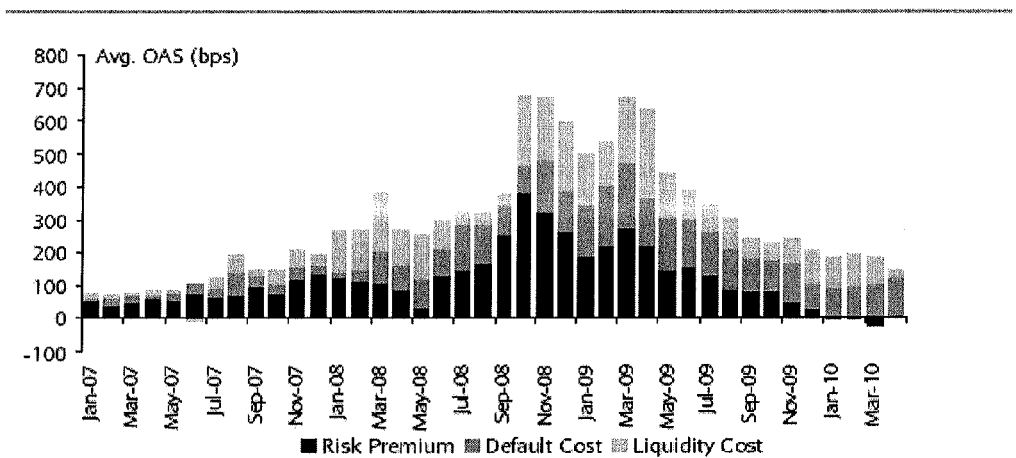
Fig. 43: Contributions of Risk Premium, Default, and Liquidity Components to Market OAS Level (Equally Weighted Portfolio of the Bonds in Sample), January 2007-April 2010
Source: Barclays Capital

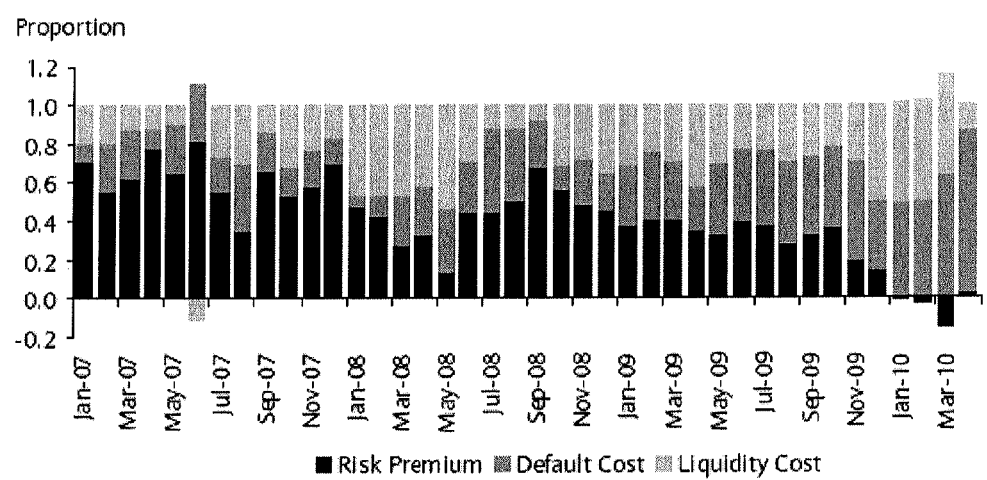
Fig. 44 : Share of OAS (as a % of OAS) of Market, Default, and Liquidity Components (Equally Weighted Portfolio of the Bonds in Our Sample), January 2007-April 2010

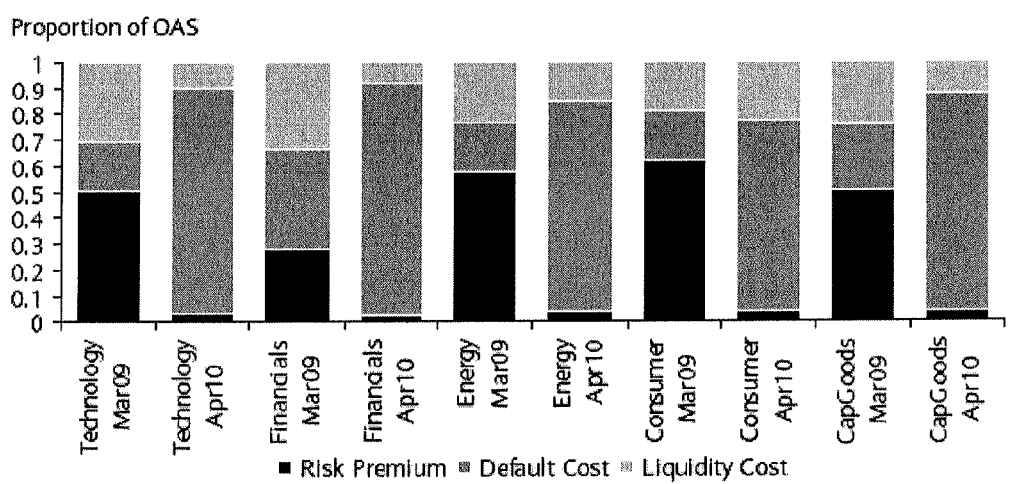
Fig. 45 : Sector-wise Spread Decomposition in March 2009 and April 2010 – Default Contribution and Liquidity Contribution
Source: Barclays Capital

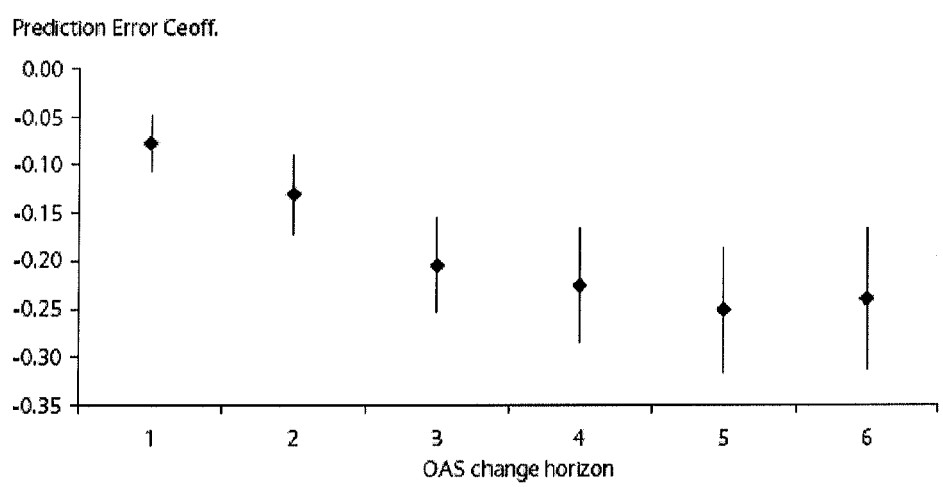
Fig. 46: Investment Grade Bonds – Coefficient (β) of *Residual* and Confidence Intervals for Various OAS Change Horizons (Predictions from February 2007-October 2009)
Note: The graph above shows the coefficient (β) and the 95% confidence intervals of the independent variable (Residual) in Equation 5, estimated using various horizons (values of $j$)
Source: Barclays Capital Fig. 47 : Portfolio Constituents and Weights Using the Spread Decomposition Regression and the Barclays Capital Risk Model

| Short Portfolio | | Long Portfolio | |
|---|---|---|---|
| Security | Mkt Val ($mn) | Security | Mkt Val ($mn) |
| UNH, 5.375% due 3/15/2016 | (5.61) | XL, 6.5% due 4/15/2017 | 0.59 |
| XTO, 5.3% due 6/30/2015 | (5.54) | CB, 6.375% due 4/15/2017 | 1.11 |
| VZ, 5.55% due 2/15/2016 | (5.33) | COF, 6.15% due 9/1/2016 | 1.51 |
| MET, 5% due 6/15/2015 | (5.09) | TOL, 5.15% due 5/15/2015 | 1.59 |
| CNQCN, 4.9% due 12/1/2014 | (5.02) | RAI, 7.625% due 6/1/2016 | 2.51 |
| EQR, 5.25% due 9/15/2014 | (4.35) | DOW, 5.9% due 2/15/2015 | 2.65 |
| NRUC, 3.875% due 9/16/2015 | (3.96) | BAC, 6.5% due 8/1/2016 | 2.89 |
| LOW, 5% due 10/15/2015 | (4.15) | WFC, 4.75% due 2/9/2015 | 5.06 |
| DD, 4.75% due 3/15/2015 | (3.89) | HD, 5.4% due 3/1/2016 | 5.77 |
| BAX, 4.625% due 3/15/2015 | (3.58) | APC, 5.75% due 6/15/2014 | 11.65 |
| WMT, 4.5% due 7/1/2015 | (3.48) | CSX, 6.25% due 4/1/2015 | 14.68 |
| | (50.00) | | 50.00 |

Source: Barclays Capital

Fig. 48: Long-Short Portfolio Performance using Spread Decomposition and Risk Model

|  | Oct-09 | Nov-09 | Dec-09 | Jan-10 | Feb-10 | Mar-10 |
|---|---|---|---|---|---|---|
| Strategy P&L | 305,552 | 207,969 | 435,778 | 233,416 | 370,969 | 840,063 |

Source: Barclays Capital

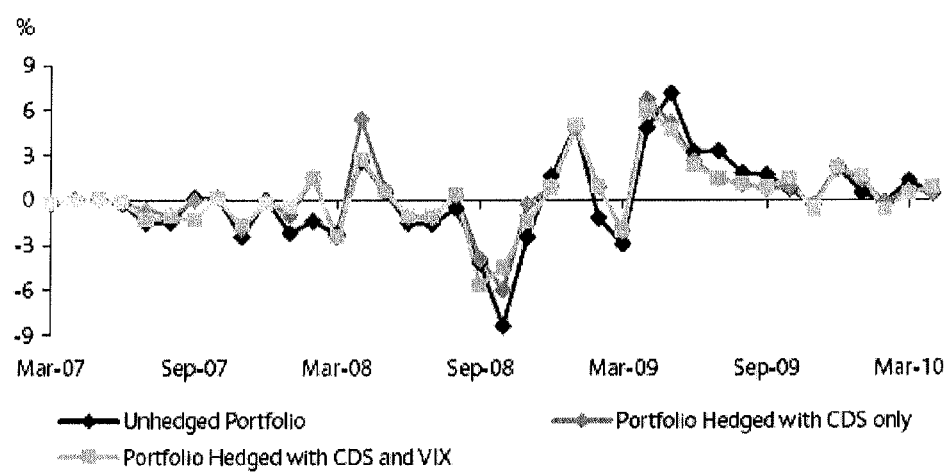
Fig. 49: Returns of Hedged and Unhedged Portfolios

Fig. 50 : Summary Statistics of Hedge Performance

| | Monthly returns – March 2007-April 2010 (in %) | | |
|---|---|---|---|
| | Unhedged Portfolio | Hedged with CDS Only | Hedged with CDS and VIX Futures |
| Average | 0.04 | 0.40 | 0.21 |
| Standard Deviation | 2.72 | 2.39 | 2.25 |
| Min | -8.38 | -6.01 | -5.68 |
| Max | 7.10 | 6.74 | 6.00 |

Source: Barclays Capital

Fig. 51: Regression of OAS on CDS Spread, LCS and LCS Volatility – January 2008*-April 2010

| | Intercept | CDS | LCS | LCS Volatility | Month Dummies | No of Obs | Adj R-sq |
|---|---|---|---|---|---|---|---|
| Coefficient | 1.31 | 0.371 | 0.98 | | Yes | 5715 | 0.77 |
| t-stats | (9.30) | (71.65) | (57.57) | | | | |
| Coefficient | 1.016 | 0.333 | 0.803 | 0.789 | Yes | 5546 | 0.8 |
| t-stats | (7.51) | (64.11) | (44.54) | (23.30) | | | |

Note: * 12 months of data are lost because they are used to estimate LCS volatility
Source: Barclays Capital Fig. 52: Regression of ΔOAS on ΔCDS Spread and ΔLCS – January 2007-April 2010

| | Intercept | ΔCDS | ΔLCS | Month Dummies | No of Obs | Adj R-sq |
|---|---|---|---|---|---|---|
| Coefficient | -0.184 | 0.097 | 0.406 | Yes | 7304 | 0.48 |
| t-stats | (2.59) | (29.97) | (35.44) | | | |

Source: Barclays Capital

Fig. 53: Regression of ln(OAS) on ln(CDS Spread) and ln(LCS) – January 2007-April 2010

| | Intercept | ln(CDS) | ln(LCS) | Month Dummies | No of Obs | Adj R-sq |
|---|---|---|---|---|---|---|
| Coefficient | -1.30 | 0.425 | 0.26 | Yes | 7578 | 0.89 |
| t-stats | (45.56) | (107.33) | (44.67) | | | |

Source: Barclays Capital

Fig. 54 : Investment Grade Bonds – Regression of OAS on CDP*(1-RR) and LCS (January 2007-April 2010)

| Same in Both Regs | | Specification 1 - Only CDS | | | Specification 2 - Includes CDS and LCS | | | |
|---|---|---|---|---|---|---|---|---|
| Month | # obs | Intercept | CDP*(1-RR) | Adj. R-sq | Intercept | CDP*(1-RR) | LCS | Adj. R-sq |
| Jan-07 | 132 | 0.80<br>32.16 | -0.18<br>-0.78 | 0.00 | 0.65<br>18.19 | -0.18<br>-0.88 | 0.47<br>5.51 | 0.18 |
| Feb-07 | 107 | 0.79<br>27.43 | -0.04<br>-0.16 | -0.01 | 0.66<br>20.10 | -0.03<br>-0.18 | 0.40<br>6.14 | 0.25 |
| Mar-07 | 120 | 0.82<br>31.37 | 0.23<br>1.06 | 0.00 | 0.69<br>19.37 | 0.21<br>1.05 | 0.42<br>4.91 | 0.16 |
| Apr-07 | 129 | 0.85<br>28.77 | 0.45<br>1.73 | 0.02 | 0.70<br>14.30 | 0.35<br>1.44 | 0.55<br>4.00 | 0.12 |
| May-07 | 123 | 0.84<br>32.66 | 0.17<br>0.82 | 0.00 | 0.58<br>10.30 | 0.14<br>0.75 | 0.94<br>5.15 | 0.17 |
| Jun-07 | 112 | 0.90<br>26.31 | 0.64<br>2.52 | 0.05 | 0.76<br>16.93 | 0.58<br>2.47 | 0.45<br>4.32 | 0.18 |
| Jul-07 | 80 | 1.13<br>20.60 | 1.14<br>4.18 | 0.17 | 0.32<br>2.17 | 1.06<br>4.62 | 2.59<br>5.76 | 0.41 |
| Aug-07 | 66 | 1.40<br>14.78 | 2.96<br>5.75 | 0.33 | 0.92<br>8.71 | 1.11<br>2.21 | 0.95<br>6.38 | 0.59 |
| Sep-07 | 93 | 1.31<br>23.74 | 1.88<br>13.35 | 0.66 | 1.12<br>17.13 | 1.77<br>13.74 | 0.30<br>4.66 | 0.72 |
| Oct-07 | 85 | 1.28<br>19.12 | 1.83<br>11.05 | 0.59 | 0.76<br>8.96 | 1.28<br>8.81 | 0.98<br>7.80 | 0.76 |
| Nov-07 | 59 | 1.79<br>12.24 | 2.52<br>7.83 | 0.51 | 1.04<br>6.48 | 1.50<br>5.16 | 1.14<br>6.55 | 0.72 |
| Dec-07 | 57 | 1.50<br>9.48 | 2.92<br>7.21 | 0.48 | 1.11<br>5.26 | 2.21<br>4.75 | 0.70<br>2.65 | 0.53 |
| Jan-08 | 87 | 2.04<br>17.65 | 2.20<br>8.27 | 0.44 | 1.45<br>12.25 | 0.81<br>2.90 | 0.85<br>7.50 | 0.66 |
| Feb-08 | 99 | 2.25<br>18.75 | 1.76<br>9.62 | 0.48 | 1.51<br>13.05 | 0.78<br>4.68 | 0.89<br>9.57 | 0.73 |
| Mar-08 | 91 | 2.47<br>11.03 | 3.95<br>8.50 | 0.44 | 1.57<br>8.44 | 1.45<br>3.39 | 1.21<br>9.33 | 0.72 |
| Apr-08 | 101 | 2.32<br>13.45 | 2.05<br>7.14 | 0.33 | 1.35<br>9.47 | 0.50<br>2.16 | 1.17<br>11.43 | 0.71 |
| May-08 | 114 | 2.21<br>14.65 | 1.83<br>7.14 | 0.31 | 1.38<br>9.04 | 0.59<br>2.39 | 1.14<br>8.56 | 0.58 |
| Jun-08 | 120 | 2.71<br>17.40 | 1.30<br>7.29 | 0.30 | 1.74<br>14.29 | 0.42<br>3.25 | 1.09<br>13.50 | 0.73 |
| Jul-08 | 114 | 2.98<br>16.11 | 1.55<br>6.99 | 0.30 | 2.03<br>17.06 | 0.77<br>5.82 | 0.78<br>15.82 | 0.78 |
| Aug-08 | 115 | 2.85<br>17.24 | 2.15<br>8.38 | 0.38 | 2.17<br>20.41 | 1.18<br>7.27 | 0.70<br>14.89 | 0.79 |
| Sep-08 | 97 | 3.58<br>28.98 | 1.73<br>8.15 | 0.41 | 3.30<br>18.58 | 1.48<br>6.23 | 0.30<br>2.17 | 0.43 |
| Oct-08 | 220 | 5.30<br>23.66 | 5.30<br>12.27 | 0.41 | 3.27<br>25.61 | 2.44<br>10.77 | 0.70<br>27.93 | 0.87 |
| Nov-08 | 231 | 5.77<br>19.86 | 5.07<br>10.48 | 0.32 | 3.56<br>20.55 | 2.31<br>8.52 | 0.84<br>25.27 | 0.82 |
| Dec-08 | 220 | 5.81<br>16.44 | 4.68<br>8.01 | 0.22 | 2.86<br>15.82 | 2.04<br>7.64 | 0.98<br>30.76 | 0.85 |
| Jan-09 | 137 | 4.10<br>16.83 | 2.12<br>7.96 | 0.31 | 2.48<br>11.97 | 1.25<br>6.50 | 0.80<br>12.83 | 0.69 |
| Feb-09 | 166 | 4.07<br>20.60 | 1.86<br>10.62 | 0.40 | 2.81<br>14.82 | 1.17<br>7.96 | 0.72<br>10.99 | 0.66 |
| Mar-09 | 210 | 5.10<br>15.77 | 4.20<br>12.47 | 0.43 | 3.45<br>15.56 | 2.23<br>9.41 | 0.72<br>18.06 | 0.78 |
| Apr-09 | 127 | 3.93<br>17.11 | 1.21<br>5.83 | 0.21 | 2.30<br>10.86 | 0.70<br>4.66 | 0.79<br>11.65 | 0.62 |
| May-09 | 176 | 4.08<br>15.06 | 1.20<br>5.95 | 0.16 | 1.83<br>7.67 | 0.51<br>3.54 | 1.24<br>14.59 | 0.62 |
| Jun-09 | 185 | 3.66<br>15.22 | 1.37<br>6.14 | 0.17 | 1.84<br>9.07 | 0.75<br>4.78 | 1.11<br>14.86 | 0.62 |
| Jul-09 | 147 | 3.19<br>12.47 | 1.64<br>8.11 | 0.31 | 1.61<br>6.63 | 0.91<br>5.47 | 1.04<br>10.55 | 0.61 |
| Aug-09 | 194 | 2.88<br>14.45 | 1.15<br>5.56 | 0.13 | 1.13<br>6.29 | 0.51<br>3.42 | 1.43<br>14.91 | 0.60 |
| Sep-09 | 236 | 2.24<br>16.34 | 1.37<br>7.71 | 0.20 | 0.98<br>7.35 | 0.79<br>5.86 | 1.24<br>14.26 | 0.57 |
| Oct-09 | 237 | 2.06<br>19.33 | 1.05<br>7.88 | 0.21 | 1.17<br>10.74 | 0.70<br>6.52 | 0.98<br>12.40 | 0.52 |
| Nov-09 | 246 | 2.07<br>17.86 | 1.27<br>9.55 | 0.27 | 0.93<br>8.33 | 0.87<br>8.77 | 1.36<br>15.20 | 0.62 |
| Dec-09 | 200 | 1.86<br>14.53 | 1.22<br>7.15 | 0.20 | 0.67<br>6.52 | 0.72<br>6.67 | 1.47<br>18.10 | 0.70 |
| Jan-10 | 295 | 1.70<br>20.19 | 1.12<br>8.61 | 0.20 | 0.51<br>5.62 | 0.70<br>7.44 | 1.62<br>17.25 | 0.60 |
| Feb-10 | 270 | 1.74<br>20.24 | 1.43<br>9.06 | 0.23 | 0.52<br>6.17 | 0.92<br>8.72 | 1.56<br>19.47 | 0.68 |
| Mar-10 | 211 | 1.53<br>18.48 | 1.24<br>7.21 | 0.20 | 0.51<br>5.80 | 0.70<br>5.63 | 1.50<br>15.06 | 0.61 |
| Apr-10 | 223 | 1.45<br>17.22 | 1.18<br>6.96 | 0.18 | 0.93<br>9.93 | 0.92<br>6.18 | 0.79<br>8.86 | 0.39 |

Source: Barclays Capital

Fig. 55 : High Yield bonds – Regression of OAS on CDS Spreads and LCS
(January 2007-April 2010)

| Same in Both Regs | | Specification 1 – Only CDS | | | Specification 2 – Includes CDS and LCS | | | |
|---|---|---|---|---|---|---|---|---|
| Month | # Obs | Intercept | CDS | R² | Intercept | CDS | LCS | R² |
| Jan-07 | 45 | 1.21 / 7.50 | 0.51 / 7.85 | 0.58 | 1.18 / 5.22 | 0.50 / 7.65 | 0.04 / 0.23 | 0.57 |
| Feb-07 | 50 | 1.37 / 7.95 | 0.50 / 7.27 | 0.51 | 1.24 / 5.46 | 0.48 / 6.91 | 0.17 / 0.87 | 0.51 |
| Mar-07 | 42 | 1.37 / 5.53 | 0.44 / 5.93 | 0.45 | 1.46 / 4.55 | 0.45 / 5.61 | -0.12 / -0.43 | 0.44 |
| Apr-07 | 97 | 1.17 / 7.81 | 0.59 / 10.91 | 0.55 | 1.27 / 6.44 | 0.60 / 10.88 | -0.13 / -0.75 | 0.55 |
| May-07 | 99 | 1.05 / 6.94 | 0.56 / 10.11 | 0.51 | 1.11 / 5.18 | 0.56 / 10.04 | -0.08 / -0.41 | 0.50 |
| Jun-07 | 87 | 1.48 / 6.46 | 0.48 / 7.84 | 0.41 | 1.74 / 5.78 | 0.49 / 7.98 | -0.34 / -1.33 | 0.42 |
| Jul-07 | 63 | 1.17 / 3.67 | 0.63 / 10.85 | 0.65 | 0.67 / 1.88 | 0.55 / 8.85 | 0.69 / 2.75 | 0.69 |
| Aug-07 | 57 | 1.66 / 8.59 | 0.60 / 14.96 | 0.80 | 1.28 / 4.96 | 0.54 / 11.51 | 0.31 / 2.11 | 0.81 |
| Sep-07 | 64 | 1.25 / 5.46 | 0.69 / 14.79 | 0.78 | 1.29 / 4.36 | 0.69 / 13.51 | -0.04 / -0.21 | 0.77 |
| Oct-07 | 72 | 1.40 / 6.51 | 0.65 / 16.61 | 0.79 | 1.58 / 6.10 | 0.68 / 14.27 | -0.22 / -1.23 | 0.80 |
| Nov-07 | 95 | 2.39 / 12.51 | 0.55 / 18.38 | 0.78 | 2.48 / 9.60 | 0.56 / 14.87 | -0.11 / -0.55 | 0.78 |
| Dec-07 | 108 | 2.60 / 13.92 | 0.52 / 19.39 | 0.78 | 2.72 / 11.09 | 0.54 / 16.32 | -0.12 / -0.74 | 0.78 |
| Jan-08 | 103 | 2.72 / 10.17 | 0.58 / 16.80 | 0.73 | 1.94 / 5.33 | 0.52 / 13.44 | 0.73 / 3.03 | 0.75 |
| Feb-08 | 96 | 2.40 / 9.60 | 0.66 / 19.31 | 0.80 | 1.84 / 5.67 | 0.62 / 17.25 | 0.52 / 2.63 | 0.81 |
| Mar-08 | 96 | 3.56 / 14.13 | 0.53 / 20.06 | 0.81 | 3.26 / 7.81 | 0.51 / 15.96 | 0.27 / 0.91 | 0.81 |
| Apr-08 | 83 | 2.85 / 10.31 | 0.50 / 10.70 | 0.58 | 2.29 / 5.59 | 0.47 / 9.29 | 0.49 / 1.85 | 0.59 |
| May-08 | 97 | 3.01 / 11.65 | 0.46 / 14.50 | 0.69 | 2.62 / 5.77 | 0.45 / 12.79 | 0.28 / 1.03 | 0.69 |
| Jun-08 | 82 | 4.27 / 12.74 | 0.33 / 8.66 | 0.48 | 4.29 / 7.84 | 0.33 / 8.08 | -0.01 / -0.04 | 0.47 |
| Jul-08 | 89 | 3.48 / 12.25 | 0.51 / 15.19 | 0.72 | 3.10 / 8.40 | 0.49 / 13.57 | 0.28 / 1.56 | 0.73 |
| Aug-08 | 85 | 3.67 / 10.15 | 0.52 / 12.80 | 0.66 | 2.81 / 6.78 | 0.44 / 9.78 | 0.73 / 3.55 | 0.70 |
| Sep-08 | 50 | 3.13 / 8.10 | 0.71 / 15.70 | 0.83 | 3.49 / 8.18 | 0.81 / 11.78 | -0.47 / -1.80 | 0.84 |
| Oct-08 | 60 | 6.21 / 7.94 | 0.57 / 9.18 | 0.59 | 4.46 / 4.75 | 0.48 / 7.26 | 0.76 / 2.99 | 0.64 |
| Nov-08 | 59 | 8.94 / 13.08 | 0.40 / 11.02 | 0.67 | 7.24 / 12.50 | 0.19 / 4.49 | 1.15 / 6.57 | 0.81 |
| Dec-08 | 48 | 7.56 / 6.77 | 0.54 / 10.74 | 0.71 | 6.18 / 6.24 | 0.32 / 4.90 | 0.89 / 4.47 | 0.79 |
| Jan-09 | 84 | 7.26 / 7.82 | 0.50 / 9.85 | 0.54 | 4.67 / 6.34 | 0.33 / 7.83 | 1.05 / 8.66 | 0.76 |
| Feb-09 | 67 | 7.70 / 10.80 | 0.28 / 7.30 | 0.44 | 5.94 / 8.40 | 0.19 / 5.04 | 0.88 / 4.96 | 0.59 |
| Mar-09 | 65 | 8.32 / 12.00 | 0.29 / 8.12 | 0.50 | 5.21 / 10.66 | 0.23 / 11.02 | 0.93 / 11.20 | 0.83 |
| Apr-09 | 59 | 3.88 / 5.11 | 0.65 / 11.54 | 0.69 | 2.50 / 4.30 | 0.47 / 9.99 | 0.78 / 7.24 | 0.84 |
| May-09 | 73 | 4.18 / 9.14 | 0.53 / 11.89 | 0.66 | 3.35 / 10.43 | 0.34 / 9.47 | 0.80 / 9.25 | 0.85 |
| Jun-09 | 79 | 4.13 / 8.26 | 0.49 / 9.70 | 0.54 | 3.34 / 6.74 | 0.40 / 7.77 | 0.72 / 4.04 | 0.62 |
| Jul-09 | 75 | 5.88 / 9.69 | 0.21 / 5.98 | 0.32 | 3.14 / 7.48 | 0.13 / 6.29 | 1.39 / 12.01 | 0.77 |
| Aug-09 | 88 | 4.23 / 8.87 | 0.47 / 9.00 | 0.48 | 2.69 / 5.86 | 0.36 / 7.73 | 1.05 / 6.48 | 0.65 |
| Sep-09 | 96 | 2.33 / 5.33 | 0.72 / 11.57 | 0.58 | 1.19 / 2.59 | 0.64 / 11.13 | 0.80 / 4.80 | 0.66 |
| Oct-09 | 94 | 2.70 / 5.88 | 0.65 / 10.81 | 0.55 | 1.26 / 2.97 | 0.51 / 9.78 | 1.29 / 7.08 | 0.71 |
| Nov-09 | 94 | 2.93 / 6.03 | 0.69 / 11.17 | 0.57 | 1.62 / 3.83 | 0.53 / 10.05 | 1.28 / 7.43 | 0.73 |
| Dec-09 | 89 | 1.66 / 4.57 | 0.85 / 15.58 | 0.73 | 1.23 / 3.13 | 0.76 / 12.30 | 0.53 / 2.54 | 0.75 |
| Jan-10 | 88 | 5.67 / 21.16 | 0.03 / 2.15 | 0.04 | 4.05 / 8.90 | 0.03 / 2.32 | 1.03 / 4.21 | 0.20 |
| Feb-10 | 99 | 2.28 / 5.64 | 0.68 / 12.29 | 0.60 | 1.76 / 4.48 | 0.56 / 9.48 | 0.75 / 4.14 | 0.66 |
| Mar-10 | 96 | 2.30 / 7.02 | 0.59 / 12.01 | 0.60 | 1.74 / 3.91 | 0.56 / 11.32 | 0.51 / 1.80 | 0.61 |
| Apr-10 | 107 | 2.29 / 7.59 | 0.61 / 12.74 | 0.60 | 1.64 / 4.43 | 0.58 / 12.31 | 0.58 / 2.83 | 0.63 |

Source: Barclays Capital

Fig. 56: High Yield Bonds – Regression of OAS on CDP*(1-RR) and LCS
(January 2007-April 2010)

| Same in Both Regs | | Specification 1 - Only CDS | | | Specification 2 - Includes CDS and LCS | | | |
|---|---|---|---|---|---|---|---|---|
| Month | # obs | Intercept | CDP*(1-RR) | R-sq | Intercept | CDP*(1-RR) | LCS | R-sq |
| Jan-07 | 58 | 2.13 / 17.90 | 0.81 / 5.89 | 0.37 | 1.85 / 6.66 | 0.84 / 6.00 | 0.24 / 1.12 | 0.37 |
| Feb-07 | 51 | 2.19 / 16.30 | 0.84 / 4.99 | 0.32 | 1.85 / 6.93 | 0.89 / 5.25 | 0.31 / 1.50 | 0.34 |
| Mar-07 | 47 | 2.22 / 13.88 | 1.22 / 5.78 | 0.41 | 1.91 / 4.90 | 1.24 / 5.82 | 0.30 / 0.88 | 0.41 |
| Apr-07 | 104 | 2.36 / 23.49 | 0.71 / 6.62 | 0.29 | 1.86 / 8.30 | 0.68 / 6.45 | 0.54 / 2.48 | 0.33 |
| May-07 | 114 | 2.02 / 23.86 | 0.79 / 8.68 | 0.40 | 1.68 / 9.48 | 0.77 / 8.50 | 0.36 / 2.13 | 0.42 |
| Jun-07 | 112 | 2.66 / 27.62 | 0.63 / 6.77 | 0.29 | 2.51 / 11.92 | 0.61 / 6.27 | 0.16 / 0.84 | 0.29 |
| Jul-07 | 91 | 3.49 / 23.77 | 0.90 / 7.67 | 0.39 | 2.52 / 7.20 | 0.84 / 7.43 | 0.68 / 3.03 | 0.44 |
| Aug-07 | 83 | 3.54 / 23.26 | 0.83 / 8.67 | 0.48 | 2.87 / 8.27 | 0.77 / 7.82 | 0.35 / 2.15 | 0.50 |
| Sep-07 | 87 | 3.14 / 25.84 | 0.68 / 12.48 | 0.64 | 2.54 / 10.22 | 0.62 / 10.85 | 0.34 / 2.77 | 0.67 |
| Oct-07 | 87 | 3.46 / 20.83 | 0.57 / 9.08 | 0.49 | 3.35 / 9.31 | 0.55 / 7.11 | 0.07 / 0.34 | 0.48 |
| Nov-07 | 175 | 4.08 / 34.66 | 0.69 / 14.52 | 0.55 | 3.44 / 13.22 | 0.61 / 11.16 | 0.42 / 2.73 | 0.56 |
| Dec-07 | 180 | 4.15 / 26.83 | 0.73 / 12.68 | 0.47 | 4.10 / 11.63 | 0.73 / 9.71 | 0.04 / 0.18 | 0.47 |
| Jan-08 | 181 | 4.83 / 27.42 | 1.23 / 11.37 | 0.42 | 3.28 / 9.58 | 1.05 / 9.89 | 0.91 / 5.18 | 0.49 |
| Feb-08 | 190 | 5.10 / 33.17 | 1.27 / 13.01 | 0.47 | 4.17 / 13.77 | 1.17 / 11.83 | 0.55 / 3.52 | 0.50 |
| Mar-08 | 190 | 5.34 / 34.76 | 1.27 / 13.63 | 0.49 | 4.34 / 14.75 | 1.13 / 11.88 | 0.62 / 3.96 | 0.53 |
| Apr-08 | 159 | 4.39 / 27.84 | 0.77 / 7.46 | 0.26 | 3.12 / 11.05 | 0.61 / 6.12 | 0.77 / 5.28 | 0.37 |
| May-08 | 183 | 4.57 / 27.17 | 0.69 / 9.53 | 0.33 | 3.21 / 8.76 | 0.61 / 8.47 | 0.82 / 4.15 | 0.39 |
| Jun-08 | 191 | 4.86 / 28.18 | 0.89 / 12.13 | 0.43 | 4.48 / 13.25 | 0.87 / 11.60 | 0.21 / 1.29 | 0.44 |
| Jul-08 | 192 | 5.30 / 28.60 | 0.77 / 10.90 | 0.38 | 4.34 / 13.18 | 0.72 / 10.38 | 0.51 / 2.46 | 0.42 |
| Aug-08 | 193 | 5.58 / 27.49 | 0.92 / 11.32 | 0.40 | 3.85 / 11.03 | 0.79 / 9.99 | 0.87 / 5.87 | 0.49 |
| Sep-08 | 130 | 6.31 / 27.96 | 0.69 / 6.30 | 0.23 | 4.25 / 10.58 | 0.50 / 4.87 | 1.05 / 5.92 | 0.39 |
| Oct-08 | 138 | 9.36 / 29.40 | 0.85 / 6.24 | 0.22 | 6.25 / 14.46 | 0.66 / 5.94 | 0.73 / 8.86 | 0.50 |
| Nov-08 | 134 | 11.16 / 28.53 | 0.87 / 8.30 | 0.34 | 7.60 / 18.54 | 0.68 / 8.98 | 0.85 / 11.68 | 0.67 |
| Dec-08 | 118 | 12.18 / 24.81 | 0.74 / 6.19 | 0.24 | 8.05 / 14.35 | 0.59 / 6.53 | 0.74 / 9.69 | 0.58 |
| Jan-09 | 140 | 7.62 / 17.44 | 1.10 / 13.74 | 0.57 | 4.45 / 8.56 | 0.92 / 13.27 | 0.82 / 8.40 | 0.72 |
| Feb-09 | 126 | 6.86 / 15.46 | 1.12 / 11.78 | 0.52 | 5.22 / 11.04 | 0.84 / 8.90 | 0.59 / 6.14 | 0.63 |
| Mar-09 | 136 | 8.67 / 17.10 | 1.34 / 8.54 | 0.35 | 5.85 / 11.78 | 0.90 / 6.89 | 0.82 / 9.40 | 0.61 |
| Apr-09 | 155 | 7.22 / 23.11 | 0.57 / 15.53 | 0.61 | 5.23 / 15.13 | 0.42 / 11.94 | 0.67 / 8.59 | 0.74 |
| May-09 | 181 | 6.94 / 22.35 | 0.44 / 8.57 | 0.29 | 3.88 / 13.01 | 0.30 / 8.18 | 1.12 / 14.51 | 0.67 |
| Jun-09 | 199 | 6.42 / 29.12 | 0.35 / 9.33 | 0.30 | 4.56 / 16.90 | 0.28 / 8.72 | 0.82 / 9.41 | 0.52 |
| Jul-09 | 197 | 5.64 / 20.33 | 0.47 / 9.53 | 0.31 | 2.97 / 12.03 | 0.30 / 8.68 | 1.22 / 16.00 | 0.70 |
| Aug-09 | 210 | 5.74 / 28.36 | 0.33 / 8.96 | 0.27 | 3.31 / 12.21 | 0.20 / 6.42 | 1.20 / 11.14 | 0.54 |
| Sep-09 | 227 | 5.37 / 35.56 | 0.18 / 6.55 | 0.16 | 3.94 / 15.78 | 0.12 / 4.62 | 0.76 / 6.84 | 0.30 |
| Oct-09 | 219 | 5.06 / 33.27 | 0.27 / 11.41 | 0.37 | 3.65 / 15.17 | 0.20 / 8.73 | 0.86 / 7.10 | 0.49 |
| Nov-09 | 222 | 5.37 / 36.81 | 0.27 / 11.65 | 0.38 | 3.98 / 18.42 | 0.20 / 9.29 | 0.88 / 8.04 | 0.52 |
| Dec-09 | 219 | 4.61 / 30.41 | 0.32 / 12.02 | 0.40 | 3.79 / 23.90 | 0.25 / 10.62 | 0.53 / 8.90 | 0.56 |
| Jan-10 | 231 | 4.47 / 35.65 | 0.31 / 12.89 | 0.42 | 3.89 / 30.37 | 0.25 / 11.06 | 0.44 / 8.71 | 0.56 |
| Feb-10 | 253 | 4.63 / 31.04 | 0.45 / 11.45 | 0.34 | 3.38 / 21.76 | 0.29 / 8.42 | 0.89 / 12.28 | 0.59 |
| Mar-10 | 247 | 4.25 / 34.34 | 0.41 / 10.40 | 0.30 | 3.31 / 21.58 | 0.29 / 7.95 | 0.71 / 8.72 | 0.47 |
| Apr-10 | 254 | 4.10 / 35.63 | 0.37 / 8.81 | 0.23 | 3.28 / 15.54 | 0.34 / 8.25 | 0.59 / 4.57 | 0.29 |

Source: Barclays Capital

Fig. 57 : Current TCX Portfolio Composition (Rebalanced as of 31 March 2010)

| Identifier | Ticker | Description | Coupon | Mat Date | MV [%] | LCS |
|---|---|---|---|---|---|---|
| 002819AB | ABT | ABBOTT LABORATORIES-GLOBAL | 5.60 | 11/30/2017 | 0.89 | 0.35 |
| 002824AU | ABT | ABBOTT LABORATORIES | 5.13 | 4/1/2019 | 0.61 | 0.36 |
| 037411AV | APA | APACHE CORP | 6.90 | 9/15/2018 | 2.28 | 0.66 |
| 032510AC | APC | ANADARKO PETROLEUM | 6.20 | 3/15/2040 | 1.83 | 0.61 |
| 025816BB | AXP | AMERICAN EXPRESS CO | 8.13 | 5/20/2019 | 1.27 | 0.66 |
| 59018YN5 | BAC | MERRILL LYNCH & CO. - GLOBAL | 6.15 | 4/25/2013 | 4.51 | 0.16 |
| 055451AG | BHP | BHP BILLITON FINANCE | 5.50 | 4/1/2014 | 1.57 | 0.18 |
| 055451AH | BHP | BHP BILLITON FINANCE | 6.50 | 4/1/2019 | 1.38 | 0.34 |
| 105756AE | BRAZIL | BRAZIL (FED REP OF)-GLOBAL | 10.13 | 5/15/2027 | 1.27 | 0.24 |
| 12189TAT | BRK | BURLINGTON NORTH SANTA FE | 6.75 | 7/15/2011 | 1.70 | 0.19 |
| 172967CQ | C | CITIGROUP INC-GLOBAL | 5.00 | 9/15/2014 | 1.90 | 0.40 |
| 172967DR | C | CITIGROUP INC-GLOBAL | 6.13 | 8/25/2036 | 1.61 | 1.08 |
| 18683KAA | CLF | CLIFFS NATURAL RESOURCES IN | 5.90 | 3/15/2020 | 0.74 | 0.38 |
| 14040HAQ | COF | CAPITAL ONE FINANCIAL | 5.70 | 9/15/2011 | 3.33 | 0.22 |
| 17275RAF | CSCO | CISCO SYSTEMS INC | 5.50 | 1/15/2040 | 2.31 | 0.76 |
| 126650BN | CVS | CVS CORP | 6.60 | 3/15/2019 | 1.05 | 0.43 |
| 24702RAG | DELL | DELL INC | 5.63 | 4/15/2014 | 0.97 | 0.36 |
| 260543BW | DOW | DOW CHEMICAL | 7.60 | 5/15/2014 | 1.60 | 0.36 |
| 25459HAR | DTV | DIRECTV HOLDINGS LLC | 5.20 | 3/15/2020 | 0.50 | 0.56 |
| 29273RAJ | ETP | ENERGY TRANSFER PARTNERS LP | 7.50 | 7/1/2038 | 3.54 | 1.19 |
| 349631AQ | FO | FORTUNE BRANDS INC | 3.00 | 6/1/2012 | 0.50 | 0.28 |
| 36962GXZ | GE | GENERAL ELECTRIC CAPITAL-GLOBA | 6.75 | 3/15/2032 | 2.40 | 0.57 |
| 38141EA2 | GS | GOLDMAN SACHS GROUP-GLOBAL | 7.50 | 2/15/2019 | 5.00 | 0.54 |
| 437076AS | HD | HOME DEPOT INC-GLOBAL | 5.88 | 12/16/2036 | 1.63 | 0.63 |
| 459056JS | IBRD | INTERNATL BANK RECON DEV | 8.25 | 9/1/2016 | 2.81 | 0.53 |
| 46625HBV | JPM | JP MORGAN CHASE & CO-GLOBAL | 5.13 | 9/15/2014 | 5.00 | 0.22 |
| 500630BG | KDB | KOREA DEVELOPMENT BANK-GLOBAL | 5.75 | 9/10/2013 | 3.87 | 0.25 |
| 50075NAU | KFT | KRAFT FOODS INC-GLOBAL | 6.13 | 2/1/2018 | 2.42 | 0.55 |
| 02209SAC | MO | ALTRIA GROUP INC | 8.50 | 11/10/2013 | 1.29 | 0.31 |
| 637432LR | NRUC | NATIONAL RURAL UTILS CFC-GLOBA | 10.38 | 11/1/2018 | 2.34 | 0.60 |
| 68389XAC | ORCL | ORACLE CORP | 5.75 | 4/15/2018 | 1.39 | 0.64 |
| 72650RAV | PAA | PLAINS ALL AMER PIPELINE | 4.25 | 9/1/2012 | 2.52 | 0.23 |
| 10138MAH | PEP | BOTTLING GROUP LLC | 6.95 | 3/15/2014 | 1.61 | 0.27 |
| 743410AW | PLD | PROLOGIS | 6.88 | 3/15/2020 | 0.69 | 0.35 |
| 743410AX | PLD | PROLOGIS | 6.25 | 3/15/2017 | 3.32 | 0.28 |
| 748148RM | Q | QUEBEC PROV CANADA-GLOBAL | 4.88 | 5/5/2014 | 2.28 | 0.43 |
| 448814DC | QHEL | HYDRO-QUEBEC | 8.50 | 12/1/2029 | 2.45 | 0.17 |
| 822582AD | RDSALN | SHELL INTERNATIONAL FINANCE | 6.38 | 12/15/2038 | 2.03 | 0.66 |
| 515110BA | RENTEN | LANDWIRTSCHAFT RENTENBK-GLOBAL | 1.88 | 9/24/2012 | 5.00 | 0.18 |
| 87938WAA | TELEFO | TELEFONICA EMISONES SAU-GLOBAL | 5.98 | 6/20/2011 | 1.30 | 0.12 |
| 40049JAX | TELVIS | GRUPO TELEVISA S.A. DE CV | 6.00 | 5/15/2018 | 1.27 | 0.64 |
| 87927VAV | TITIM | TELECOM ITALIA CAPITAL-GLOBAL | 7.72 | 6/4/2038 | 1.23 | 1.01 |
| 8935268Y | TRP | TRANSCANADA PIPELINES | 7.13 | 1/15/2019 | 2.18 | 0.34 |
| 88732JAW | TWC | TIME WARNER CABLE INC | 5.00 | 2/1/2020 | 0.90 | 0.38 |
| 00184AAF | TWX | AOL TIME WARNER-GLOBAL | 6.88 | 5/1/2012 | 2.55 | 0.19 |
| 91913YAD | VLO | VALERO ENERGY | 6.88 | 4/15/2012 | 1.09 | 0.19 |
| 947075AF | WFT | WEATHERFORD INTL LTD | 9.63 | 3/1/2019 | 1.42 | 0.58 |
| 931142CK | WMT | WAL-MART STORES-GLOBAL | 6.50 | 8/15/2037 | 2.16 | 0.65 |
| 984121BS | XRX | XEROX CORP | 5.50 | 5/15/2012 | 1.10 | 0.20 |
| 984121BZ | XRX | XEROX CORP | 4.25 | 2/15/2015 | 1.39 | 0.24 |
| | | TCX | | | | 0.43 |
| | | US Credit Index | | | | 0.84 |

Source: Barclays Capital

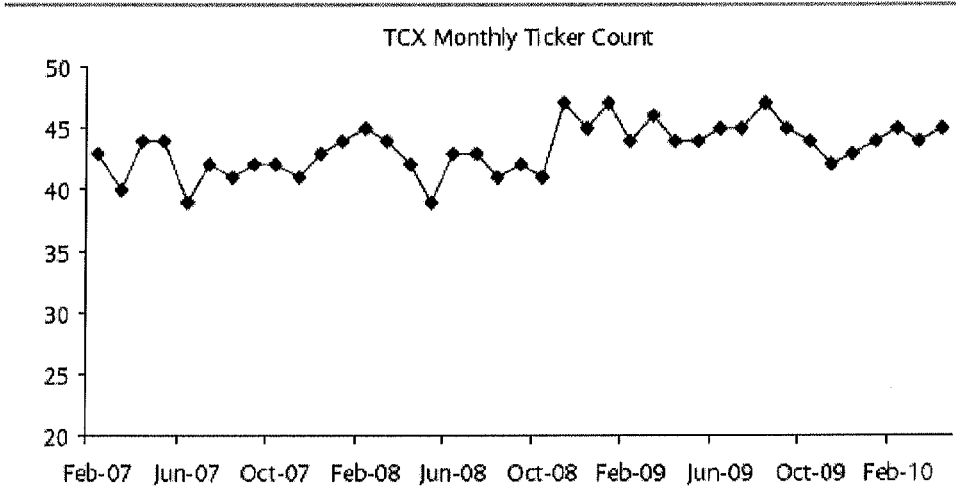
Fig. 58: Number of Different Issuers in TCX, by month, February 2007-April 2010
Source: Barclays Capital

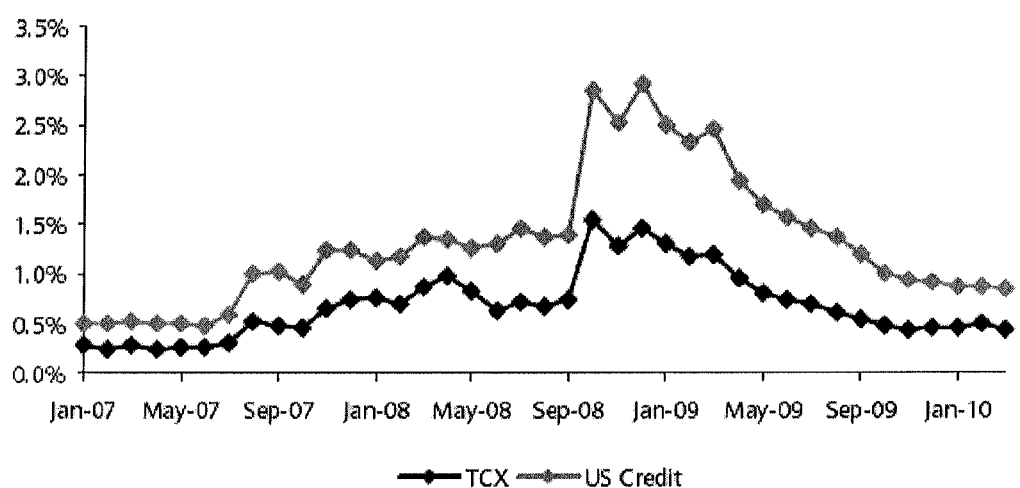
Fig. 59: Average LCS, TCX and Credit Index, 31 January 2007-31 March 2010 (%)
Source: Barclays Capital

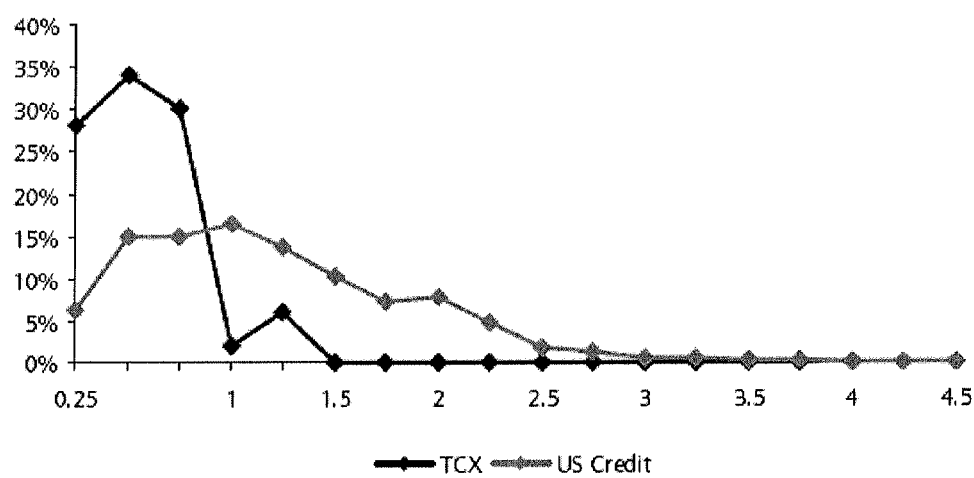
Fig. 60 : Cross-Sectional LCS Distribution, TCX and Credit Index, 31 March 2010 (%)
Source: Barclays Capital

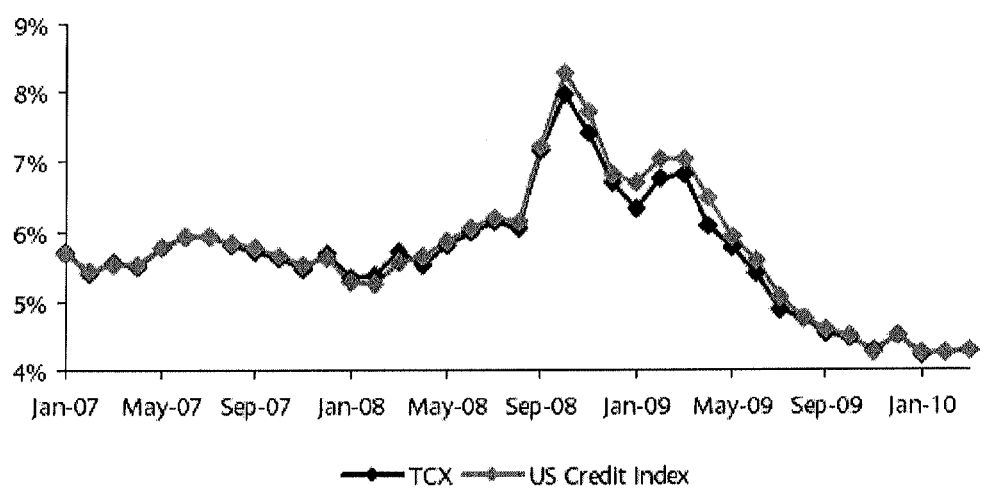
Fig. 61: Yield to Worst, TCX and Credit Index, 31 January 2007-31 March 2010 (%)

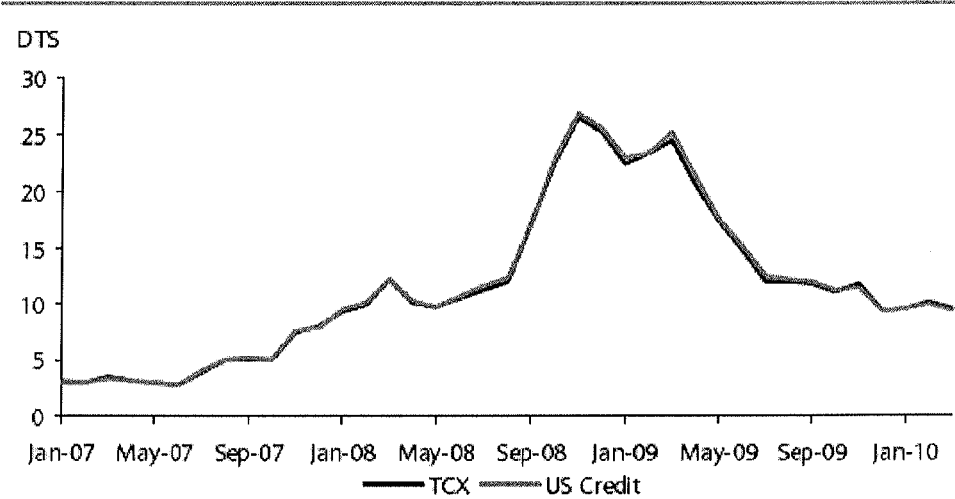
Fig. 62: Monthly DTS, TCX and Credit Index, 31 January 2007-31 March 2010

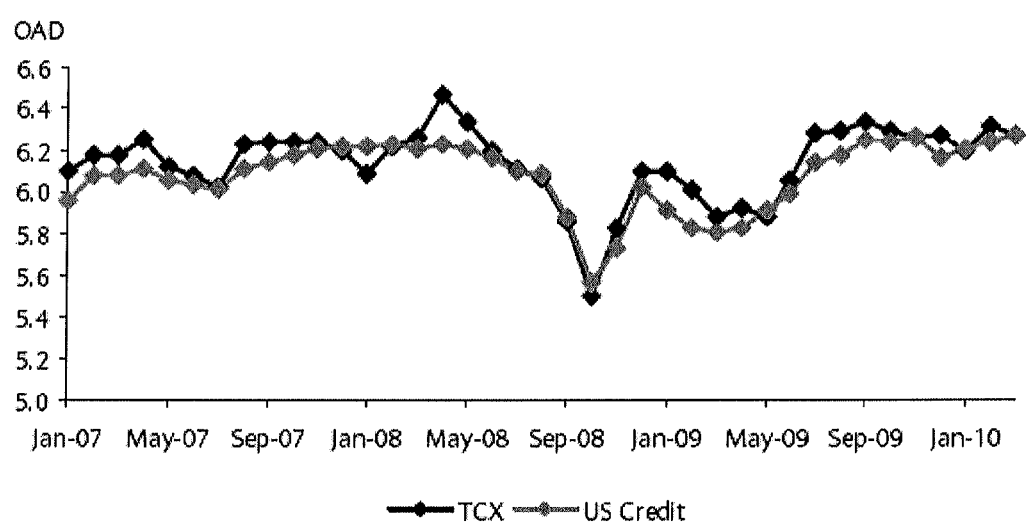
Fig. 63: Monthly OAD, TCX and Credit Index, 31 January 2007-31 March 2010
Source: Barclays Capital Fig. 64: Monthly Excess Returns (to Treasuries) of the TCX and Credit Index;
February 2007-March 2010 (bp)

|  | TCX ExRet | Credit Index ExRet | TCX - Credit Index |
|---|---|---|---|
| Entire Period | | | |
| Mean | -4.7 [0.6] | -0.5 | -4.2 [1.1] |
| Stdev | 284.3 [263.5] | 238.5 | 89.9 [66.7] |
| Max | 567.2 [567.2] | 482.9 | 215.2 [215.2] |
| Min | -1154.8 [-954.8] | -716.9 | -438.0 [-238.0] |
| 2/07-7/08 | | | |
| Mean | -50.8 | -43.5 | -7.2 |
| Stdev | 129.6 | 115.7 | 27.9 |
| Max | 285.0 | 253.7 | 31.4 |
| Min | -260.5 | -262.5 | -67.1 |
| 8/08-3/10 | | | |
| Mean | 36.8 [46.8] | 38.3 | -1.5 [8.5] |
| Stdev | 372.2 [339.8] | 309.0 | 122.6 [88.6] |
| Max | 567.2 [567.2] | 482.9 | 215.2 [215.2] |
| Min | -1154.8 [-954.8] | -716.9 | -438.0 [-238.0] |

Note: Results without overweight to Lehman Brothers are shown in brackets. All returns are gross of any transactions cost. Source: Barclays Capital

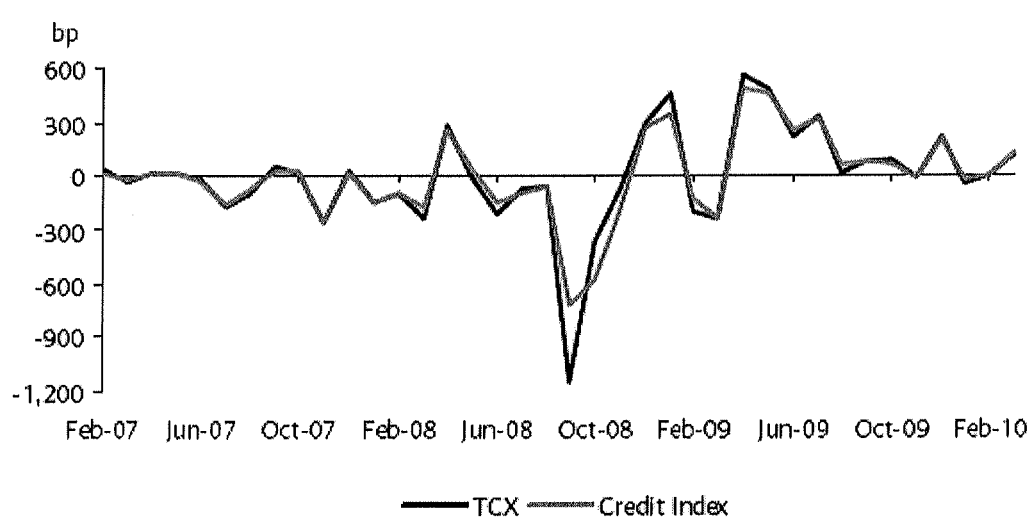
Fig. 65 : TCX and Credit Index Excess Returns (to Treasuries); February 2007-March 2010 (bp)
Source: Barclays Capital

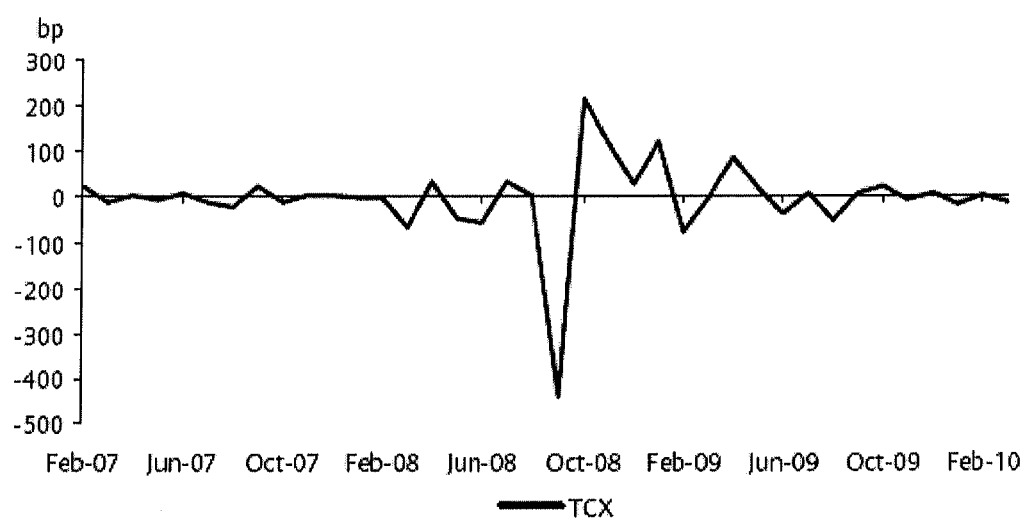
Fig. 66 : Difference in TCX and Credit Index Excess Returns (to Treasuries); February 2007-March 2010 (bp)
Source: Barclays Capital

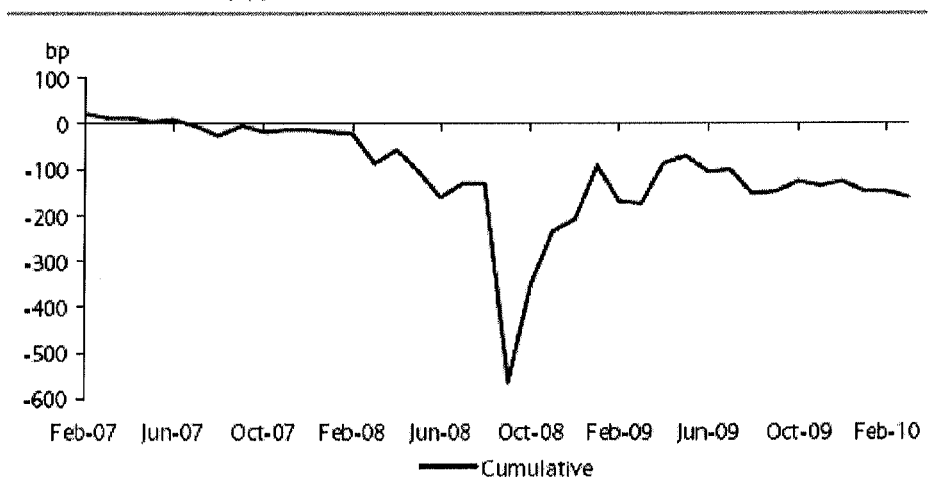
Fig.67: Cumulative Excess Return Difference between TCX and Credit Index; February 2007-March 2010 (bp)
Source: Barclays Capital Fig. 68: Monthly Total Returns, TCX (with and without Futures Overlay) and Credit Index, February 2007-March 2010 (bp)

|  | TCX w/o futures overlay | TCX w/ futures overlay | US Credit Index |
|---|---|---|---|
| Entire Period | | | |
| Mean | 48.1 | 47.8 | 52.7 |
| Stdev | 271.7 | 272.7 | 226.8 |
| Max | 659.8 | 655.5 | 627.1 |
| Min | -1093.0 | -1096.0 | -656.7 |
| 2/07-7/08 | | | |
| Mean | 14.3 | 14.5 | 22.2 |
| Stdev | 104.1 | 103.5 | 87.9 |
| Max | 224.0 | 219.9 | 201.9 |
| Min | -159.9 | -164.1 | -98.0 |
| 8/08-3/10 | | | |
| Mean | 78.4 | 77.8 | 80.0 |
| Stdev | 363.3 | 365.1 | 302.6 |
| Max | 659.8 | 655.5 | 627.1 |
| Min | -1093.0 | -1096.0 | -656.7 |

All returns are gross of any transactions cost. Source: Barclays Capital

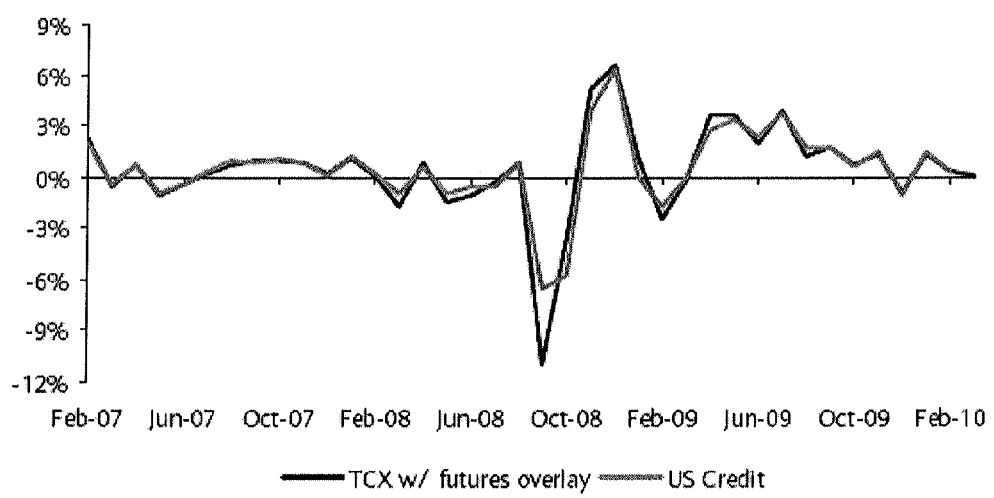
Fig. 69: Monthly Total Returns, TCX (with Futures Overlay) and Credit Index, February 2007-March 2010 (%)
Source: Barclays Capital

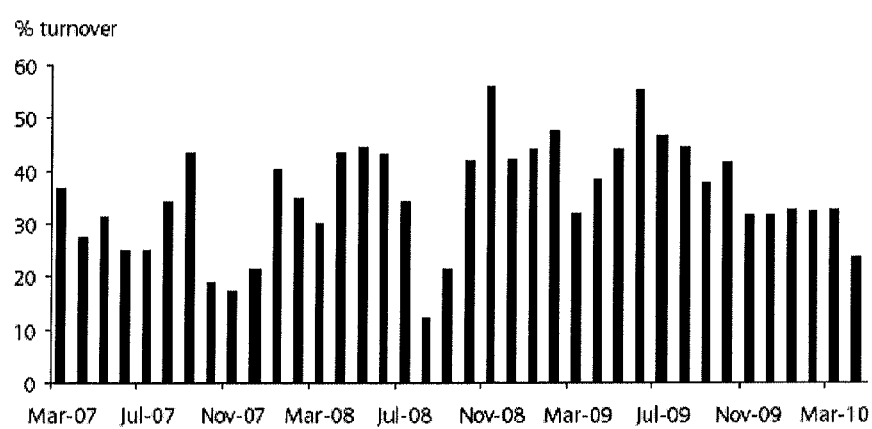
Fig. 70i: Monthly TCX Turnover, March 2007-April 2010 (%)
Source: Barclays Capital

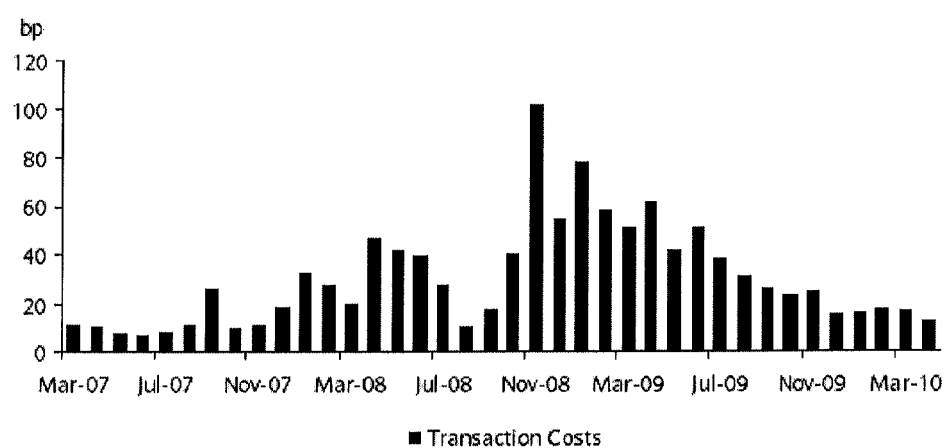
Fig. 71 : Monthly TCX Transaction Costs, March 2007-April 2010 (bp)

Fig. 72: Monthly Excess Returns (vs Treasuries), TEV of Excess Returns (vs Credit Index) and Relative LCS, TCX and Three Quarterly TCX Portfolios, February 2007-March 2010 (bp)

|  | TCX | V1 | V2 | V3 | Average Q | Credit Index |
|---|---|---|---|---|---|---|
| Mean | -4.7 | -2.6 | -7.5 | 3.5 | -2.0 | -0.49 |
| Stdev | 284.3 | 264.5 | 287.4 | 257.8 | 273.1 | 238.5 |
| TEV (vs Credit Index) | 89.9 | 75.1 | 88.4 | 60.5 | 73.1 |  |
| Relative LCS (beg) | 53% | 54% | 52% | 52% | 52% |  |
| Relative LCS (end) | 62% | 68% | 67% | 70% | 68% |  |

Source: Barclays Capital

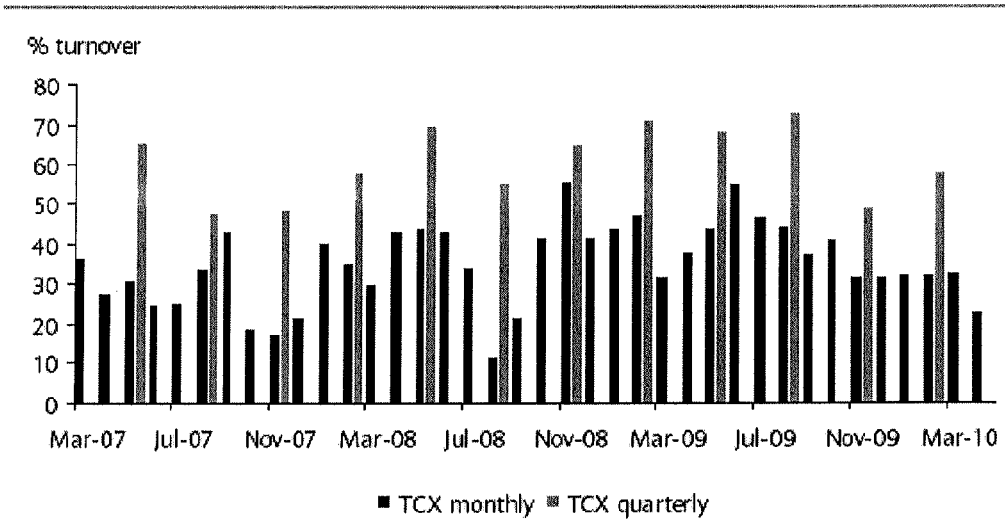
Fig. 73: Turnover for Quarterly TCX, Three TCX Portfolios, March 2007-April 2010 (%)
Source: Barclays Capital Fig. 74: Transactions Cost for TCX and Three Quarterly TCX Portfolios, March 2007-April 2010

|  | TCX | V1 | V2 | V3 | Average Q |
|---|---|---|---|---|---|
| Monthly Cost (bp) | 30.5 | 17.6 | 16.4 | 17.3 | 17.1 |
| Monthly Turnover (%) | 35.1 | 20.3 | 20.0 | 20.1 | 20.1 |

Source: Barclays Capital

Fig. 75: Monthly Excess Returns (to Treasuries) of the Credit Index and Credit RBI; February 2007-March 2010 (bp)

| | Credit Index ExRet | Credit RBI ExRet | Credit RBI - Credit Index |
|---|---|---|---|
| Entire Period | | | |
| Mean | -0.5 | 4.1 | 4.6 |
| Stdev | 238.5 | 140.0 | 188.3 |
| Max | 482.9 | 305.7 | 511.5 |
| Min | -716.9 | -332.5 | -332.8 |
| 2/07-7/08 | | | |
| Mean | -43.5 | -22.1 | 21.4 |
| Stdev | 115.7 | 157.3 | 139.6 |
| Max | 253.7 | 305.7 | 347.8 |
| Min | -262.5 | -332.5 | -236.3 |
| 8/08-3/10 | | | |
| Mean | 38.3 | 27.7 | -10.6 |
| Stdev | 309.0 | 121.7 | 226.1 |
| Max | 482.9 | 266.7 | 511.5 |
| Min | -716.9 | -205.4 | -332.8 |

All returns are gross of any transactions cost. Source: Barclays Capital

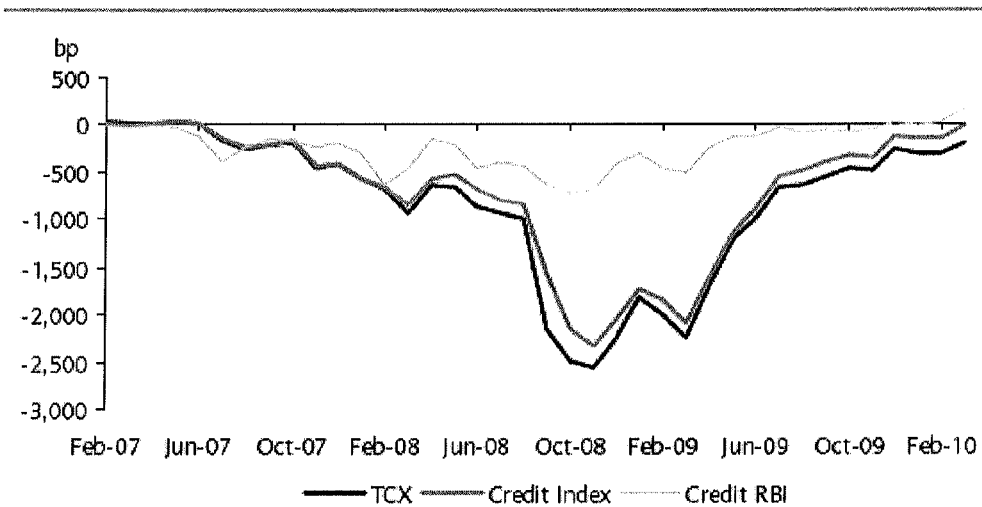
Fig. 76 : TCX, Credit Index, and Credit RBI Cumulative Excess Returns (to Treasuries); February 2007-March 2010 (bp)

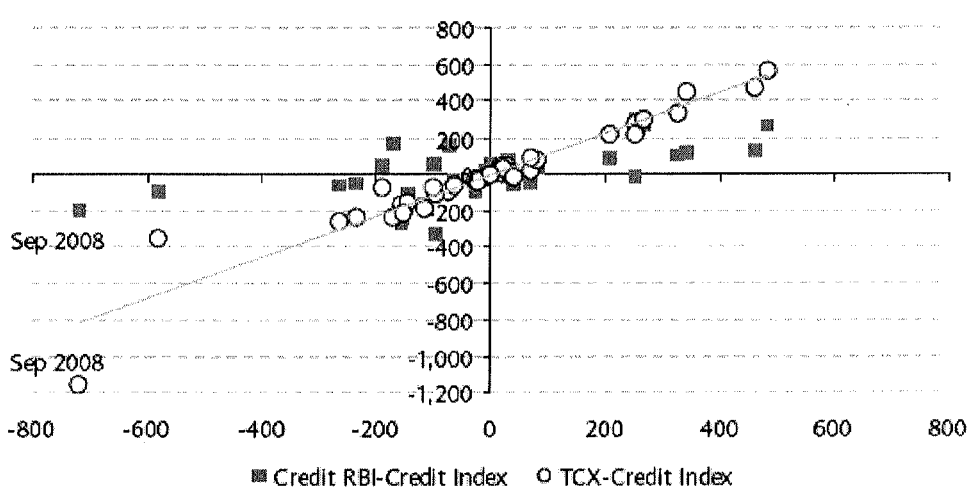
Fig. 77 : TCX and Credit RBI Excess Returns versus the Credit Index; February 2007-March 2010 (bp)
Source: Barclays Capital

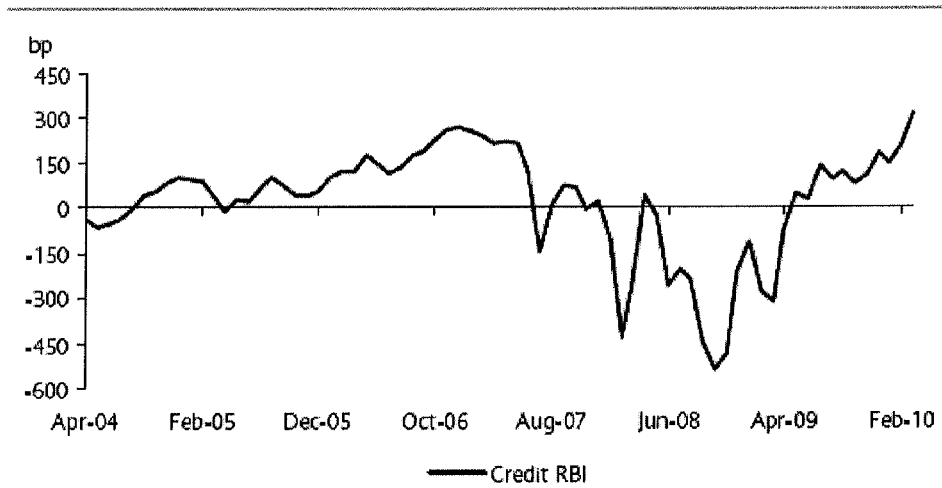
Fig. 78: Cumulative Credit Index and Credit RBI Excess Returns (to Treasuries); April 2004-March 2010 (bp)
Source: Barclays Capital Fig. 79 : Current LTCX Portfolio Composition (Rebalanced as of 30 April 2010)

| Identifier | Ticker | Description | Coupon | Mat Date | MV [%] | LCS |
|---|---|---|---|---|---|---|
| 031162AY | AMGN | AMGEN INC | 6.90 | 6/1/2038 | 3.14 | 0.96 |
| 59562VAM | BRK | MIDAMERICAN ENERGY HOLDINGS | 6.13 | 4/1/2036 | 3.38 | 1.28 |
| 925524AH | CBS | CBS CORP-GLOBAL | 7.88 | 7/30/2030 | 1.17 | 1.04 |
| 20030NBB | CMCSA | COMCAST CORPORATION | 6.40 | 3/1/2040 | 5.01 | 0.68 |
| 14043DAB | COF | CAPITAL ONE CAPITAL VI | 8.88 | 5/15/2040 | 1.87 | 0.92 |
| 126650BJ | CVS | CVS CORP-GLOBAL | 6.25 | 6/1/2027 | 2.28 | 1.03 |
| 927804FG | D | VIRGINIA ELECTRIC POWER | 8.88 | 11/15/2038 | 2.56 | 0.81 |
| 260543BY | DOW | DOW CHEMICAL | 9.40 | 5/15/2039 | 1.37 | 0.57 |
| 26442CAH | DUK | DUKE ENERGY CAROLINAS LLC | 5.30 | 2/15/2040 | 3.94 | 0.84 |
| 36962GXZ | GE | GENERAL ELECTRIC CAPITAL-GLOBA | 6.75 | 3/15/2032 | 2.17 | 0.65 |
| 36962G3P | GE | GENERAL ELECTRIC CAPITAL-GLOBA | 5.88 | 1/14/2038 | 2.77 | 0.74 |
| 38141GFD | GS | GOLDMAN SACHS GROUP | 6.75 | 10/1/2037 | 2.12 | 0.74 |
| 377372AE | GSK | GLAXOSMITHKLINE CAPITAL INC | 6.38 | 5/15/2038 | 3.98 | 0.65 |
| 460146CE | IP | INTERNATIONAL PAPER | 7.50 | 8/15/2021 | 2.75 | 0.39 |
| 478160AJ | JNJ | JOHNSON & JOHNSON | 6.95 | 9/1/2029 | 2.54 | 1.47 |
| 576000KV | MASEDU | MASSACHUSETTS ST SCH BLDG AUTH | 5.72 | 8/15/2039 | 4.80 | 0.93 |
| 91086QAG | MEX | UNITED MEX STATES-GLOBAL | 8.30 | 8/15/2031 | 4.02 | 1.15 |
| 02209SAH | MO | ALTRIA GROUP INC | 10.20 | 2/6/2039 | 1.14 | 1.02 |
| 61746BCY | MS | MORGAN STANLEY DEAN WITTER | 6.25 | 8/9/2026 | 2.24 | 1.26 |
| 651639AM | NEM | NEWMONT MINING | 6.25 | 10/1/2039 | 3.87 | 0.66 |
| 65473QAV | NI | NISOURCE FINANCE CORP | 6.13 | 3/1/2022 | 0.50 | 0.84 |
| 65334HAJ | NXYCN | NEXEN INC | 7.50 | 7/30/2039 | 4.97 | 0.62 |
| 71645WAQ | PETBRA | PETROBRAS INTL FINANCE-GLOBAL | 6.88 | 1/20/2040 | 4.02 | 0.50 |
| 748148PD | Q | QUEBEC PROV CANADA | 7.13 | 2/9/2024 | 5.53 | 0.30 |
| 822582AD | RDSALN | SHELL INTERNATIONAL FINANCE | 6.38 | 12/15/2038 | 2.26 | 0.66 |
| 001957BD | T | AT&T CORP - GLOBAL | 8.00 | 11/15/2031 | 5.42 | 0.71 |
| 893521AB | TRH | TRANSATLANTIC HOLDINGS | 8.00 | 11/30/2039 | 0.80 | 1.08 |
| 884903BH | TRICN | THOMSON CORP | 5.85 | 4/15/2040 | 2.01 | 0.68 |
| 913017BS | UTX | UNITED TECHNOLOGIES | 5.70 | 4/15/2040 | 1.38 | 1.11 |
| 925524AX | VIA | VIACOM INC | 6.88 | 4/30/2036 | 1.09 | 1.19 |
| 92976GAJ | WFC | WACHOVIA BANK NA | 6.60 | 1/15/2038 | 3.93 | 0.77 |
| 94973VAN | WLP | WELLPOINT INC-GLOBAL | 6.38 | 6/15/2037 | 1.87 | 1.10 |
| 969457BG | WMB | WILLIAMS COS | 7.88 | 9/1/2021 | 2.45 | 1.17 |
| 969457BM | WMB | WILLIAMS COS | 8.75 | 3/15/2032 | 1.82 | 1.41 |
| 931142CM | WMT | WAL-MART STORES | 6.20 | 4/15/2038 | 3.17 | 0.67 |
| 988498AD | YUM | YUM! BRANDS INC | 6.88 | 11/15/2037 | 1.66 | 0.62 |
| | | LTCX | | | | 0.82 |
| | | US Long Credit Index | | | | 1.43 |

Source: Barclays Capital

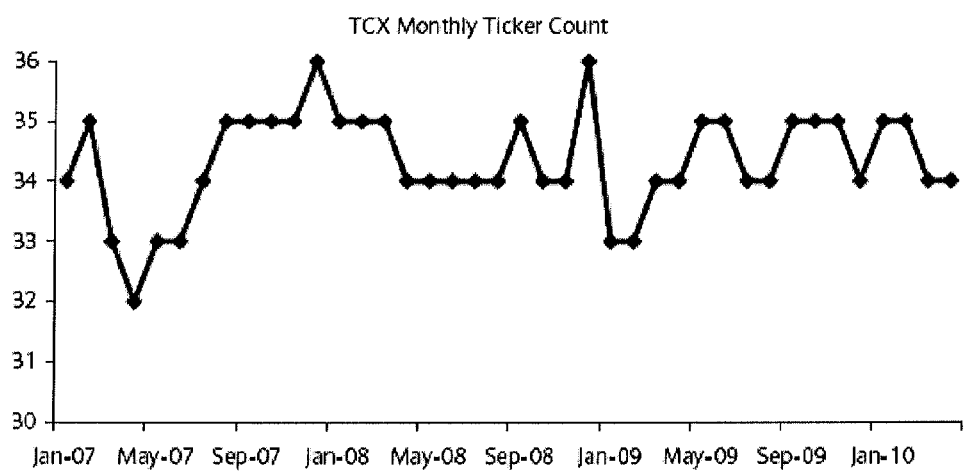
Fig. 80: Number of Different Issuers in LTCX, by month, 31 January 2007 – 30 April 2010
Source: Barclays Capital

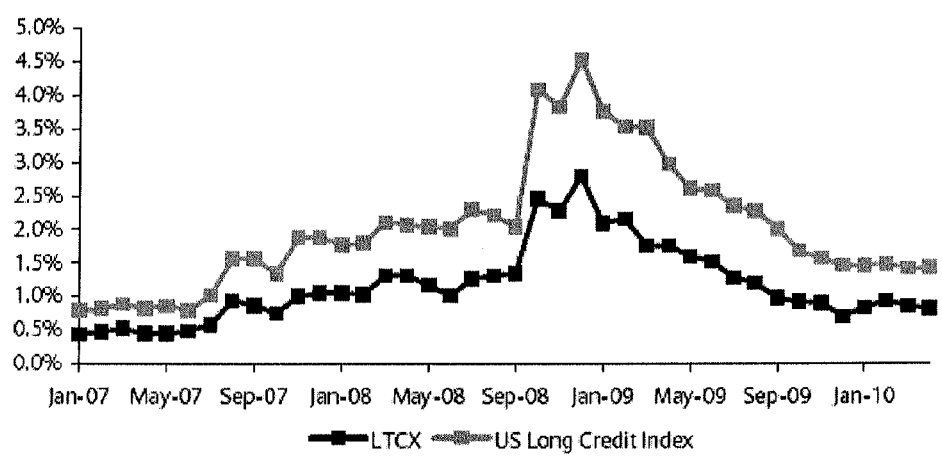
Fig. 81: Average LCS, LTCX, and Long Credit Index, 31 January 2007 – 30 April 2010 (%)
Source: Barclays Capital
[5] To date, we have constructed 40 monthly LTCX portfolios, although we only have full monthly returns for 39 of them. We have yet to calculate a monthly return for the May 2010 LTCX constructed on 30 April 2010.

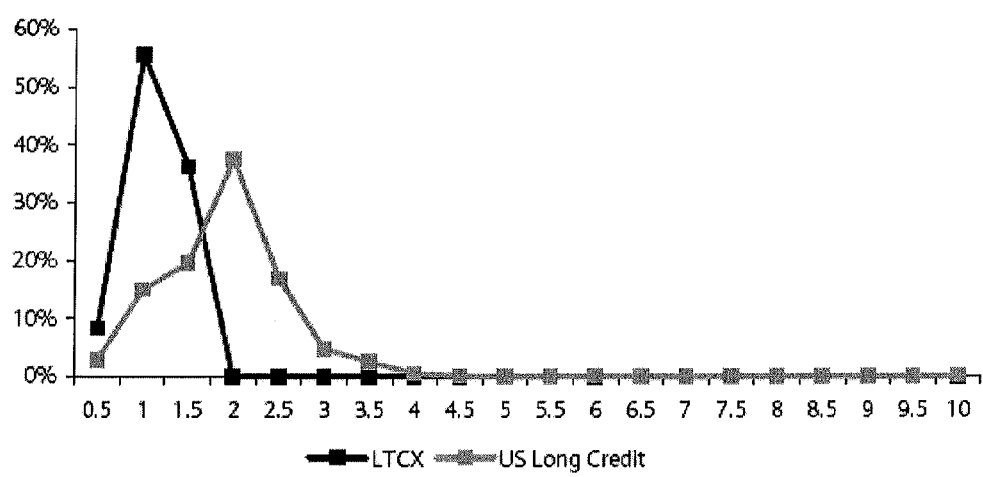
Fig. 82: Cross-Sectional LCS Distribution, LTCX and Long Credit Index, 31 April 2010 (%)
Source: Barclays Capital

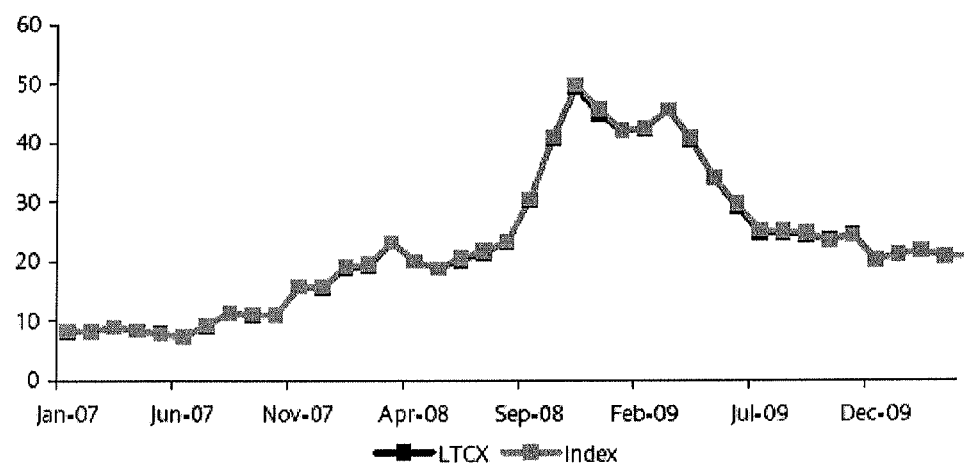
Fig. 83: Monthly DTS, LTCX and Long Credit Index, 31 January 2007 – 30 April 2010
Source: Barclays Capital

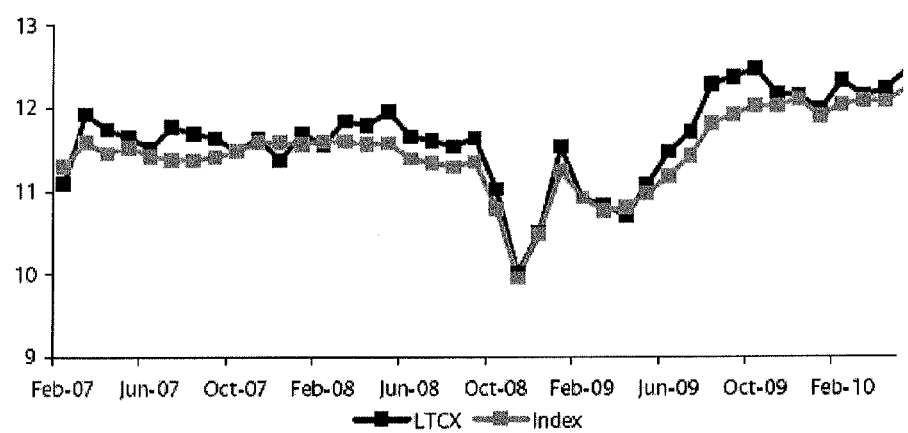
Fig. 84: Monthly OAD, LTCX and Long Credit Index, 31 January 2007 – 30 April 2010
Source: Barclays Capital Fig. 85 : Monthly Excess Returns (to Treasuries) of the LTCX and Long Credit Index; February 2007 – April 2010 (bp)

|  | LTCX | Long Credit Index | LTCX - Index |
|---|---|---|---|
| Entire Period | | | |
| Mean | 1.1 | 2.3 | -1.2 |
| Stdev | 388.9 | 366.8 | 50.3 |
| Max | 850.4 | 767.6 | 120.8 |
| Min | -1,036.0 | -946.7 | -168.9 |

Source: Barclays Capital

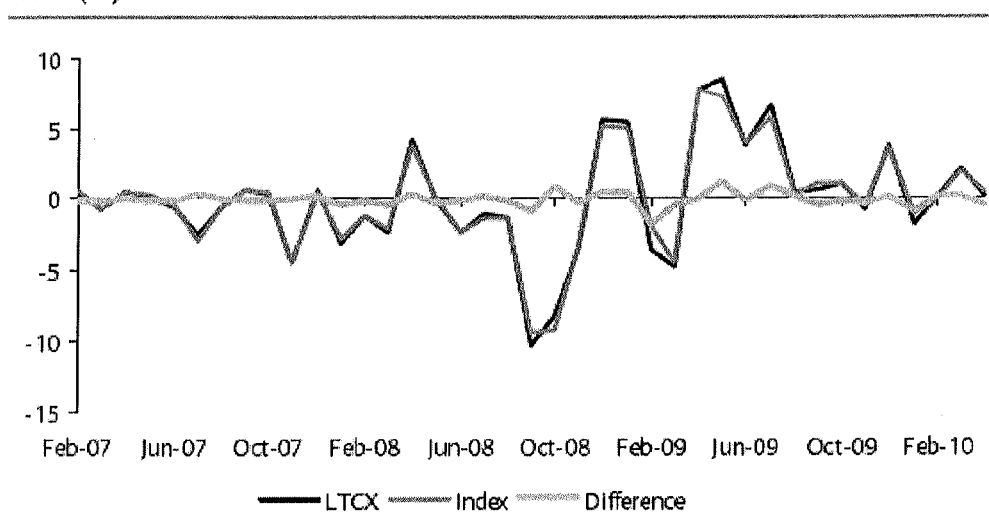
Fig. 86: LTCX and Credit Index Excess Returns (to Treasuries); February 2007-April 2010 (%)
Source: Barclays Capital Fig. 87: Monthly Total Returns, LTCX (with and without Futures Overlay) and Long Credit Index, February 2007 – April 2010 (bp)

|  | LTCX w/o futures overlay | LTCX w/ futures overlay | US Long Credit Index | LTCX w/ overlay - Index |
|---|---|---|---|---|
| Mean | 59.2 | 58.6 | 60.4 | -1.8 |
| Stdev | 409.2 | 408.1 | 394.3 | 52.2 |
| Max | 1,409.9 | 1,407.9 | 1,340.6 | 116.0 |
| Min | -985.5 | -981.3 | -1,089.1 | -167.8 |

All returns are gross of any transactions cost. Source: Barclays Capital

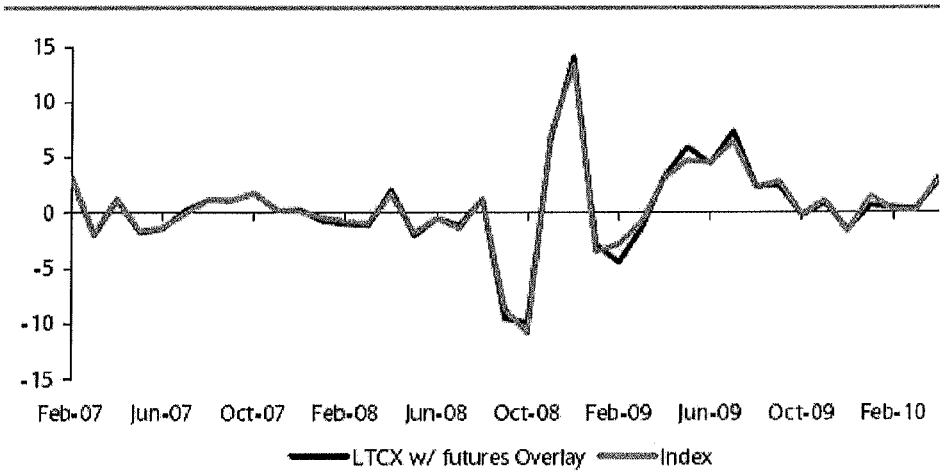
Fig. 88: Monthly Total Returns, LTCX (with Futures Overlay) and Long Credit Index, February 2007 – April 2010 (%)
Source: Barclays Capital Fig. 89 : Monthly Excess Returns (vs. Treasuries), TEV of Excess Returns (vs. Long Credit Index) and Relative LCS, February 2007 – April 2010 (bp)

| | LTCX | V1 | V2 | V3 | Average Q | Credit Index |
|---|---|---|---|---|---|---|
| Mean | 1.1 | -1.0 | 4.4 | 9.7 | 4.4 | 2.3 |
| Stdev | 388.9 | 397.4 | 390.5 | 397.5 | 395.1 | 366.8 |
| TEV (vs. Credit Index) | 50.3 | 57.4 | 49.1 | 57.2 | 54.6 | |
| Relative LCS (beg) | 57% | 57% | 58% | 57% | 57% | |
| Relative LCS (end) | 67% | 74% | 74% | 74% | 74% | |

Source: Barclays Capital

Fig. 90: Turnover and Transactions Cost for LTCX and Three Quarterly LTCX Portfolios, March 2007 – May 2010

| | LTCX | V1 | V2 | V3 | Average Q |
|---|---|---|---|---|---|
| Monthly Cost (bp) | 56.2 | 28.7 | 31.0 | 29.9 | 29.9 |
| Monthly Turnover (%) | 38.9 | 19.7 | 21.3 | 20.4 | 20.5 |

Source: Barclays Capital

Fig. 91: Monthly Excess Returns (to Treasuries) of the Long Credit Index and Long Credit RBI; February 2007 – April 2010 (bp)

|  | Long Credit Index | Long Credit RBI | RBI - Index |
|---|---|---|---|
| Entire Period | | | |
| Mean | 2.3 | 6.7 | 4.4 |
| Stdev | 366.8 | 237.0 | 335.9 |
| Max | 767.6 | 486.0 | 936.9 |
| Min | -946.7 | -531.3 | -637.7 |

All returns are gross of any transactions cost. Source: Barclays Capital

Fig. 92: LTCX, Long Credit Index, and Long Credit RBI Cumulative Excess Returns (to Treasuries); February 2007 – April 2010 (%)
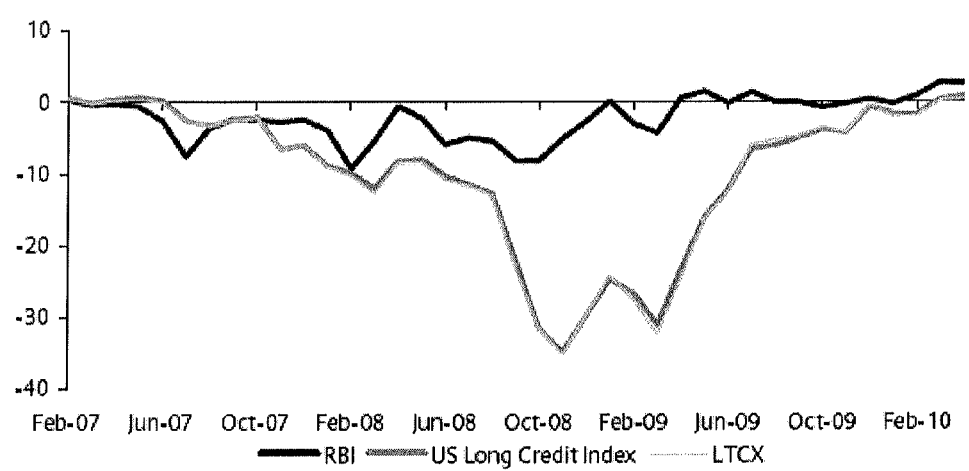
Source: Barclays Capital

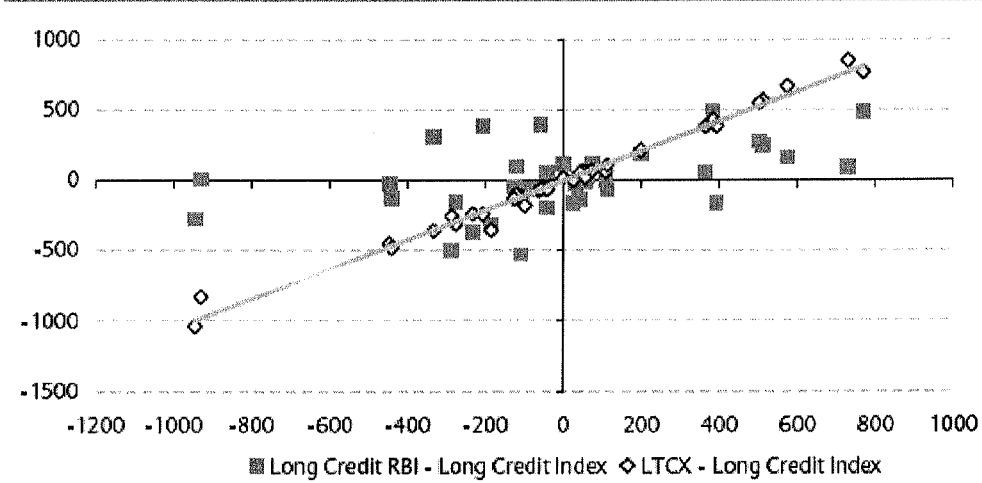
Fig. 93: LTCX and Long Credit RBI Excess Returns versus the Long Credit Index; February 2007 – April 2010 (bp)
Source: Barclays Capital

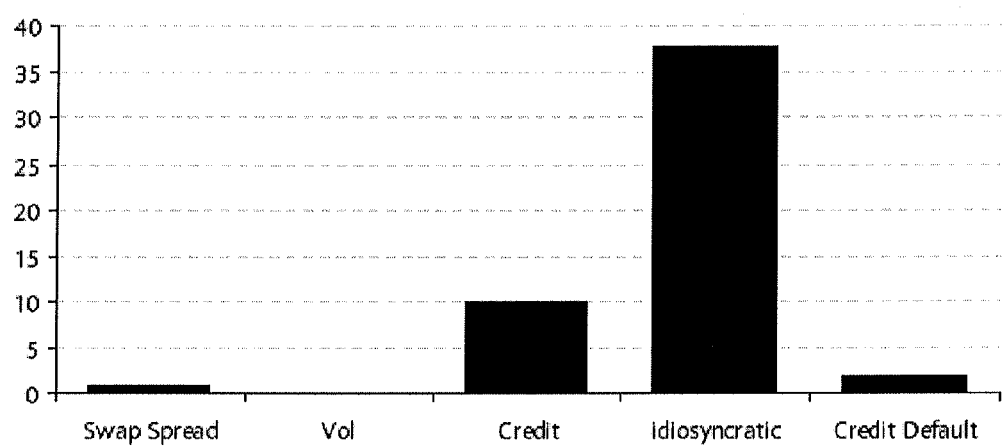
Fig. 94: Contributors to Tracking Error Volatility of the LTCX (with overlay) versus the Long Credit Index; 30 April 2010

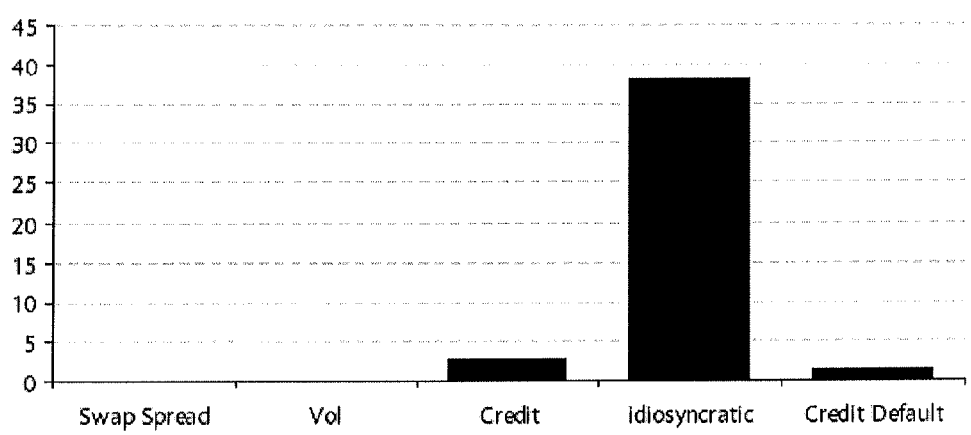
Fig. 95 : Contributors to Tracking Error Volatility of the "Re-Allocated LTCX" versus the Long Credit Index; 30 April 2010

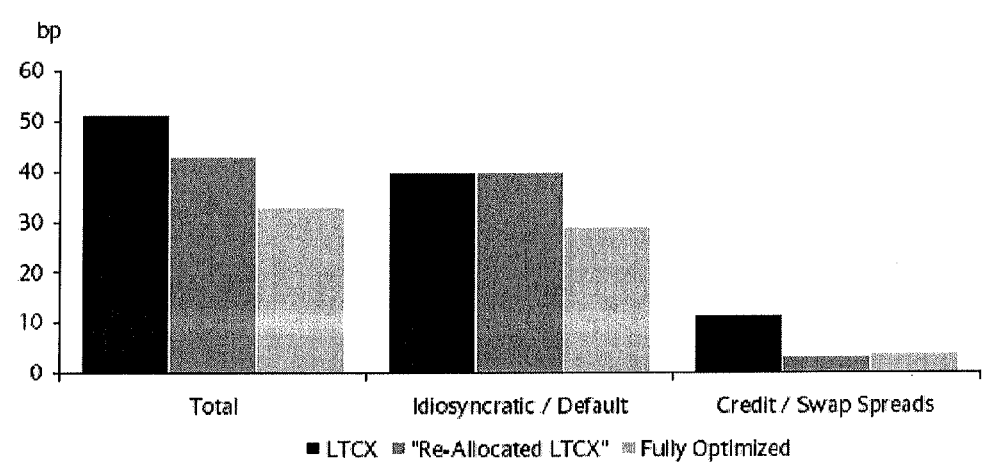
Fig. 96: TEV Comparison between Sampling-based LTCX and Model-based Variants
Source: Barclays Capital

SYSTEMS AND METHODS RELATING TO BOND LIQUIDITY

CROSS REFERENCE TO RELATED APPLICATIONS

This application claims priority to U.S. Provisional Patent Application No. 61/248,205, filed Oct. 2, 2009. The entire contents of that application are incorporated herein by reference.

INTRODUCTION

A bond with a relatively low cost of execution is often referred to as a "liquid" bond. Liquidity has been studied and measured for some time in the equity market. However, data limitations and the sparse nature of the bond markets have prevented much progress in measuring liquidity in the fixed-income markets.

According to certain exemplary embodiments of the present invention, a liquidity cost score (LCS) is determined for one or more bonds, where the LCS represents the round-trip cost, as a percent of the bond's price, of immediately executing a standard institutional transaction. The LCS may be used to measure a bond's liquidity, and may be calculated using bid-ask indications provided by traders.

In at least one embodiment, the difference between the bid and the ask (i.e., the bid-ask spread), multiplied by the spread duration, is used as the basis for measuring bond liquidity. For quoted benchmark bonds, bid-ask indications may be used as the market spread for the bonds. For non-benchmark quoted bonds, the trader's bid-ask indications may be adjusted to arrive at an estimated bid-ask market spread. In this regard, an adjustment factor related to the current dispersion of liquidity in the market, inferred from the bid-ask indications provided by the traders across benchmark and non-benchmark bonds, may be used to adjust the LCS for non-benchmark quoted bonds.

Non-quoted bonds, on the other hand, do not have trader-provided bid-ask indications. Thus, in an exemplary embodiment of the present invention, LCS values for quoted bonds may be used to estimate an LCS model for non-quoted bonds. Such a model may be determined using regression analysis in which attributes of quoted bonds are used as input values. Such attributes may include, for example, trading volume, amount outstanding, non-par priced, age, duration time spread (DTS) value, "benchmark" status, and sector, to name a few. The same attributes of non-quoted bonds may then be input to the model to generate and estimate LCS value for non-quoted bonds. To address potential bias, the estimated LCS of a non-quoted bond may be adjusted by multiplying the regression estimated LCS value by a "non-quoted adjustment factor" to compute a final LCS value.

LCS values may be used in variety of ways. For example, in exemplary embodiments, LCS value may be used to construct "liquid" tracking portfolios, identify cost of liquidity, determine execution strategies and establish liquid credit benchmarks.

Computer systems and related methods are described herein for determining bond liquidity based on bid-ask indications provided by traders. In an exemplary embodiment, a liquidity cost score (LCS) is calculated for one or more bonds, where the calculation is dependent on the characteristics of the bond. For benchmark quoted bonds, the LCS is dependent on the bid-ask indication, and a weighting factor is applied to non-benchmark bonds. For non-quoted bonds, a regression analysis is performed in which attributes of quoted bonds are used as input values to generate an LCS model. Attributes of the non-quoted bonds are plugged into the model to determine LCS values for the non-quoted bonds. An adjustment factor may be used to address bias in calculating the LCS values for the non-quoted bonds.

In one aspect, an embodiment comprises a computer system comprising: (a) a computer readable memory that stores price information for a plurality of bonds; and (b) a processor unit that calculates a liquidity cost score for one or more of said plurality of bonds; wherein said liquidity cost score calculation is based on data regarding quoted bid price and quoted ask price if a bond is a quoted bond, wherein said liquidity cost score calculation is based on a regression analysis if a bond is a non-quoted bond, and wherein said processor unit comprises one or more processors.

In various embodiments: (1) said liquidity cost score calculation is based on data regarding quoted bid price and quoted ask price and further based on an adjustment factor if a bond is a quoted, non-benchmark bond; (2) said liquidity cost score calculation is further based on option adjusted spread duration data, if a quoted bond is a spread-quoted benchmark bond; (3) if a quoted bond is a price-quoted benchmark bond, said liquidity cost score (LCS) is based on a formula equivalent to $$LCS = \frac{\text{Ask price} - \text{Bid price}}{\text{Bid price}};$$

(4) if a quoted bond is a spread-quoted benchmark bond, said liquidity cost score (LCS) is based on a formula equivalent to LCS=(Ask price−Bid price)*OAspread duration− where OSspread duration is option adjusted spread duration; (5) said liquidity cost score calculation is further based on an adjustment factor selected to convert a bid-ask indicative spread to a bid-ask market spread, if a quoted bond is not a benchmark bond; (6) wherein, for non-quoted bonds, said liquidity cost score is calculated using a regression analysis that relates liquidity cost scores for quoted bonds to select bond characteristics; (7) wherein said select bond characteristics comprise one or more of: trading volume; amount outstanding; non-par priced; and age; (8) said select bond characteristics comprise one or more of: duration times spread; option adjusted spread; benchmark status; and sector; (9) calculation of said liquidity score for said non-quoted bonds further comprises multiplication by a non-quoted adjustment factor; (10) said regression analysis is tested using out-of-sample testing; (11) said out-of-sample testing comprises calculating non-quoted liquidity cost scores for quoted bonds and then comparing said non-quoted liquidity cost scores to liquidity cost scores based on quoted data for said quoted bonds; (12) said out-of-sample testing comprises calculating non-quoted liquidity cost scores for bonds in months in which when said bonds are non-quoted and then comparing said non-quoted liquidity cost scores to liquidity cost scores based on quoted data for months in which said bonds are quoted; (13) said out-of-sample testing comprises comparing non-quoted liquidity cost scores for non-quoted bonds to subjective liquidity rankings provided by traders; (14) benchmark bonds comprise bonds having a trading volume above a specified threshold; and (15) benchmark bonds comprise on-the-run bonds.

In another aspect, an embodiment comprises a computer system comprising: (a) an electronic computer readable memory that stores price information for a plurality of bonds; and (b) a processor unit that selects bonds to be included in a bond portfolio; wherein said bonds are selected based on a bond liquidity cost score calculation, and wherein said processor unit comprises one or more processors.

In various embodiments: (1) bonds to be included in said portfolio are selected from an index portfolio; (2) said bonds are selected based on how each bond's liquidity cost score compares to a liquidity cost score for said index portfolio; and (3) said bonds are rebalanced based on how each bond's liquidity cost score compares to a liquidity cost score for said index portfolio.

In another aspect, an embodiment comprises a computer system comprising: (1) an electronic computer readable memory that stores price and option adjusted spread information for a plurality of bonds; and (2) a processor unit that decomposes an option adjusted spread for a bond into a plurality of components based on a liquidity cost score, wherein said processor unit comprises one or more processors.

In various embodiments: (1) said plurality of components comprise default and liquidity components; (2) said plurality of components comprise a market-level risk premium, an expected loss from default, and expected liquidity cost; (3) said plurality of components comprise a market-level risk premium, an expected loss from default, an expected liquidity cost, and volatility in liquidity cost; (4) expected liquidity cost is based on a liquidity cost score; (5) expected default cost is based on a credit default swap; (6) expected default cost is based on a conditional recovery rate; and (7) expected default cost is based on a corporate default probability.

In another aspect, an embodiment comprises a computer system comprising: (1) an electronic computer readable memory that stores price information for a plurality of bonds; and (2) a processor unit that selects bonds to be included in a tradable credit portfolio intended to track performance of a credit index; wherein said bonds are associated with said credit index and selected based on a bond liquidity cost score calculation, and wherein said processor unit comprises one or more processors.

In various embodiments: (1) each selected bond is selected from a sector duration bucket associated with a range of liquidity cost scores; (2) said processor unit calculates a mean duration time spread for each sector bucket; and (3) said processing unit selects two bonds from each sector bucket.

Other aspects and embodiments comprises corresponding methods and software.

These and other features of this invention are described in, or will be apparent from, the following detailed description of certain exemplary embodiments of this invention.

BRIEF DESCRIPTION OF THE DRAWINGS

FIG. 1 is a graph depicting exemplary index liquidity cost scores.

FIG. 2 comprises two graphs depicting exemplary distribution of LCS scores for the IG Index.

FIG. 3 comprises two graphs depicting exemplary distribution of LCS scores by various sectors.

FIG. 4 is a graph depicting exemplary average LCS by quintile.

FIG. 5 is a graph depicting exemplary net LCS difference and cumulative excess return.

FIG. 6 comprises two graphs depicting exemplary relationships between LCS and TED Spread, and LCS and VIX.

FIG. 7 depicts a sample Bloomberg message screen used by traders to communicate bid-ask indications.

FIG. 8 depicts exemplary composition of trader-quoted and non-trader-quoted subsets of the Barclays Capital US IG Credit Index.

FIG. 9 comprises a schematic regarding exemplary estimation of LCS.

FIG. 10 displays exemplary LCS results for quoted LOW bonds.

FIG. 11 displays exemplary data regarding relationships between LCS and issue size and age.

FIG. 12 displays exemplary data regarding relationships between LCS and OAS and DTS.

FIGS. 13 and 14 display exemplary data regarding relationships between LCS and trading volume.

FIG. 15 displays exemplary data regarding regression of LCS on bond attributes.

FIG. 16 displays exemplary data regarding comparison of quoted and non-quoted bond universes.

FIG. 17 displays exemplary data regarding estimated LCS for five non-quoted LOW bonds.

FIGS. 18-20 display exemplary data regarding out-of-sample testing.

FIG. 21 displays exemplary data regarding comparison of LCS and 1-2-3 ranks by traders.

FIG. 22 depicts exemplary distribution of LCS across different rank categories.

FIG. 23 displays exemplary data regarding comparison of LCS and 1-2-3 ranks—trader-quoted versus LCS-modeled.

FIG. 24 depicts exemplary data regarding LCS persistence.

FIG. 25 depicts exemplary transition matrices for LCS-sorted portfolios.

FIGS. 26 and 27 depict exemplary data regarding bond-level LCS.

FIG. 28 comprises an exemplary screenshot for a display comprising bond-level LCS data.

FIG. 29 is a graph of exemplary data regarding monthly estimated TEV versus IG index.

FIG. 30 is a graph of exemplary data regarding portfolio and index-level LCS.

FIG. 31 comprises three graphs regarding exemplary TEV details for Portfolios A, B, and C.

FIG. 32 displays exemplary data regarding excess return performance versus Index, for Portfolios A, B, and C.

FIG. 33 comprises a graph depicting exemplary data regarding cumulative excess return difference and LCS for Portfolio C versus Portfolio B.

FIG. 34 comprises a graph depicting exemplary data regarding turnover of Portfolios A, B, and C.

FIG. 35 comprises a graph depicting exemplary data regarding OAS and CDS spread for a KFT bond.

FIG. 36 comprises a graph depicting exemplary data regarding LCS for the KFT bond.

FIG. 37 comprises a graph depicting exemplary data regarding spread decomposition for the KFT bond.

FIG. 38 comprises a graph depicting exemplary data regarding liquidity contribution—consumer and financial sectors.

FIG. 39 comprises a graph depicting exemplary data regarding default contribution—consumer and financial sectors.

FIG. 40 displays exemplary data regarding investment grade bonds—regression of OAS on CDS spreads and LCS.

FIG. 41 comprises a graph depicting exemplary data regarding sector-wise spread decomposition—default and liquidity contributions.

FIG. 42 displays exemplary data regarding investment grade bonds only regression of OAS on CDS and LCS.

FIG. 43 comprises a graph depicting exemplary data regarding contributions of risk premium, default, and liquidity components to market OAS level.

FIG. 44 comprises a graph depicting exemplary data regarding share of OAS of market, default, and liquidity components.

FIG. 45 comprises a graph depicting exemplary data regarding sector-wise decomposition—default and liquidity contributions.

FIG. 46 comprises a graph depicting exemplary data regarding investment grade bonds—coefficient($\beta$) of residual and confidence intervals for various OAS change horizons.

FIG. 47 displays exemplary data regarding portfolio constituents and weights using spread decomposition regression and a risk model.

FIG. 48 displays exemplary data regarding long-short portfolio performance using spread decomposition and a risk model.

FIG. 49 comprises a graph depicting exemplary data regarding returns of hedged and unhedged portfolios.

FIG. 50 displays exemplary data regarding statistics of hedge performance.

FIGS. 51-56 display exemplary data regarding various regressions related to OAS and LCS.

FIG. 57 displays an exemplary TCX portfolio composition.

FIG. 58 displays exemplary data regarding number of issuers in TCX.

FIG. 59 displays exemplary data regarding average LCS for TCX and Credit Index.

FIG. 60 displays exemplary data regarding cross-section LCS distribution, TCX and Credit Index.

FIG. 61 displays exemplary data regarding Yield to Worst, TCX and Credit Index.

FIG. 62 displays exemplary data regarding monthly DTS, TCX and Credit Index.

FIG. 63 displays exemplary data regarding monthly OAD, TCX and Credit Index.

FIG. 64 displays exemplary data regarding monthly excess returns (to Treasuries) of the TCX and Credit Index.

FIG. 65 displays exemplary data regarding TCX and Credit Index excess returns (to Treasuries).

FIG. 66 displays exemplary data regarding difference in TCX and Credit Index excess returns (to Treasuries).

FIG. 67 displays exemplary data regarding cumulative excess return difference in TCX and Credit Index.

FIG. 68 displays exemplary data regarding monthly total returns, TCX (with and without Futures Overlay) and Credit Index.

FIG. 69 displays exemplary data regarding monthly total returns, TCX (with Futures Overlay) and Credit Index.

FIG. 70 displays exemplary data regarding monthly TCX turnover.

FIG. 71 displays exemplary data regarding monthly TCX transaction costs.

FIG. 72 displays exemplary data regarding monthly excess returns (versus Treasuries), TEV of excess returns (versus Credit Index) and Relative LCS, TCX, and three quarterly TCX portfolios.

FIG. 73 displays exemplary data regarding turnover for quarterly TCX, three TCX portfolios.

FIG. 74 displays exemplary data regarding transaction costs for TCX and three quarterly TCX portfolios.

FIG. 75 displays exemplary data regarding monthly excess returns (to Treasuries) of the Credit Index and Credit RBI.

FIG. 76 displays exemplary data regarding TCX, Credit Index, and Credit RBI cumulative excess returns (to Treasuries).

FIG. 77 displays exemplary data regarding TCX and Credit RBI excess returns versus the Credit Index.

FIG. 78 displays exemplary data regarding cumulative Credit Index and Credit RBI excess returns (to Treasuries).

FIG. 79 displays exemplary data regarding exemplary LTCX portfolio composition.

FIG. 80 displays exemplary data regarding number of different issuers in LTCX.

FIG. 81 displays exemplary data regarding average LCS, LTCX, and Long Credit Index.

FIG. 82 displays exemplary data regarding cross-sectional LCS distribution, LTCX and Long Credit Index.

FIG. 83 displays exemplary data regarding monthly DTS, LTCX and Long Credit Index.

FIG. 84 displays exemplary data regarding monthly OAD, LTCX and Long Credit Index.

FIG. 85 displays exemplary data regarding monthly excess returns (to Treasuries) of the LTCX and Long Credit Index.

FIG. 86 displays exemplary data regarding LTCX and Credit Index excess returns (to Treasuries).

FIG. 87 displays exemplary data regarding monthly total returns, LTCX (with and without futures overlay) and Long Credit Index.

FIG. 88 displays exemplary data regarding monthly total returns, LTCX (with futures overlay) and Long Credit Index.

FIG. 89 displays exemplary data regarding monthly excess returns (versus Treasuries), TEV of excess returns (versus Long Credit Index) and relative LCS.

FIG. 90 displays exemplary data regarding turnover and transactions cost for LTCX and three quarterly LTCX portfolios.

FIG. 91 displays exemplary data regarding monthly excess returns (to Treasuries) of the Long Credit Index and Long Credit RBI.

FIG. 92 displays exemplary data regarding LTCX, Long Credit Index, and Long Credit RBI cumulative excess returns (to Treasuries).

FIG. 93 displays exemplary data regarding LTCX and Long Credit RBI excess returns versus the Long Credit Index.

FIG. 94 displays exemplary data regarding contributors to tracking error volatility (TEV) of LCTX (with overlay) versus the Long Credit Index.

FIG. 95 displays exemplary data regarding contributors to tracking error volatility (TEV) of a re-allocated LCTX versus the Long Credit Index.

FIG. 96 displays exemplary data regarding a TEV comparison between sampling-based LCTX and model-based variants.

DETAILED DESCRIPTION OF CERTAIN EXEMPLARY EMBODIMENTS

Figure 97:
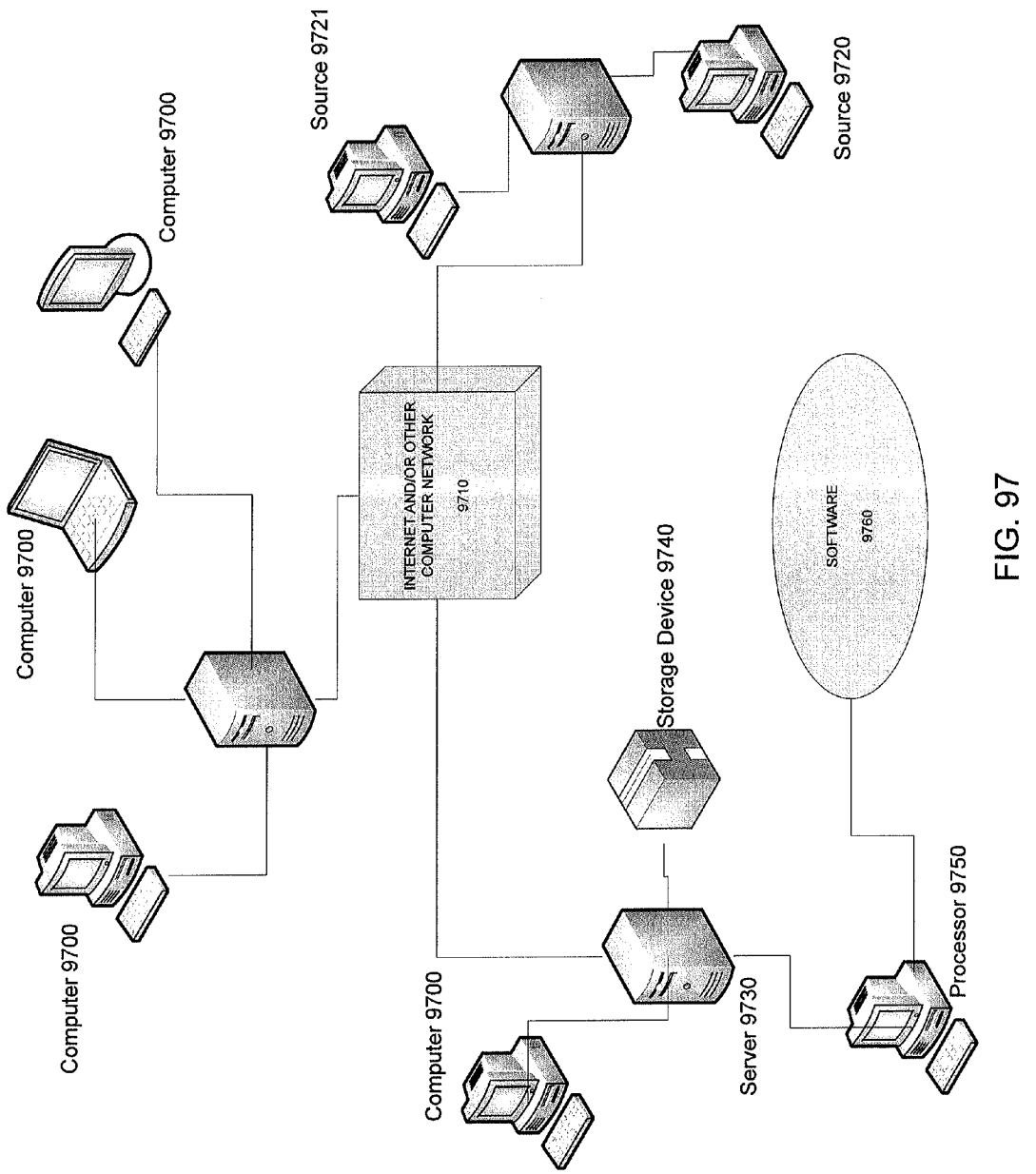
FIG. 97 depicts an exemplary computer system configured to implement one or more exemplary embodiments.

In one or more exemplary embodiments:

(1) Trader bid-ask spread data is used to estimate monthly bond-level liquidity cost scores for all issues in a given group of bonds (for example, the Barclays Capital US Investment Grade and High Yield Indices).

(2) A bond's LCS measures the cost (in basis points) of immediately executing a round-trip transaction for a standard institutional trade.

(3) LCS may be made available to investors, enabling them to use these objective liquidity measures in their portfolio management activities.

(4) LCS can be used in a variety of portfolio management applications: constructing portfolios with various target levels of liquidity to take views on changes in market liquidity, designing optimal execution strategies for portfolio transitions, and designing custom credit benchmarks.
(5) LCS may be extended to cover other asset classes including MBS, Treasuries, and non-dollar bonds.

In an exemplary embodiment, a Liquidity Cost Score (LCS) is used to measure bond-level liquidity. LCS may be measured in return units (percentage points) and represents the transaction cost to execute an instantaneous round-turn institutional trade for a bond. Monthly LCS values for all bonds in a group may be produced (such groups, include, for example, the Barclays Capital Investment Grade and High Yield Credit Indices). LCS may be aggregated across bonds to compute portfolio-level and index-level LCS.

In an exemplary embodiment, LCS may be computed using bid-ask indications (such as, for example, those provided by Barclays Capital traders to clients through Bloomberg). The difference between the bid and the ask (i.e., the bid-ask spread), multiplied by the spread duration of the bond, may be used as the basis for measuring bond liquidity. While this measure does not directly incorporate the market impact (either positive or negative) of large trades, analysis indicates that bid-ask spreads are likely to be highly positively correlated with market impact costs.

Traders regularly provide bid-ask indicative quotes for much of the U.S. credit universe. For other bonds, the LCS model may be used to estimate the bid-ask spread. Bid-ask indications are not bid-ask markets. For bonds with high trading volume and/or on-the-run status—so-called benchmark bonds (about 40% of the quoted universe)—one may treat bid-ask indications as the market spread for the bonds. For other quoted bonds, one may adjust the traders' bid-ask indications to arrive at an estimated bid-ask market spread.

For non-quoted bonds, one may estimate LCS by examining how the LCS for quoted bonds varies with bond-level attributes such as age, trading volume, issue size, DTS, and OAS (option-adjusted spread). One may use regression to estimate the bid-ask indications of non-quoted bonds, after separating the non-quoted universe into price and spread-quoted bonds. Non-quoted bonds are inherently less liquid than quoted bonds and, thus, one may further adjust the estimated bid-ask indications for non-quoted bonds before producing a final LCS value.

Since much of the LCS universe is modeled (i.e., the bonds are not trader-quoted during the month), it is important to test the efficacy of the LCS model in regard to out-of-sample performance. Because these quotes are not observable, even ex-post, unlike other estimation situations, three exemplary out-of-sample tests are useful:
(1) Assume that about 10% of a quoted sample has not been quoted and estimate the LCS of those bonds using the model. Then compare the results of the model with the actual LCS based on trader quotes and check that the estimation errors are small.
(2) Suppose that in month A, two bonds of the same issuer, one quoted and one non-quoted (hence, its LCS is modeled), have similar LCS values. In a subsequent month B, one would expect the bonds to have similar LCS values when both are quoted (or both are not quoted), apart from special situations such as when an on-the-run bond becomes off-the-run. This shows that LCS values are consistent across the issues of a given issuer, irrespective of which issues are quoted and non-quoted.
(3) Finally, use data from an independent poll of traders for their subjective assessment of liquidity levels for a subset of, say, 200 bonds. This subjective liquidity study may be conducted completely separate from the LCS effort. Check that LCS values correspond closely to these bond-level trader liquidity estimates. This builds confidence that the objective liquidity measure corresponds well with subjective liquidity assessments by traders.

Results of such exemplary studies are provided below. Time series and cross-sectional LCS data back to January 2007 are provided. In these studies, LCS displays expected behavior over time and across sectors. At the index level, LCS is highly correlated with other measures of market liquidity such as VIX and the TED spread. Interestingly, despite the strong performance of the credit sector and the return of the VIX and the TED spread to lower levels, LCS indicates that the credit market has some way to go to return to a "normal" liquidity environment—indicating, perhaps, a structural shift in the competitive structure of the credit markets.

One also may measure the persistence of a bond's relative liquidity ranking over time. Below it is shown, using transition matrices, that LCS is fairly persistent, indicating that pools of relatively liquid bonds remain relatively liquid across regimes. However, in volatile markets, the standard deviation of bond-level LCS increases a lot within these pools, suggesting that a targeted LCS portfolio will exhibit high turnover.

One may also examine excess return (over US Treasury (UST)) performance of bonds with various degrees of liquidity by, for example, sorting index bonds into liquidity quintiles and showing their relative excess return performance over time. The relative outperformance of low LCS (i.e., very liquid) quintiles versus high LCS quintiles was dramatic during the 2007-2008 liquidity crisis.

One also may examine the covariance of a bond's LCS and its excess returns. Changes in LCS and excess returns are likely to be contemporaneously negatively correlated, suggesting that decreases in liquidity (i.e., increase in LCS) and decreases in excess return happen in the same period. A bond's LCS level is positively related to its next-period excess returns, indicating that less liquid bonds earn higher returns, suggesting that the market at least partially prices illiquidity (or something correlated to it).

To explore the usefulness of LCS in optimal portfolio construction, one may conduct a "horse race" between three portfolios from, say, January 2007 to June 2009. All three, in this example, aim to minimize their tracking error relative to the Barclays Capital IG Credit Index, but differ in their liquidity attributes. Portfolio A is unconstrained, Portfolio B is constrained using traditional liquidity measures (e.g., issue size and age), and portfolio C is constrained to have its LCS no greater than 70% of the LCS of the Barclays Capital IG Credit Index. As assessed by the Barclays Capital Risk Model, all three portfolios have low expected TEV (tracking error volatility) versus the index. However, by the time of the peak in market illiquidity in December 2008, Portfolio C had, on a cumulative basis, outperformed Portfolio A (unconstrained) by approximately 200 bp and Portfolio B by almost 350 bp. Unfortunately, Portfolio C undergoes high turnover to meet its LCS constraint in a few months and surrenders much of this outperformance in additional transactions costs.

Liquidity cost scores for U.S. Credit Bonds

Portfolios are dynamic creatures. Portfolio constituents are constantly changing in reaction to shifting market views, investor inflows and outflows, and external events. For portfolio managers and traders, managing this dynamic process is a challenging aspect of their jobs. To generate alpha, a manager must not only originate and implement a set of views, but must also efficiently adjust the portfolio to capitalize on changes in these views. A manager must also be prepared to adjust the portfolio to accommodate client demands. All portfolio managers and traders have developed intuition regarding the trade-off between the dollar cost of execution and the opportunity cost of not executing a trade to better reflect views and client demands.

A bond with a relatively low cost of execution is often referred to as a "liquid" bond. Although all portfolio managers, traders, and risk managers appreciate the importance of "liquidity," they struggle when trying to define the term. As those skilled in the art understand, the term liquidity can mean different things to different participants depending on the portfolio objective, the market environment, and the nature of the underlying asset. In essence, however, liquidity refers to how efficiently a portfolio's dynamism can be managed. LCS offers investors an objective measure of bond-level liquidity.

Although liquidity has been studied and measured for some time in the equity market, factors such as data limitations and the sparse nature of the bond markets have prevented much progress in measuring liquidity in the fixed-income markets. While bond-level trading volume data have become available in recent years, bonds that do not trade are not necessarily illiquid; conversely, bonds that trade are not necessarily liquid (e.g., forced selling of IG bonds when they are downgraded).

An exemplary embodiment measures bond-level liquidity (LCS) based on a bond's bid-ask spread; lower LCS denotes higher liquidity. Despite the multitude of possible fixed-income liquidity definitions, an exemplary embodiment defines liquidity based on a bond's bid-ask spread for at least two reasons.

First, good quality, synchronized bond-level bid-ask spread indications for institutional-level trades are available. LCS seeks to convert bid-ask indications to bid-ask markets in order to properly measure the bid-ask spread faced by portfolio managers.

Second, although measuring market impact, for example, would be useful, many market participants believe that bid-ask spread and other liquidity measures, such as market impact measures, are likely to be highly correlated.

Portfolio managers, plan sponsors, and researchers may find LCS useful in a number of ways:

1. Construction of "liquid" tracking portfolios: A manager who wants a high level of transactional flexibility can use LCS as a filter to identify bonds for a portfolio. Such a portfolio can be used either to capitalize on views of changes in market liquidity or to assure investors of an ability to liquidate the portfolio in times of liquidity constraints.

2. Identify cost of liquidity: LCS may be used to disentangle the portion of a bond's expected excess return due to liquidity risk and credit risk. This would facilitate hedging, as the two risks can be hedged using different instruments (e.g., VIX futures for liquidity and CDS for credit risk).

3. Execution strategies: LCS allows investors to monitor the relative liquidity behavior of bonds over time. During times of illiquidity, do bonds with high LCS perform much worse than bonds with low LCS? If so, then a strategy of selling illiquid bonds at the beginning of a liquidity crisis may be more productive than selling liquid bonds first.

4. Liquid credit benchmarks: Plan sponsors may also use LCS to construct custom liquid credit benchmarks as mandates for their credit managers.

Liquidity Cost Scores (LCS)

As described in further detail below, an exemplary embodiment measures a bond's liquidity cost score (LCS) using trader bid-ask indications. These indications may be used to estimate a bid-ask market and then calculate the LCS, which is the bond's OASD multiplied by the spread. Consequently, a bond's LCS can be interpreted as the cost, in percentage points, of immediately executing a round-trip transaction.

Before an exemplary LCS calculation is discussed, it is helpful to present an exemplary aggregated LCS (using market value weights) for investment grade and high yield indices. FIG. 1 shows a time series of liquidity of the Barclays Capital Credit Investment Grade and High Yield Indices (hereafter referred to as the IG Index and the HY Index) since January 2007 (in this example, the earliest month for LCS values). As shown, LCS for both IG and HY have behaved as expected during different liquidity regimes.

Referring to FIG. 1, since January 2007, the LCS for the IG Index has ranged from 0.59 to 3.40 (LCS in this example is measured in percentage points). Although the recent spike in illiquidity that occurred in October 2008 is painfully clear, it is notable that the index's LCS doubled between June 2007 and September 2007 as the credit crisis began its early stages. The LCS for the HY Index, while always greater at the index level than that of the IG Index, suffered a dramatic widening in its relative LCS. Since LCS in this case is measured in basis points, the absolute difference in LCS is what is relevant to portfolio managers.

As shown in FIG. 1, the relative LCS for the HY Index was approximately 40 bp greater than that for the IG Index at the beginning of 2007. However, by the end of 2008, the gap had widened to more than 400 bp. The LCS distribution for bonds became far more dispersed with the onset of the credit crisis; the wide dispersion in bond-level LCS persists.

Although the increase in illiquidity over the past few years is widely known, what is perhaps not known is the change in the distribution of LCS across bonds. The left panel of FIG. 2 shows the frequency distribution of LCS scores for all bonds in the IG Index as of January 2007, November 2008, and June 2009. The graphs for the HY Index are similar. The panel on the right in FIG. 2 shows the cumulative distribution.

Referring to FIG. 2: the LCS distribution for IG bonds in January 2007 is very concentrated around the mean of 0.59. However, note what happened to the distribution by November 2008: not only did the mean LCS score increase to 3.40, but the distribution had a large standard deviation. Interestingly, despite the improvement in LCS by June 2009 (mean LCS=1.97) and claims of "normality" returning to the credit markets, the distribution remained widely dispersed, suggesting that the credit markets still had far to go in order to return to the January 2007 environment.

The LCS time series of different sectors have co-moved, but some sectors have seen far larger movements than others.

One can also use LCS to calculate sector-level LCS. FIG. 3 shows the time series of sector LCS for both IG and HY. Although all sectors experienced reduced liquidity over the past two years, some sectors (IG financial subs and HY financial seniors) experienced a greater deterioration in liquidity than other sectors (IG industrial seniors and HY energy).

It is also instructive to sort the IG Index into its LCS quintiles. For example, each month, the bonds in the index may be ranked by LCS, and bonds are placed in quintiles containing equal numbers of bonds. So Quintile #1 has the 20% of index bonds with the lowest LCS while Quintile #5 has the 20% of bonds with the highest LCS. Consequently, as time passes, the specific bonds in each quintile can change. FIG. 4 shows the average LCS by quintile since January 2007. The deterioration in liquidity was not even; the higher the quintile, the greater the deterioration in LCS as overall market liquidity deteriorated.

It is natural to imagine that a bond's LCS and its excess returns (versus UST) are related. At a minimum, a high LCS will likely lead potential buyers to demand a lower price (higher yield) before purchasing the bond to cover the cost of the transaction. The higher yield should lead to a greater excess return for buy-and-hold investors.

Also, if there is a relationship between a bond's LCS and the risk that its LCS can change sharply over time (i.e., liquidity risk), then one might also expect that investors will demand lower prices (higher yields)—a so-called liquidity premium—to invest in relatively high LCS bonds. More liquid bonds outperformed less liquid bonds as the liquidity crisis unfolded.

The excess return performance of the various quintiles as the credit liquidity crisis unfolded was examined. FIG. 5 shows the relative excess return performance of Quintile #4 versus Quintile #1, as well as the net LCS difference between the two quintiles. Although the results are more dramatic when comparing Quintile #5 with Quintile #1, using Quintile #4 as the basis for comparison avoids any idiosyncratic issues associated with the bonds in Quintile #5.

Referring to FIG. 5, as Quintile #4's LCS deteriorated compared with Quintile #1, it also suffered worse excess returns. From January 2007 to December 2008, the LCS for Quintile #4 increased by 3.50 versus Quintile #1 and suffered almost a 14% cumulative worse excess return. The deterioration in relative excess return performance for Quintile #4 began in mid-2007 as market liquidity began to decline. Since March 2009, the performance of Quintile #4 has improved significantly relative to Quintile #1, coinciding with the relative improvement in Q4's LCS versus Quintile #1.

At this point, one cannot conclude that Quintile #4's relative performance was tied directly to its relative LCS as the market became more or less liquid. This is because a bond's LCS is also closely related to its credit risk (DTS and OAS). As the market's liquidity deteriorated, so did the perception of creditworthiness. How much of Quintile #4's 2008 underperformance was due to liquidity and how much was due to heightened credit risk? Once one has liquidity cost scores, one can attempt to disentangle credit risk and liquidity risk as drivers of bond excess returns.

LCS has moved in tandem with other market measures of aggregate liquidity—VIX and TED spread (see below). While these other measures suggest a big improvement in liquidity as early as December 2008, LCS indicates improvement only since April 2009.

Finally, one may examine how LCS is related to other indicators of market liquidity used by portfolio managers. For example, the TED spread (short-term Eurodollar deposit rates minus Treasury bill rates) and VIX (volatility index) are common indirect measures of market liquidity. FIG. 6 shows the relationship between the LCS for the IG Credit Index and the TED spread and VIX.

The VIX shows a close relationship with LCS (correlation=0.91), confirming the intuition of many portfolio managers and traders that the VIX, despite being a measure of implied volatility in equity markets, might be a good hedging tool for market illiquidity. In contrast, the TED spread, which a priori might be considered a more direct measure of illiquidity in fixed-income markets, seems less closely correlated (correlation=0.45). However, the clear breakdown in the TED spread correlation during October 2008-January 2009 may be more related to the widely reported problems in LIBOR measurement during that period or the large change in the slope of the LIBOR curve as a result of the policies pursued by various central banks. LCS is a measure of round-trip transaction cost; lower LCS implies better liquidity.

Liquidity Cost Scores—Exemplary Methodology

An exemplary definition of a bond's liquidity is its bid-ask spread as a fraction of bid price. Specifically, one may define a bond's liquidity cost score (LCS) as follows:

LCS=Bid−Ask spread*$OA$spread duration, if bond is spread-quoted, and $$LCS = \frac{\text{Ask price} - \text{Bid price}}{\text{Bid price}},$$

if bond is price-quoted.

In this exemplary embodiment, a bond's LCS represents the round-trip cost, as a percent of the bond's price, of immediately executing a standard institutional transaction. So according to this definition, a higher LCS value represents less liquidity. For example, an LCS value of 2.00 indicates that it would cost the manager 2% of the bond's value to execute a round-trip transaction (e.g., buy, then sell, the bond) for a "normal" size transaction amount (e.g., $3-5 mn par).

One may obtain bond-level bid-ask spread indications (or ask price-bid price indications if the bond is quoted on price) for bonds in the Barclays Capital US IG and HY Indices from messages that traders regularly send to clients. A sample message is presented in FIG. 7.

Barclays Capital is a major and longstanding participant in the U.S. cash credit markets with a strong reputation as a leader in credit sales, research, and trading. Barclays Capital is also a counterparty to most of the world's largest institutional credit market investors. As a result, Barclays Capital's messages are followed closely by a wide audience, which helps the quality of the LCS values. In addition, these messages have been collected, parsed, and stored by the Barclays Capital Index Production Team as part of its normal index price verification processes. Given the close scrutiny of the Barclays Capital Family of Indices and the care given to pricing, the Index Production team has developed procedures to capture trader bid-ask indications and rigorous parsing algorithms to match a bond's indication to its Cusip. Over the past several years, the Index Production group has collected more than seven million bid-ask spread quotes and continues to do so. In this example, messages sent out by Barclays Capital traders may be parsed to obtain bid-ask quotes.

In an exemplary embodiment, LCS starts with Cusip-level indications and passes them through several additional filtering processes to produce a database of bond-level bid and ask spread indications (or bid and ask prices), along with other bond-level indicative information. Some bonds may have multiple quotes per day, while others may have quotes only once or twice a month. For each month, one may collect trader bid-ask quotes for bonds belonging, for example, to either the Barclays Capital US Credit or High Yield Indices. In a given month, for each Cusip, one may first average any multiple LCS values in a day to generate a daily value and then average across all days in a given month to produce a monthly average LCS.

There are many pros and cons to these data. First, a nice feature of trader indications is their simultaneity. Although it is possible to capture transaction spread data (e.g., via TRACE) (and there is now an indication in the transaction record of whether it is a broker/dealer sell or buy transaction), for most bonds, the time between a broker/dealer buy and sell transaction for a given Cusip can be very long, which makes calculating an accurate bid-ask spread using TRACE difficult (although it can be done, and the invention comprises embodiments that use TRACE).

A drawback of trader indications is that a bond's bid-ask spread may not be the "market's" best bid-ask spread. For example, while a trader may indicate +180/+160 for a bond, another broker/dealer may indicate +170/+150. Consequently, if there is a search across broker/dealers, the investor would face a +170/+160 effective market, indicating better liquidity than that suggested by the indication by itself. So to some extent, in certain embodiments, LCS may overstate bond liquidity costs. However, given that the indication represents where a trader thinks the bond would trade in the market, these indications are a good representation of the bid-ask spread that an investor would face.

Another limitation of bid-ask indications is the potential that they could be influenced by a trader's outlook or inventory of the bonds. This is reasonable. If a trader were temporarily long inventory of a particular bond, then the trader may quote the bond with a tighter spread (i.e., a higher offered spread) to entice a bid, and vice versa. Unfortunately, this tighter bid-ask spread reflects a trader's position, not necessarily better inherent liquidity in the bond. To try to mitigate the effect of temporary trader positions on the quoted bid-ask spread, one may first average a bond's bid-ask spread indications over an entire month to produce a single monthly bid-ask indication for a Cusip.

Trader quotes for "on-the-run" or very high volume bonds are assumed to be executable; other quotes are adjusted to convert bid-ask indications to potentially transactable bid-ask markets.

A more fundamental weakness in the data is that trader messages provide recipients with bid-ask indications, not necessarily live, transactable, two-way markets. While live two-way transactable markets would be more desirable in measuring LCS, such data are severely limited in the cash credit markets (unlike the equity and foreign exchange markets). Since the goal of an exemplary embodiment of LCS is to measure the round-turn transaction cost that a portfolio manager would face, the LCS method needs to check that a bid-ask indication is a realistic bid-ask market. If not, LCS adjusts the bid-ask indication to make it more representative of a bid-ask market.

To see how such a situation can arise, consider a bond issued long ago, with little or no trading volume (as reported on TRACE). Although the issuer of this bond may have other bonds of comparable maturity with active two-way markets, the seasoned bond will likely have lower trading activity. In particular, given the low trading activity, a trader would be reticent to make a market on the seasoned bond ("I have not seen that bond trade in months"). While the trader may be willing to buy such a bond at a slightly wider bid spread than the new issue bond, the trader, who is unlikely to have the bond in inventory, will not offer the bond unless there significant tightening in spread to give the trader some room to entice holders to sell the bond. In such situations, a trader may indicate that this bond should trade with a somewhat wider bid-ask spread than the new issue. This indication is more of a theoretical representation of where the bond should trade. This indicative quote is usually tighter than a binding quote for the same bond, since traders often provide indicative quotes to generate inquiries (which provide the trader with information). In reality, however, the bid-ask market for the seasoned bond faced by a portfolio manager will be considerably wider than the new issue.

Some trader bid-ask indications are likely to be closer to a bond's bid-ask market than others. For example, a trader's indication for an actively traded "benchmark" bond is likely to be close to the bond's market. In contrast, the indication for a less actively traded, non-benchmark bond is likely to be more a theoretical indication of where the bond might trade, but not where the trader is willing to buy and sell. In practice, the trader would bid and offer the bond only at a wider spread.

LCS Credit Market Segmentation

For June 2009, about one-third of the index is quoted by traders; about 60% of the quotes (non-benchmarks) are adjusted to reflect bid-ask markets; two-thirds of the index needs to be modeled.

To estimate bid-ask markets from traders' bid-ask indications, an exemplary embodiment of LCS takes the following approach. First, LCS distinguishes between trader-quoted and non-quoted bonds. Trader-quoted bonds are those for which there are at least two bid-ask spread indications during a month. Non-quoted bonds have one or no indications during a month. For quoted bonds, the bid-ask market is estimated based on the trader's indication. The bid-ask market for non-quoted bonds must be estimated using the LCS model.

FIG. 8 is a schematic for how LCS segments the Barclays Capital US Credit Index. For the June 2009 statistics universe for the US IG Credit Index, traders provided quotes for 1,177 of the approximately 3,600 total issues. 2,456 issues were non-quoted during June 2009.

The next step, in this exemplary embodiment, in estimating a bid-ask market is to determine whether a bond, either quoted or non-quoted, is a "benchmark" bond. A "benchmark" bond is defined as an "on-the-run" and/or "high volume" bond. An "on-the-run" bond is the most recent issue of an issuer at key points on the yield curve (e.g., the issuer's most recent 10 y bond would be an "on-the-run" issue for the issuer). A "high-volume" bond is a bond that may or may not be an "on-the-run" issue, but has an extremely high trading volume compared with other credit bonds. Referring back to FIG. 8, traders provided quotes for 503 benchmark bonds and 674 non-benchmark bonds in the Credit Index.

Generating LCS for Trader-Quoted Bonds

The bid-ask indication for a benchmark quoted bond is likely to be close to the bid-ask market because benchmark bonds are "high-profile" bonds that see good two-way flow and are closely monitored by broker/dealers and investors. A trader is unlikely to quote a benchmark bond poorly, as it would signal inattention to the market or weak market-making capability. If a quoted benchmark bond, with an OASD of 5, has a trader bid-ask indication of 20 bp, then the LCS for the bond (in percentage points) will be 1.00=5×20 bp.

Quoted spreads for non-benchmark bonds are adjusted by a factor ranging from 1.5 to 1.8 to convert a bid-ask indicative spread to a bid-ask market spread, in this exemplary embodiment.

By definition (in this embodiment), a non-benchmark bond is an off-the-run issue and/or an issue with relatively low trading volume. As discussed above, while traders do provide bid-ask indications for non-benchmark bonds, these indications are often simply an indication that the trader is willing to consider trading the bond and that potential counterparties should contact the trader to discuss further. In other words, the bid-ask indication is unlikely to be a bid-ask market, but rather just an advertisement that interested parties should call the broker/dealer.

Because non-benchmark bonds are usually off-the-run and/or low volume bonds, the trader sends out a bid-ask indication stating where the bond might trade. Traders will often say: "In theory, this is where the bond should trade . . . "; "I have not seen this bond in a long time . . . "; or "I will not offer the bond at that spread, but would work an order." In time, the bond might trade at the trader's indicative bid-ask spread, but it is clear that the trader is not making an active bid-ask market. However, since the bond is quoted, the trader is interested in the bond. When pressed, the trader is generally able to offer a tradable bid-ask spread for the bond, but at considerably wider levels than the indication.

While one may use trader bid-ask indications to compute an LCS for non-benchmark quoted bonds, one preferably "adjusts" the indication to reflect that the bid-ask market for the bond will be wider. This adjustment factor (AdjF), estimated using one or more methods known in the art or methods described herein (one example is provided below under the section entitled "Exemplary LCS Technical Details"), is related to the current dispersion of liquidity in the market, as inferred from the bid-ask indications provided by the traders across benchmark and non-benchmark bonds.

The adjustment factor is estimated each month and reflects how much higher transaction costs are for "non-benchmark" bonds compared with "benchmark" bonds; it is used to "correct" the quotes for non-benchmark bonds. Since January 2007, for the exemplary data used herein, the adjustment factor has ranged from 1.50 (an exogenous lower bound) to 1.83.

FIG. 9 provides a schematic summarizing how LCS for all the bonds in the IG and HY Index may be estimated.

For example, consider a non-benchmark quoted bond that has a trader bid-ask indication of 25 bp and that the current adjustment factor, AdjF, is 1.63. To estimate this bond's bid-ask market, LCS multiplies the bond's indication by 1.63 to produce an estimated bid-ask market of 40 bp. The bond's final LCS is then calculated to be 5×40 bp=2.00.

As a more specific example, Lowe's Corp (LOW) has ten bonds in the IG Statistics Universe as of Dec. 31, 2008. Five of the bonds were trader quoted. Of the five, LCS considered one bond (the 6.65% of 9/37–548661CP) to be a benchmark bond because of both its "on-the-run" and its high volume status. Consequently, the LCS for this bond was computed directly from the trader's average bid-ask indication over the month (LCS=4.446%).

The other four quoted bonds were non-benchmark bonds. As a result, their initial LCS, computed from the trader's bid-ask indications, was multiplied by the adjustment factor (1.563) to determine each bond's final LCS.

FIG. 10 shows the Dec08 LCS results for the trader-quoted LOW bonds. Liquidity cost typically falls as issue size increases, volume increases, OAS increases, DTS increases, or age increases Relationship of LCS to Bond-Level Indicatives The LCS for quoted bonds—the bonds for which there is direct bid-ask data—is typically related to the bond's attributes in a way that is intuitive to portfolio managers. For example, smaller and older bonds generally have higher LCS (see FIG. 11).

For quoted bonds in the June 2009 Credit Index, FIG. 11 groups bonds into buckets depending on issue size and age (since issuance). FIG. 5 shows that as a bond's issue size increases, its LCS tends to decrease. In contrast, the relationship between LCS and age is not so clear cut. As some bonds age, their LCS tends to decline, not increase. Upon closer examination, one may see that relatively tight bid-ask markets (i.e., relatively low LCS) for original issue long-maturity bonds whose remaining term has fallen below two years. These tend to be bonds initially purchased for buy-and-hold portfolios (e.g., insurance companies) that are then replaced by new issue longer duration bonds and sold to willing buyers (short-duration mutual funds).

The relationship between a bond's LCS and economic risk is apparent, as indicated in FIG. 12. One may measure a bond's sensitivity to spread risk by the bond duration times spread (DTS). Alternatively, other investors might use a bond's OAS level. For a market maker, it is particularly risky to make a two-way market for a bond with a relatively high DTS. If a trader quote is taken, the trader now has a position in a relatively high risk bond. To protect themselves, traders are inclined to quote a wider bid-ask spread for riskier bonds.

What is the relationship between a bond's LCS and its trading volume? At first glance (see FIG. 13), LCS seems to be negatively related to trading volume (via TRACE). In other words, a bond with greater volume is likely to have a lower LCS. LCS and trading volume appear to have a relationship, which is largely driven by outliers.

However, this graph is distorted a bit by very high volume bonds. In fact, more than 80% of all bonds have monthly trading volume of $50 mn or less. As shown in FIG. 14, if one looks only at these 80% of the bonds in the IG and HY indices, one finds a much weaker relationship between LCS and trading volume. In fact, one sees that bonds with relatively high trading volume can have a relatively high LCS; conversely, bonds with relatively low trading volume can have relatively low LCS. Volume alone is not a strong proxy for liquidity as measured by a bond's bid-ask spread. For instance, in November 2008, heavy selling by investors in an illiquid market led to very high volumes but high LCS.

One may summarize the relationship between a quoted bond's LCS and its attributes by running a multiple regression of bonds' LCS on various bond attributes: age, time to redemption, issue size, trading volume, and DTS. FIG. 15 shows exemplary results for the period from January 2007 to June 2009:

As shown in the regression results, a bond's attributes can explain a high percentage of the variability in a bond's LCS, both across bonds and across time. All the coefficients have the expected sign. For example, FIG. 15 shows that the riskier the bond (i.e., higher DTS), the greater the LCS; the larger the issue size, the smaller the LCS; and the greater the volume, the smaller the LCS. One may rely on the findings of FIG. 15 to help specify an LCS model for non-quoted bonds.

Generating Liquidity Cost Scores for Non-Trader-Quoted Bonds—Exemplary LCS Models Non-Quoted Bonds By definition, non-quoted bonds do not have trader-provided bid-ask indications. Unfortunately, in a given month, traders may provide indications for only a fraction of the bonds in the indices. To generate an LCS value for the remaining index bonds, in an exemplary embodiment one may use final LCS values for quoted bonds to estimate a LCS model. Attributes (e.g., volume, risk, and time since last quoted) of non-quoted bonds may then be used as inputs to the model to generate and estimate LCS values for non-quoted bonds. Exemplary details of the LCS model are provided below.

Exemplary LCS Model Specifications

To assign an LCS value to every bond in a set of bonds (e.g., in the Barclays Capital Investment-Grade Credit and High Yield Indices), one may use a model that relates LCS to bond characteristics that a portfolio manager would, a priori, consider closely related to liquidity. As will be shown below, the following bond attributes may be significant in explaining a bond's LCS:

1. Trading volume: LCS is likely negatively related to a bond's trading volume. In other words: more volume, lower liquidity costs. Traders are comfortable making tight bid-ask markets for bonds with large trading volume, as there are many other market makers with which to offload any undesired risk.

2. Amount outstanding: LCS is also likely to be lower for larger-sized issues. Traders are likely to be more willing, all else equal, to make a tighter bid-ask market for issues with large amounts outstanding. Traders are likely to be able to find more buyers and sellers as a bond's issue size increases.

3. Non-par priced: Bonds that have non-par priced bonds often trade at wider bid-ask spreads, reflecting less interest by some market participants who prefer to buy bonds at par and hold them.

4. Age: Many credit bonds are acquired by buy-and-hold investors. These investors manage portfolios with trading constraints and low turnover. They are reluctant to sell bonds (i.e., book gain/loss contstraints) or will sell only if there is a compelling price. As a result, the LCS for seasoned bonds will typically be wider, all else constant, compared with newly issued bonds.

5. DTS/OAS: Making a bid-ask market exposes traders to mark-to-market risk as they seek to unwind the position. Consequently, bonds with greater excess return volatility, which one may measure by the bond's DTS (duration times spread) value, are likely to have a greater LCS, all else equal, because of the risk the market maker must bear until the trade can be covered.

6. "Benchmark" status: Certain bonds receive heightened attention from traders. These are "on-the-run" issuer bonds (i.e., the most recent 10 y of an issuer with multiple issues) and/or bonds with very high trading volume. In fact, an off-the-run bond just three months older than the issuer's on-the-run bond will generally trade at a higher LCS than an otherwise comparable off-the-run bond.

7. Sector: defined, in an exemplary embodiment, as index sector and subordination type. Since the dynamics of every sector and market segment can be different, these have to be considered separately while modeling. Also, there are liquidity issues related to bonds that are quoted on spread and those that are quoted on price. Before fitting the model, one may first wish to separate the quoted set of bonds into bonds that are quoted on spread and those that are quoted on price. This logic allows for the possibility that these two types of bonds may appeal to different investor groups and may have different sensitivities to the liquidity factors listed above.

As mentioned above, one may include a benchmark dummy factor in the regression. It is possible that some traders may not quote a bond even though it is an on-the-run or high volume issue. In fact, in June 2008, 215 bonds in the IG Index were benchmark bonds that were not quoted by Barclays Capital's traders in the month. Since one may use final LCS values as the dependent variable, including the dummy factor allows non-quoted benchmark bonds to have a lower estimated LCS than non-benchmark bonds, all other attributes being the same.

For non-quoted bonds, one may also make an adjustment to estimated LCS values. The logic here is that estimating LCS for non-quoted bonds using the LCS for quoted bonds may bias lower the estimated LCS value for non-quoted bonds. A quoted bond has a liquidity advantage in that the trader is advertising an interest to trade. A non-quoted bond suffers from a diminished level of trader interest. In addition, non-quoted bonds are generally smaller and have lower volume than their quoted counterparts (see FIG. 16). Consequently, using LCS from quoted bonds is likely to bias downward the estimated LCS value for non-quoted bonds. While some of this will no doubt be captured by the bond's attributes, one may use an adjustment factor to account for any non-linear effects and to accommodate the incremental illiquidity just because a bond is not quoted.

To address this potential bias, one may adjust the estimated LCS for non-quoted bonds by multiplying the regression estimated LCS value by a "non-quoted adjustment factor" (NQAdjF) to compute a final LCS value. Like the AdjF, the NQAdjF depends on the dispersion of liquidity in the market. In addition, however, the NQAdjF is modulated depending on whether the bond has been quoted in recent months. In other words, if the bond was recently quoted, just not in the current month, then its NQAdjF is close to 1.0.

Returning to the Lowe's bond example, FIG. 17 shows the computed LCS for the five non-quoted bonds as of December 2008. (Note: None of the non-quoted bonds was a benchmark bond).

For example, the "double-old" 30 y bond, 548661 CJ, had an estimated LCS of 5.990%, compared with 4.446% for the off-the-run 30 y bond and 3.762 for the on-the-run 30 y bond. The "triple-old" and "quadruple-old" bonds (548661AK and 548661AH, respectively) had final LCS values of 7.150% and 6.800%. The quadruple-old bond, despite lower volume and issue size than the triple-old bond, is starting to benefit from its lower spread risk (i.e., DTS), which is a major driver of liquidity cost.

The two non-quoted off-the-run 10 y issues for LOW are treated similarly. The most recent 10 y, 548661 CH, not given benchmark status because its issue size is too small, was non-quoted in December 2008 and had a final LCS computed at 3.884%. The old 10 y, 548661 CK, also non-quoted, had a higher final LCS of 4.670% because of, among other factors, lower trading volume and higher age, but benefited from larger issue size and lower DTS. The double-old 10 y, however, was, oddly enough, a quoted bond. Consequently, its LCS, at 3.310%, was the lowest of the three recent 10 y bonds. Finally, note that the oldest 10 y bond, 548661CA, issued 8.6 years ago, had the lowest LCS. This bond was a quoted bond. While its implied bid-ask market was relatively high at 78 bp, its very low spread duration produced a low LCS of only 1.059%. The likely reason for this bond to be quoted is that insurance companies that originally bought this long maturity bond may now be selling out of this position since this bond has rolled down the yield curve, and thereby creating supply in the market. This is also explicitly considered by one or more exemplary embodiments of the model.

Testing LCS Models—Three Exemplary Out-of-Sample Tests

Testing an LCS model may be difficult, as the bid-ask market spread is generally not observable for non-quoted bonds. One may deal with this problem by using alternative methods of testing model performance out of sample. Exemplary tests are described below.

Out-of-Sample Test #1: Pretend some (random) quoted bonds are non-quoted; estimate their LCS using the model and then check with the actual trader data.

For the first out-of-sample test, one may randomly eliminate approximately 10% of a quoted bond sample. One then may estimate the LCS model assuming that these bonds are not quoted, compute the model-implied LCS for these bonds, and compare them with the actual LCS based on trader bid-ask quotes. One only need consider benchmark bonds for this exercise, since one is primarily interested in the model's estimates, rather than subsequent adjustments, which may be designed keeping in mind the estimates of the traders regarding where non-benchmarks were likely to trade. This may be repeated for several months. Exemplary results for June 2009 and November 2008 (a more volatile, illiquid month) are shown in FIGS. 18 and 19. The absolute value of the prediction error as a proportion of true LCS is between 30% and 35% in both cases. So, the large errors in FIG. 18 refer to bonds with very high LCS, which the model matches closely, in a relative sense. This is true for both investment grade and high yield bonds.

Out-of-Sample Test #2: If two bonds, one quoted and one not quoted in a month, have similar LCS, then both should continue to have similar LCS patterns when they are both quoted or both not quoted in a subsequent month.

A second out-of-sample test involves first identifying bonds with LCS scores similar to the scores of other bonds from the same issuer that are based on trader quotes. Then one may observe these two bonds in a subsequent month when both are quoted (or both are not quoted). If the LCS model provides a consistent liquidity score, then the LCS of similar bonds by the same issuer should move in tandem in different months, whether one or the other bond is trader quoted or not quoted.

FIG. 20 shows an exemplary validation of an LCS model using LOW as an example by comparing the LOW data for December 2008 (presented above) in FIG. 17 with LOW's LCS scores for June 2009.

For example, consider two off-the-run 10 y bonds in December 2008: 548861 CH and 548661 CK. The former bond is quoted with an LCS of 3.310% while the other bond is non-quoted with a higher LCS value of 4.67%. In June 2009, both bonds are non-quoted. While both LCS values in June are lower, reflecting the sharp fall in the overall LCS value of the index since December 2008, the LCS for the non-quoted bond in both months maintains its LCS proximity and ranking relative to the bond that was first quoted and then non-quoted. While the bond that became non-quoted suffered an increase in LCS relative to the non-quoted bond, the LCS model produced consistent values.

Similarly, compare the LCS for the two old 10 y bonds (548661CJ and 548661 CL). In December 2008, the first bond was non-quoted while the latter was quoted and had a lower LCS given its quoted status. In June 2009, both bonds were non-quoted, and the LCS model produced comparable values for both bonds. If the LCS model were not consistent, one would not observe the LCS for both bonds moving in a comparable fashion as bonds move in and out of quoted status.

FIG. 20 also highlights that the LCS ranking of all of LOW's bonds remains relatively unchanged from December 2008 to June 2009 despite the large change in market liquidity and the fact that some bonds changed from quoted to non-quoted or from non-quoted to quoted status during the period.

Out-of-Sample Test #3: LCS is compared with subjective liquidity rankings provided by traders.

The Barclays Capital credit structuring desk recently polled credit flow traders for their opinions regarding the liquidity of various bonds. These bonds belong to a set of approximately 200 relatively large, moderately seasoned to newly issued 10 y bonds that are under consideration for inclusion in a liquid basket of cash bonds. This basket is a small set of bonds containing only one bond per issuer. For the bonds selected for the basket, traders were told that they would have to be prepared to make two-way markets for the next six months.

Traders were asked to provide a subjective 1-2-3 liquidity ranking [1 (highly liquid—should be in basket), 2 (liquid enough to be in basket), or 3 (illiquid, do not include in basket)] for each of the 200 issues (henceforth, 1-2-3 rankings). Traders know that bonds rated a 1 (or, perhaps a 2) would be selected for the basket whereas bonds rated a 3 would not be selected.

The 1-2-3 rankings provide a valuable out-of-sample test of an exemplary LCS method to objectively measure the relative liquidity of credit bonds. Assuming that the 1-2-3 rankings are a good measure of liquidity, a comparison of the LCS with the trader 1-2-3 rankings gives an indication of how much liquidity information is embedded in bid-ask quotes. If the LCS and 1-2-3 rankings are capturing trader perceptions of liquidity, then one would generally expect the following correspondence relationship:

$$\text{LCS (bonds ranked a 1)} < \text{LCS (bonds ranked a 2)} < \text{LCS (bonds ranked a 3)}$$

However, there are some important differences between exemplary LCS results and the 1-2-3 rankings that disrupt the above relationship.

(1) LCS represents the current month's round-turn execution cost of a normal institutional trade (e.g. $3-5 mm) whereas the 1-2-3 rankings represent a trader's willingness to select a bond for the liquid basket and assume the obligation to make two-way markets for the next six months. Since the 1-2-3 ranking involves a measure of liquidity forecasting, as opposed to LCS's measurement of current liquidity, these two measures can differ. For example, suppose that an issuer issues a 10 y bond that becomes the on-the-run issue. The issuer's other 10 y bond, issued three months earlier, is now an off-the-run issue. Although the older issue may currently have decent liquidity (and a fairly low LCS value), the trader may give that bond a 3 ranking and the new issue a 1 because the trader knows that over the next six months, the off-the-run issue will become relatively illiquid.

(2) 1-2-3 rankings may reflect a trader's ability to execute transactions outside the $3-5 mn range, something that LCS may not capture.

(3) LCS is an objective measure, while the 1-2-3 rankings are subjective, which may prevent direct comparison across traders and, potentially, across issuers. (As shown in FIG. 21, liquidity varies substantially across traders.)

To facilitate a better comparison of LCS and the 1-2-3 rankings, one may examine the correspondence between the two liquidity measures at the individual trader level. One would expect to see a close correspondence between LCS and the 1-2-3 rankings for a given trader. However, even this comparison is not totally precise. The same trader can rank an off-the-run (but fairly liquid and with low LCS) bond for one issuer as a 3 (since more liquid alternatives from the same issuer exist) but may rank another issuer's less liquid bond as a 1 if this is the most liquid bond from that issuer available for inclusion in the liquid basket.

FIG. 21 presents, by trader, the average LCS for the set of bonds given a particular 1-2-3 ranking. One would generally expect the average LCS value to increase with the 1-2-3 ranking. (Some sub-groups have very few bonds, so the results are heavily influenced by outliers.)

First, FIG. 21 provides an example of how liquidity can vary across traders. For example, the average LCS for bonds ranked by Trader #3 (1.159) is 75% that of Trader #5 (1.545). So as discussed earlier, a bond ranked 3 by Trader #3 may be more liquid than a bond ranked 1 by Trader #5, as liquidity can be relative depending on the trader and market segment.

Second, for most traders, one should see average LCS increase as the rank category increases (ignoring issuer-level complications for the moment, discussed below), if LCS corresponds well with subjective measures of illiquidity. In general, this correspondence holds. For example, for Trader #6, the average LCS for bonds ranked 1 is 0.803, less than the average LCS for the bonds ranked 2 (1.209), which is, in turn, less than the LCS for the bonds ranked 3 (1.448). While there are violations of the correspondence relationship, they are generally small in magnitude (a few basis points in round-trip costs), based on average LCS levels.

While the average LCS for a trader's bonds ranked 1-2-3 generally corresponds to the trader's rankings, it is important to see the dispersion of LCS by 1-2-3 ranking. Ideally, assuming that a trader gives a 2 to a bond that has worse liquidity than all of the bonds he or she ranks as a 1, then if an LCS method performing well, all of a trader's 1s should have a lower LCS than any of the trader's 2s, and all of the trader's 2s should have a lower LCS than any of the trader's 3s.

FIG. 22 graphs bonds' LCS versus their 1-2-3 ranking at the individual trader level. Ideally, these graphs should resemble a staircase function. However, given the subjective nature of the 1-2-3 rankings and the fact that only three subjective scores are possible, it is extremely unlikely that the LCS and 1-2-3 rankings will match up this precisely by trader. Also, it is likely that this correspondence will hold only across bonds by a single issuer and not across all bonds that a trader ranks, because of liquidity differences across names and the trades' desire to avoid issuer concentration in liquid names. Nevertheless, one should see a fairly close correspondence. In FIG. 22, one can observe that a trader's 1-2-3 rankings generally correspond to the LCS values.

Some of the bonds ranked by traders do not have bid-ask quotes (i.e., were not quoted in published messages during June 2009). The exemplary LCS model estimates the LCS value for a non-quoted bond based on the bond's attributes. Does the LCS method work well only when trader quotes are available for a bond, or can the model do a fairly good job of estimating liquidity costs for non-quoted bonds? This can be answered by comparing the estimated LCS value for non-quoted bonds with the subjective 1-2-3 rankings. Do non-quoted bonds with a ranking of a 1 have lower estimated LCS than non-quoted bonds with higher rankings? If so, this further supports the use of bid-ask spread data as a reliable basis to measure liquidity, even for bonds that are not actually quoted during the sample period.

As shown in FIG. 23, the order of the LCS and the 1-2-3 rankings has been preserved for both the quoted and the non-quoted bond universe (i.e., LCS increases as rank increases). Also, since the non-quoted bonds are presumably less liquid than the quoted bonds (or else the traders probably would have quoted them), one may observe that the LCS levels of the non-quoted bonds are higher for each 1-2-3 rank category.

Overall, the three exemplary out-of-sample tests described above give support to LCS models for non-quoted bonds. Clients with access to bid-ask markets for non-quoted bonds can, of course, perform their own tests. However, it is likely that additional direct out-of-sample tests will provide similar results.

Using LCS to Measure Liquidity Risk

With respect to liquidity risk, one may consider:

(1) How likely is a bond to maintain its relative liquidity position? In other words, is a liquid bond (i.e., low LCS) likely to remain a relatively liquid bond as the market's overall liquidity changes?

(2) What is the volatility of a bond's LCS? Since LCS is measured in basis points, one may also compare the volatility of LCS with the volatility of a bond's excess returns. Although liquidity and excess returns are highly correlated, as both are affected by changes in perceived default risk, it is of some interest to see the relative magnitude of their variability and correlation.

LCS Persistence: at the bond level, LCS is somewhat persistent, on average; fixed buckets of bonds sorted by LCS in June 2008 maintain their relative ordering over time; however, the standard deviation of within-bucket LCS increases with time, so LCS constrained portfolios are likely to have high turnover.

To measure the persistence of an exemplary bond's LCS, one may form static, sorted LCS buckets as of, say, June 2008. While these LCS buckets are similar to the LCS quintiles (discussed above) in that they contain equal numbers of bonds sorted by June 2008 LCS values, they differ from the quintiles because the composition of the buckets (unlike the quintiles) does not change over time. So the bonds in LCS bucket 1 in June 2008 are the same bonds in LCS bucket 1 in November 2008, and so on. Moreover, the dataset for this exercise is a subset of the universe that one may use for the remainder of this discussion; in this example, one is constrained to use only those bonds for which LCS values were computed for each month from January 2007 to June 2009 (e.g., bonds that were issued after January 2007 or redeemed before June 2009 would have been excluded).

FIG. 24 shows the average LCS for each of six exemplary LCS buckets as of June 2008. For example, the lowest LCS bucket had a June 2008 average value of 1.082 and a within bucket standard deviation of 0.196, while the highest LCS bucket had an average LCS of 4.819 and a standard deviation of 2.170.

As market liquidity deteriorated over the latter half of 2008, FIG. 24 shows that the relative position of the six LCS buckets remained unchanged. Bucket 1 had the lowest average LCS in November 2008, and Bucket 6 still had the highest LCS. As the market recovered into 2009, the relative ranking continued to hold. This persistence gives investors the opportunity to construct portfolios with relatively low (or high) LCS and have some confidence that the portfolio will continue to have a relatively low (or high) LCS over time.

Although LCS values seem to persist (at least at the bucket level), there is potential for LCS migration at the bond level. Although Bucket 1 remained the lowest LCS bucket, note that the standard deviation of LCS within the bucket increased sharply by November 2008 (from 0.196 to 1.502). This is also true for the other LCS buckets. For example, many financial bonds had low LCS values in June 2008, but experienced large increases by November 2008. This implies that maintaining a target LCS level, either absolute or relative, may involve significant portfolio rebalancing.

Another way to measure bond-level persistence is to examine transition matrices. Transition matrices of LCS buckets have large diagonal terms, indicating persistence. FIG. 25 shows what happens to the individual bonds in an exemplary LCS bucket over time. For example, of the bonds in the LCS Bucket 1 in June 2008, by November 2008, only 60.6% remained in LCS Bucket 1 and the rest migrated to higher buckets. While the 60% value suggests strong persistence, it is important to highlight that almost 16% of the bonds in Bucket 1 migrated to Bucket 3 or higher by November 2008.

FIG. 25: Transition Matrices for LCS-Sorted Portfolios Formed in June 2008 across Various Horizons LCS Volatility How volatile is a bond's LCS? Over the past several years, bond-level liquidity has been very volatile. As shown in FIG. 26, from January 2007 to June 2009, the average standard deviation of monthly bond-level liquidity has been 1.540 (mean value=2.358). Although the high standard deviation is attributable to the recent credit crisis, the high volatility of liquidity cost must nevertheless be a concern to portfolio mangers. Estimating how much expected return premium is demanded by investors for this volatility is another application of LCS.

FIG. 27 indicates that bonds with high LCS (i.e., illiquid bonds) earn higher excess returns (versus UST) in the following period, on average, suggesting that liquidity as measured by LCS is priced in. The correlation between the change in a bond's monthly LCS and the bond's excess return in the same month is −46%, suggesting that lower returns and decreases in liquidity occur contemporaneously.

Using LCS in Portfolio Construction

Figure 28:
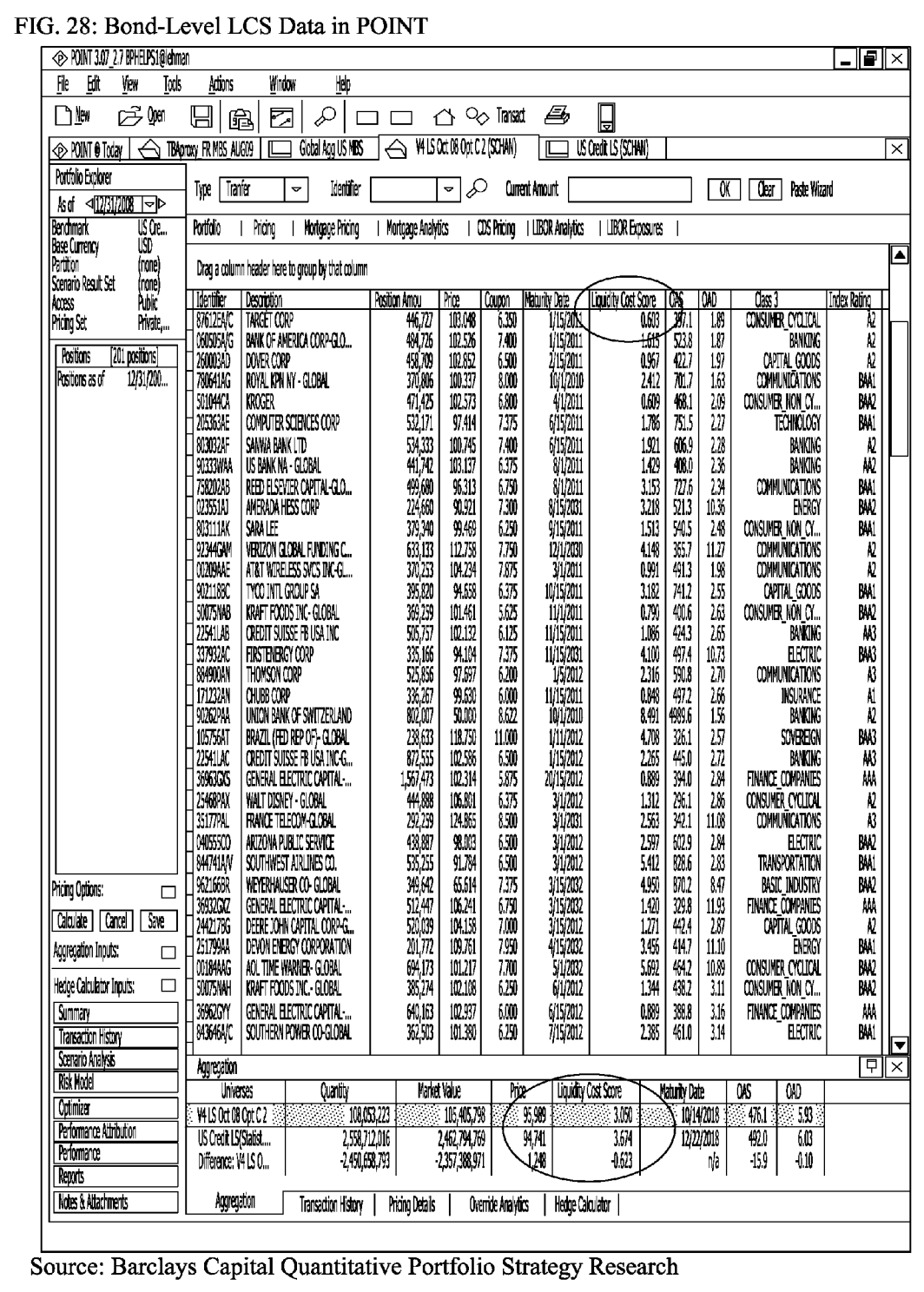

Bond-level LCS data is available through various databases known to those skilled in the art (e.g. POINT®). For example, for both the IG and HY US Credit Indices, investors can see monthly LCS data by Cusip (see sample screenshot in FIG. 28). Investors can use an exemplary embodiment comprising LCS as a control variable when constructing portfolios using the analytical tools available in POINT.

For example, suppose that a portfolio manager in early 2007 was worried about increased liquidity risk but still wanted to track the US IG Credit Index as closely as possible. In other words, the manager wanted to construct a tracking portfolio but with a tilt to a portfolio with better liquidity than the index. How could the manager construct such a portfolio? Traditionally, many managers would construct the portfolio using recent, large-sized issues. Now, with bond-level LCS data in POINT, managers can either select from a set of bonds with an LCS below a set target (as the "swap universe") or constrain their portfolios to meet an overall LCS target.

To investigate the use of LCS in portfolio construction, one may use, for example, a (Barclays Capital) risk model and optimizer to construct three index-tracking portfolios. Portfolios in this example are constructed at month-end January 2007 and rebalanced monthly subject to a turnover constraint to make the exercise realistic. One may construct three exemplary index tracking portfolios: an unconstrained replicating portfolio (A), a traditionally liquidity constrained portfolio (B), and an LCS-constrained portfolio (C); all three have similar ex ante estimated TEVs. In addition, each portfolio contains about 200 bonds to minimize the effect of idiosyncratic risk on the result.

Portfolio A: No liquidity constraints;

Portfolio B: Use traditional liquidity criteria to select only bonds with issue size greater than $500 mn and time since issuance (i.e., age) of less than two years; and Portfolio C: Each month, the portfolio must be rebalanced so that its LCS is less than or equal to 70% of the index's LCS At each month-end, any cash is re-invested and the optimizer will execute a handful of trades to improve expected TEV. Although all three portfolios will try to keep turnover to a minimum (the optimizer may be allowed to trade off turnover versus improved TEV), Portfolio C must meet its liquidity target each month irrespective of the degree of turnover. One may manage each portfolio through month-end June 2009 and report performance, LCS, and turnover.

FIG. 29 shows that the three exemplary portfolios have similar ex ante TEVs at the beginning of the period (approximately 5 bp/month). At January 2007, all three portfolios also have low LCS (FIG. 30). In addition, Portfolio C's LCS equals 0.7× index LCS, as required. Recalling the concentrated frequency distribution of LCS in the index as of January 2007 (FIG. 2), it is relatively easy for the optimizer to construct a tracking portfolio that is LCS constrained but still has a TEV similar to the other two portfolios. However, as liquidity deteriorates in the second half of 2007 and into 2008, the 70% LCS constraint has the potential to become problematic. Again, recall the very spread-out LCS frequency distribution for November 2008. Keeping overall portfolio LCS at 70% of that of the index could lead to high estimated TEV portfolios, as Portfolio C may have to be "unbalanced" to satisfy the LCS constraint.

Over time, in this example, one may rebalance the three portfolios to keep estimated TEV low. The objective function is a weighted average of TEV and a penalty for every dollar of rebalancing. As market LCS increases, the 70% LCS constraint for Portfolio C begins to bite and forces significantly greater turnover compared with Portfolios A and B and has a more skewed credit portfolio compared with the index. Although higher turnover is undesirable because of the cost and portfolio performance drag, the higher turnover does give the portfolio an opportunity to rebalance in a way to assist keeping overall estimated TEV low despite a more skewed credit portfolio. In contrast, Portfolios A and B are willing to experience an increase in estimated TEV in order to keep turnover low. This is why the estimated TEV for Portfolio C remains generally lower than the TEV for the other two portfolios. Although Portfolio C must incur higher turnover to keep LCS constrained, it at least gets the opportunity to rebalance in a way to help keep TEV low.

By early 2008, before the big increase in market LCS, the three portfolios continue to have similar TEV even though Portfolio C's LCS is beginning to diverge significantly from the other two. As shown in FIG. 31, Portfolio C's portfolio is looking slightly more unbalanced than the index, as its estimated TEV is being driven more by credit sector mismatches compared with other two portfolios.

As the market became increasingly less liquid, Portfolio C's cumulative excess return began to surpass the other two portfolios. Interestingly, the traditional way to construct liquid portfolios performed the worst. Large, recent issues were typically financial issues that suffered greatly during the liquidity crisis in 2008. By the time of the peak in market illiquidity (as denoted by LCS) in December 2008, Portfolio C had outperformed Portfolio A (unconstrained) by approximately 200 bp and Portfolio B (issue size and age) by almost 350 bp. FIG. 32 shows the cumulative excess returns of each of these portfolios versus the IG Credit Index.

FIG. 33 highlights the sharp outperformance of Portfolio C versus Portfolio B (the "traditional" liquid tracking portfolio). The figure shows the cumulative excess return performance of C relative to B. This relative performance closely tracks the aggregate LCS level of the IG Index. Although Portfolios B and C are both tracking portfolios, as per the risk model, they have very different LCS profiles. As market liquidity deteriorated, the lower LCS portfolio outperformed. While LCS may serve as a proxy for other risk attributes not captured by the risk model, these results indicate that a portfolio manager with a view on market liquidity can use LCS to structure portfolios to capitalize on that view.

Maintaining a highly liquid tracking portfolio is an idea many portfolio managers would readily embrace. With exemplary embodiments of LCS and POINT®, it is now possible to objectively construct such a portfolio. However, maintaining a relatively liquid portfolio is difficult, involving high turnover which may offset the liquidity benefits. Most bonds' LCS will generally increase with age, holding all else constant. This will cause a portfolio's overall LCS to drift higher. One may see this effect in FIG. 33, as the LCS for Portfolios A and B, which have some turnover constraints, begin to have LCSs that exceed that of the index. Consequently, a portfolio manager trying to keep the portfolio's LCS close to that of the index will need turnover to refresh the portfolio with lower LCS bonds from time to time.

In contrast, however, maintaining a targeted portfolio LCS value less than the index could involve considerable turnover.

For Portfolio C to keep its LCS at 70% of the index, a challenge considering the distribution of LCS, it needed a high degree of turnover. FIG. 34 presents monthly turnover for the three tracking portfolios. Turnover for Portfolio C averages almost 7% per month, compared with about 2% per month for Portfolios A and B. Portfolio C has high turnover because bonds that it had initially purchased with low LCS became higher LCS bonds (e.g., financials). So during the liquidity crisis, Portfolio C had to turn over approximately 33% of its portfolio in October 2008. As the credit markets improved, Portfolio C took advantage and added back some bonds whose LCS returned to better-than-average values. Again, this produced relatively high turnover: 10% in January 2009 and 17% in April 2009.

FIGS. 33 and 34 showed that Portfolio C outperformed Portfolios A and B, but those numbers did not factor in the high turnover. Using the LCS values as estimates of turnover costs, the cumulative outperformance of Portfolio C versus Portfolio B falls from 350 bp to 312 bp in December 2008.

While the turnovers of different portfolios look very different, this does not translate into a large difference in net returns. This is because the bonds in Portfolio C that are churned are cheaper to trade than the bonds in portfolios A or B. Over the time period under study, the relative outperformance of Portfolio C dwarfs its incremental transaction cost of 70 bp with respect to Portfolio A and 40 bp with respect to Portfolio B. Note, however, that this analysis does not include market impact costs. While very few of the exemplary trades are greater than $5 mn size, one may argue that market impact of rebalancing trades could be a potentially important factor in reducing outperformance.

This portion of the detailed description introduces exemplary embodiments of LCS, a measure of bond-level liquidity based on trader-quoted bid-ask spreads. Exemplary details of LCS methodologies are provided and the cross-sectional and time-series properties of LCS, which fit closely with ex post market perceptions of liquidity, are described. Exemplary embodiments of LCS take into account the fact that many trader quotes are mere bid-ask indications rather than commitments to make markets at those levels and makes appropriate adjustments. Three exemplary independent out-of-sample tests (including mapping with subjective measures of liquidity provided by traders) were presented, all of which provide validation for the procedure. LCS is generally persistent over time and co-varies suitably with bond returns. More liquid portfolios outperform less liquid portfolios during an exemplary sample period. A portfolio constructed with an LCS constraint outperforms other portfolios, but requires high turnover to keep tracking errors within reasonable limits.

While a component of LCS appears to be priced on average, LCS can be used to create profitable trading opportunities. It can also be used in a variety of portfolio management applications: constructing portfolios with various target levels of liquidity to take views on changes in market liquidity, designing optimal execution strategies for portfolio transitions, and designing custom credit benchmarks. LCS also provides managers with a straightforward indication of the cost and ease of liquidating a portfolio, thereby serving as a measure of liquidity risk management.

Exemplary LCS Technical Details

Details for one particular exemplary embodiment are provided below. Those skilled in the art will understand that these details are exemplary only, and that the scope of the invention is defined only by the appended claims, as they ultimately issue.

Exemplary Data Sources:
(1) bond characteristics from Sunbond.
(2) Trader Bid-Ask Quote data from outgoing Bloomberg messages. These messages are captured by Barclays and then parsed by Index Production. This parsing, which also matches bid-ask quote to cusip, is maintained by a Central Pricing Service (CPS).
(3) Monthly Trading Volume from TRACE—TRACE provides transaction-by-transaction data, which may be aggregated to obtain monthly volume.

The above are matched into a single database, by cusip.
(4) Subordination data from Sunbond is categorized according to subcat in Table 1.

TABLE 1

Subordination categories

| subordin | Subcat |
|---|---|
| SRNOTES | 1 |
| COLLEAS | 1 |
| 1STMTG | 1 |
| 2NDMTG | 1 |
| NOTES | 1 |
| SENIOR | 1 |
| SRDEB | 1 |
| DEBNTRS | 1 |
| EETC | 1 |
| GENREF | 1 |
| SRSUBDB | 2 |
| SUBDEB | 2 |
| LT1 | 2 |
| LT2 | 2 |
| T1 | 2 |
| CCRDT | 2 |
| SUBORD | 2 |

(5) The sector divisions are created according to newclass3cat in Table 2 (below).

TABLE 2

Sector categories

| class3 | newclass3cat |
|---|---|
| BANKING | 1 |
| BROKERAGE | 1 |
| FINANCE_COMPANIES | 1 |
| FINANCIAL_OTHER | 1 |
| INSURANCE | 1 |
| REITS | 1 |
| GOVERNMENT_GUARANTEE | 2 |
| GOVERNMENT_SPONSORED | 2 |
| LOCAL_AUTHORITIES | 2 |
| OWNED_NO_GUARANTEE | 2 |
| SOVEREIGN | 2 |
| SUPRANATIONAL | 2 |
| ELECTRIC | 3 |
| ENERGY | 3 |
| NATURAL_GAS | 3 |
| UTILITY_OTHER | 3 |
| BASIC_INDUSTRY | 4 |
| CAPITAL_GOODS | 4 |
| INDUSTRIAL_OTHER | 4 |
| TRANSPORTATION | 4 |
| COMMUNICATIONS | 5 |
| TECHNOLOGY | 5 |
| CONSUMER_CYCLICAL | 6 |
| CONSUMER_NON_CYCLICAL | 6 |

(6) Current cusip can be mapped to to historical cusips, once one has an aggregate list of all historical cusips. Some bonds may change cusip over the course of their life, so they need to be matched up to their current cusip, so that in turn LCS can be matched to POINT.

Bid-Ask data (e.g., from CPS) may need to be parsed further to remove potential outliers, bids with no offers, errors, etc.

Exemplary QPS Parsing Process:

Delete all bonds from the database that are not part of either the Barclays Capital High Grade or High Yield Indices.

1. Define the years to redemption category (redcat) of a bond as
   if yrstored>1.5 and yrstored<2.5 then redcat=2; else
   if yrstored>4 and yrstored<6 then redcat=5; else
   if yrstored>8 and yrstored<12 then redcat=10; else
   if yrstored>27 and yrstored<33 then redcat=30; else
   redcat=0;
   where yrstored=years to redemption.

2. Compute a Raw LCS for every trader-quoted bond:
   If bond is quoted on a spread basis, then Raw LCS=Avg Bid−Ask spread (in bps)*OASD/100

If bond is quoted on a price basis, then

Raw LCS=Avg[(Ask price−Bid Price)/Bid Price]*100

3. To reduce the effect of outliers and a further data filter, delete observations:
   if Raw LCS<0.1; OR
   if Raw LCS>8.0 and the bond is quoted on spread; OR
   if Raw LCS>20.0 and the bond is quoted on price.

Some of the quoted bonds are not quoted with the intent of making a market at that quote, but rather to generate an inquiry or to set the context of where a bond should trade. Therefore, it is desirable to attempt to determine which bonds are likely to be quoted in this manner (i.e., which are non-benchmark bonds), and inflate their LCS.

4. Define any bond (either trader-quoted or non-quoted) in an index to be a benchmark bond if
   The issuer (i.e., ticker) of that bond has at least 6 bonds outstanding, AND
   Age of the bond is lowest among all bonds by that issuer in that redemption category, AND
   Redemption category is non-zero, AND
   Size outstanding is at least USD 500 million, AND
   last month's volume is at least USD 15 million
   (all of which together are referred to as an on-the-run bond)
   OR
   Last month's volume is USD 80 million. (high volume bond)

The analysis here is based on the fact that a trader's bid-ask indication is likely to be a realistic bid-ask market for a benchmark bond. A benchmark bond is either an "on-the-run" type of issue (i.e., the issuer's on-the-run ten year bond) or a high volume bond for which the trader has likely seen a lot of trading activity.

5. Compute:

$$\text{Adj Fact} = \frac{\text{Average Raw } LCS \text{ of all quoted non-benchmark bonds}}{\text{Average Raw } LCS \text{ of all quoted benchmark bonds}}$$

For quoted bonds,
If bond is benchmark, then Final LCS=Raw LCS
If bond is non-benchmark, the Final LCS=Adj Fact*Raw LCS The calculations here are based on the fact that dealers often quote bonds as an indication, not necessarily to make a definitive market on that bond. So these indicative quotes would lead to a lower LCS relative to what they actually should be. So, one may "inflate" them by the adjustment factor. The adjustment factor is endogenous and will change with market conditions.

Also define a particular type of on-the-run bond:
If a bond (again, either quoted or non-quoted) satisfies the on-the-run criteria (see benchmark definition above)
OR
[it had an original maturity>7 years, and
yrs to redemption<3 yrs],
then it is a modified benchmark bond.

6. Now that one has the Final LCS for all quoted bonds, one can use these LCS data to estimate LCS for the non-quoted bonds. In this example, this is done by running regressions, for price-quoted bonds and spread quoted bonds separately.

If, for a non-quoted bond, OAS>8.00% then apply the price-based regression to estimate the value of the bond, else apply the spread-based regression.

For price-quoted bonds, regress:
LCS=f(volume,
outstanding size,
non-linear price term,
ageintbench
DTS
benchmarkdum
sectordumi
benchmarkintsec1−benchmarkintsec12)
where:
non-linear price term=$(100-P)^2$, where P is bond price. This variable captures the fact that "off-par" bonds will generally trade at wider spreads than par bonds.
ageintbench=age*modifiedbenchmarkdummy(1 if non-modified benchmark). If a bond is a modified benchmark bond, then it will not load on the age factor. Old bonds, that have relatively short time remaining to maturity, can trade with good liquidity. Insurance companies that originally acquired these bonds will sell them from the portfolio in order to replace them with new, longer duration bonds. In addition, there is demand for these short seasoned bonds from mutual funds.
DTS=OASD*OAS_to_worst
volume=Monthly TRACE Volume, ignoring buy/sell
benchmarkdum=a dummy variable that is 1 if the non-quoted bond is a non-benchmark bond, as defined above. Some non-quoted bonds are benchmark bonds (i.e., on-the-run and/or high volume) and will likely trade at a tighter bid-ask spread than non-benchmark, non-quoted bonds.
sectordumi=a variable that takes the value 1 if the bond belongs to sector i. Sector is defined as the intersection of the newclasscat and the subcat variables tabulated earlier—there are 12 sectors—6 newclasscat segments and 2 subcat segments
benchmarkintseci=benchmarkdum*sectordumi, i=1 . . . 12
For spread-quoted bonds, regress:
LCS=f(volume,
outstanding size,
non-linear price term,
ageintbench
DTS
benchmarkdum
sectordumi
benchmarkintsec1−benchmarkintsec12)
where:
non-linear price term=$(100-P)^2$, where P is bond price
ageintbench=age*modifiedbenchmarkdummy(1 if non-modified benchmark)
DTS=OASD*OAS_to_worst volume=Monthly TRACE Volume, ignoring buy/sell
benchmarkdum=a dummy variable that is 1 if non-benchmark, as defined above
sectordumi=a variable that takes the value 1 if the bond belongs to sector i. Sector is defined as the intersection of the newclasscat and the subcat variables tabulated earlier—there are 12 sectors—6 newclasscat segments and 2 subcat segments
benchmarkintseci=benchmarkdum*sectordumi, i=1 ... 12

The specifications for the price-based and spread-based regressions may be the same.

7. Using these regressions, estimate raw LCS for non-quoted bonds. Assign bonds to spread-based regressions or price-based regressions based on the OAS of the bond:

If OAS>8% then use price-based regression, else spread-based regression.

8. Make the following adjustments to these estimated raw LCS numbers:

$$AdjLCS = AdjFact^{(1-n^2/36)} * Raw\ LCS,$$

where n is the number of times the bond has been quoted in the last six months.

9. If the bond's price <$15 and coupon rate >1.01%, then
Final LCS=2*Adj LCS,
else Final LCS=Adj LCS.

Instead of running regressions with sector dummies and interactions, one may also attempt to run separate regressions for each of the 12 sectorXsubordination categories, if these sectors had a minimum number of observations. If not, they would be estimated by an overall regression encompassing all sectors. While the sector-wise regression also does well, an examination of the outliers suggests that the model with dummies does better in estimating bonds with extreme values.

Exemplary Embodiments: Credit spread decomposition—decomposing bond-level credit OAS into default and liquidity components.

In one or more exemplary embodiments, one may decompose a credit bond's OAS (over Treasuries) into multiple components. In one exemplary embodiment the decomposition is into three components: a market-wide risk premium, expected loss from default, and expected liquidity cost.

Bond-level liquidity cost (as measured by LCS) can help explain the OAS dispersion across bonds, even after accounting for differences in expected default losses. This holds for both investment grade and high yield bonds.

Portfolio managers can use spread decomposition to help determine whether a bond's spread has moved mainly because of liquidity or for default-related reasons. This information can potentially lead to better decisions regarding portfolio construction and positioning.

Spread decomposition analysis indicates that, at the aggregate level, liquidity cost became an important determinant of OAS levels as early as mid-2007, during the early period of the mortgage crisis, before increases in expected default losses. Perhaps cash corporate market makers react more quickly to perceived corporate risk, by widening bid-ask spreads, than does the corporate default risk market.

Although the September 2007 and April 2010 credit market OAS levels were similar, their compositions were very different. The OAS in September 2007 consisted mainly of risk premium unrelated to bond-level default or liquidity costs, whereas bond-level default cost was the main contributor to OAS in April 2010. However, during the intervening period (2008 to early 2009), bond-level liquidity cost was a particularly large component of OAS.

Spread decomposition can also help forecast credit spread changes, as well as help identify undervalued bonds. Further, results from spread decomposition can improve the hedging of credit bonds by allowing managers to focus on default and liquidity components separately.

Spread Decomposition—Benefits and Challenges

Credit bonds are issued at a positive yield spread (i.e., a credit spread) over comparable maturity Treasury bonds to compensate credit investors for the chance that a bond may default with a recovery value less than par. However, many studies (e.g., Ng and Phelps, 2010, and Elton, Gruber, Agrawal, and Mann, 2001) have documented that the spreads on credit bonds are generally much larger than is justified by their subsequent default and recovery experience. Two explanations for the additional credit spread in excess of expected default losses are expected liquidity cost and risk premia. Taxes are also cited as a cause of the credit spread premium. Since credit bonds are taxable at the state and federal level, whereas Treasury bonds are taxed only at the federal level, the credit spread premium may reflect this tax differential. Researchers are split regarding the magnitude of the tax effect in explaining the credit spread premium.

A portion of the credit spread may reflect an expected liquidity cost to execute a roundtrip trade in a credit bond as measured by the bond's bid-ask spread. The expected liquidity cost for a credit bond is typically greater than that for a comparable-maturity Treasury bond. A credit investor who anticipates selling the bond at some point wants compensation for this expected liquidity cost in the form of a wider spread at time of purchase. Another portion of the credit spread may reflect a risk premium demanded by risk-averse credit investors because of the uncertainty associated with the timing, magnitude, and recovery of defaults and liquidity costs (as explained above, a bond's liquidity cost can be highly variable). Consequently, the greater the degree of uncertainty, the more the credit spread will diverge from the expected default and recovery rates. In an exemplary embodiment, one may decompose a bond's spread into risk premium, expected default loss, and expected liquidity cost components.

Credit spread decomposition can serve several purposes. For example, an insurance company may be holding a large portfolio of credit bonds currently at wide spreads. The company's portfolio strategy will likely depend on whether the source of the wide spreads is large expected default losses, high liquidity costs, or high risk premium. Presumably, the company can ride out periods of high liquidity cost and risk premium, as the firm is generally a buy-and-hold investor. However, if the wide spreads are from an increase in expected default losses, the company may need to re-position or hedge its portfolio. Active portfolio managers can also use spread decomposition to take specific exposures to bonds that have large liquidity or default components, depending on their views about how compensation for default or liquidity costs is likely to evolve. Finally, regulators can use spread decomposition to monitor separately the liquidity and credit risk of the institutions they supervise.

As a simple example of the value of spread decomposition, consider the spread behavior of the Kraft (KFT) 6.5% of 11/31 (cusip: 50075NAC) from January 2007 to April 2010. As shown in FIG. 35, the bond's spread varied substantially over the period. FIG. 35 also shows the level of KFT's 5 y CDS spreads—a measure of the expected default losses from the issuer.

As seen in FIG. 35, movements in the OAS for the KFT bond loosely track changes in the issuer's CDS. However, there is a wide, and variable, gap between the two spreads. The magnitude of the gap has ranged from a low of 82 bp in April 2010 to a maximum of 282 bp in November 2008.

Presumably, this gap reflects risk premium and expected liquidity costs. To measure the expected liquidity costs, FIG. 36 plots the bond's liquidity cost score (LCS) over the same period. As shown, much of the variability in the OAS-CDS spread gap tracks movements in the bond's LCS.

FIGS. 35 and 36 suggest that the rise in OAS in July 2007 was driven by both default and liquidity concerns (all three lines move up), whereas the spike in September 2008 was mainly a liquidity event (the line plotting the LCS moves much more than the CDS line). Understanding the source of such movements in OAS allows investors to better protect their portfolio from such moves or take advantage of them, as the case may be.

Conversely, investors may have a situation in which the OAS of a bond has been very stable or declining—suggesting improved creditworthiness. However, the bond's declining OAS may simply reflect improved liquidity and market-wide risk premium, while the CDS may be widening, reflecting deteriorating credit for this particular issuer. For instance, from July 2009 to October 2009, the OAS of the TWX 6.75s of 4/11 declined to 157 bp from 199 bp. Did this spread tightening reflect improving credit quality, or improved liquidity and/or a lower market risk premium? Over this period, TWX's CDS spread increased to 57 bp from 45 bp, suggesting higher expected default losses. So why the reduction in OAS? The LCS for this bond fell to 21 bp from 49 bp. In addition, there was a reduction in market-wide risk premium. In other words, despite an increase in expected default losses, the OAS for the bond declined because of lower liquidity costs and risk premium.

These two examples illustrate that to properly interpret OAS changes, one may need to measure the components of OAS. So far, how other variables (CDS and LCS) move in relation to OAS has been shown. However, it is desirable to use regression techniques to rigorously decompose a bond's OAS into the three components. Researchers have struggled to perform credit spread decomposition (see, e.g., Collin-Dufresne, Goldstein and Martin, 2001). Although researchers can explain a large part of the excess spread using a broad market measure of liquidity cost, such as the spread between on- and off-the-run Treasury bonds, the lack of a bond-level liquidity cost measure has prevented spread decomposition across bonds. This description shows how to use bond-level measures of default losses and liquidity costs to decompose a bond's OAS into risk premium, default, and liquidity components.

As a prelude to describing this exemplary spread decomposition model, FIG. 37 shows output from the model using the KFT bond as an example. FIG. 37 shows that the effects of both default and liquidity on the bond's OAS were low in 2007. However, since late 2008, most of the increase in OAS has been liquidity related, while the default component has remained relatively stable. In other words, at the peak of the crisis, although the KFT bond's OAS shot up, investors didn't really believe that it was likely to default. The intercept term in FIG. 37 captures the effects of market-wide risk premium that was not specific to the liquidity and default characteristics of KFT.

This bond-level information can be invaluable to portfolio managers as they choose which bonds to hold, or which hedging instruments to employ for protection from certain market movements. Long-term investors, with minimal mark-to-market constraints, can choose to provide liquidity to the market if the contribution of liquidity is relatively high as long as they are comfortable with the idiosyncratic prospects of the issuer, whereas tactical mark-to-market investors would worry about short-term dislocations arising from any source of risk. To hedge default-related risks at the issuer level, investors can use the single-name CDS of the issuer. For systemic liquidity risks, VIX futures can serve as a hedging instrument. As discussed above, there is a close relationship between LCS and VIX, across regimes. The correlation between LCS and VIX from January 2007 to April 2009 is 0.90.3

One also can aggregate bond-level spread decomposition results to examine any differences in spread decomposition at the sector level. For example, for the data shown in FIGS. 38 and 39, spread decomposition methodology is applied to investment grade bonds in two sectors—consumer goods and financials—and the relative differences are examined. In early 2007, in terms of both liquidity contribution and default contribution, there appears to be no difference between these two sectors. The rise in default contribution for financials in August 2007 was related to the first wave of financial sector difficulties (e.g., mortgage companies), and the liquidity contribution went up for both sectors, but clear differences in liquidity across the two sectors started appearing only after the Bear Stearns takeover in March 2008. Default contributions for the financials increased in the form of wider CDS spreads, but financials were still pretty liquid until the Lehman Brothers bankruptcy in September 2008. Thereafter, liquidity contributions to spreads for financials shot up and remained elevated until Q2 2009. The liquidity differences between the two sectors have since abated, but the default contribution differences that began during the crisis persist.

Exemplary Spread Decomposition Methodology

Assume that a bond's OAS (versus Treasuries) can be largely explained by three variables: (1) a market-wide variable unrelated to the bond's attributes (such as a market-wide risk premium reflecting investors' demand for spread compensation for bearing risk); (2) a variable reflecting expected default cost, and (3) a variable reflect expected liquidity cost. Specifically, for every month t, run the cross-sectional OLS regression presented in Equation (1).

$$OAS_{it} = \alpha_t + \beta \text{ExpectedDefaultCost}_{it} + \gamma \text{ExpectedLiquidityCost}_{it} + \eta_{it} \quad (1)$$

The risk premium variable (the intercept term) represents a market-level risk premium, not a risk premium specific to each bond. Any bond-level risk premium will likely be highly correlated with the bond's default cost or liquidity cost variable. In other words, a bond with a high LCS will also likely be a bond for which an investor will demand a higher spread premium as compensation for liquidity cost uncertainty. This would make it difficult to separate a bond's spread into a portion from expected liquidity cost and liquidity risk premium. If default risk or liquidity risk premia are highly correlated with default or liquidity costs, then the regression coefficient ($\beta$ and $\gamma$) will be larger and/or more significant. Any part of risk premia that is unrelated to bond-level default and liquidity cost—in other words, a market-level risk premium—will show up in the constant term ($\alpha$).

This exemplary spread decomposition model assumes that any default and/or liquidity risk premia either do not vary across bonds in a given month or are highly correlated with expected default and liquidity costs. However, to try to capture any effect of risk aversion on cross-sectional OAS, one may use an alternative model in which the volatility of LCS over the past 12 months (i.e., a measure of liquidity risk) is included as an additional regressor. The results remain qualitatively the same. However, because of the relatively short history of LCS and the fact that a year's data is lost in order to construct this variable, these results are only a robustness exercise. Tax effects are ignored.

To measure bond-level expected default cost, one has a choice of variables. First, in this exemplary embodiment, as other researchers have done, an issuer's market-quoted 5 y CDS is used as a measure of its expected default cost (i.e., default probability and recovery). CDS, however, are not necessarily liquid and therefore cannot always be considered as a pure default proxy. To use CDS as a default loss variable, one may limit the analysis to bonds close to the 5-year point on the curve, since 5 y CDS are usually the most liquid. To identify issuers with liquid CDS, the analysis may be restricted to names that are part of the CDX.

One also may use another measure of expected default cost—the Corporate Default Probability (CDP) multiplied by one minus the Conditional Recovery Rate (CRR). (See Corporate Default Probability Model in the Barclays Capital POINT Platform, Barclays Capital, April 2009, and The POINT Conditional Recovery Rate (CRR) Model, Barclays Capital, August 2009).

CDP and CRR are not market variables. Instead, they are output from a quantitative model that uses firm-specific fundamental information, equity prices, and macroeconomic data to estimate a 1 y default probability and recovery rate for the issuer. Importantly, CDP and CRR are both computed independently of a bond's OAS.

Both CDP and CDS (independent variables) vary at the ticker level, while LCS (another independent variable) and OAS (the dependent variable) vary at the bond level. Consequently, two 5 y bonds from the same issuer will have the same CDP (and CRR) and corresponding 5 y CDS values while having potentially different LCS. One may wish to keep all bonds for every ticker (i.e., issuer) in the sample since the variation in OAS across bonds of similar duration by the same issuer can only be because of liquidity considerations. One may also perform a robustness test using only one bond per ticker to avoid a situation in which the bond-level variability (rather than the incremental information in LCS) may be responsible for significant LCS coefficients. As discussed in the exemplary methodology section above, to make sure that issue-level variation in OAS and LCS for a given issuer (along with the ticker-level variation in CDS/CDP) is not driving results, one may re-run Regression (2) using only one bond per ticker. One may use this version of Regression (2) in the Applications section to avoid issuer concentration.

Having two independent measures of expected default losses helps to assess the stability of the spread decomposition results.

One may measure a bond's expected liquidity cost using its LCS value. One may choose to use only bonds whose LCS are computed directly from a trader's bid-ask quotes rather than bonds whose LCS are estimated from an LCS model. Since an LCS model may use a bond's OAS as an explanatory variable, regressing a bond's OAS on its LCS for spread decomposition could produce an artificial relationship between the two. To avoid this, one may use only LCS values that are computed directly from trader quotes.

One thus may have two spread decomposition models depending on the variable chosen to represent expected default losses:

$$OAS_{it} = \alpha_t + \beta_y CDS_{it} + \gamma_t LCS_{it} + \eta_{it} \quad (2a)$$

$$OAS_{it} = \alpha_t + \beta_t CDP_{it}(1-CRR_{it}) + \gamma_t LCS_{it} \quad (2b)$$

For ease of reference, the first model (2a) is referred to as the "CDS model" and the second (2b) as the "CDP/CRR model." To provide a sense of the value of incorporating a bond-level liquidity variable (LCS) to explain the cross-sectional distribution of spreads, two versions of each model are considered below.

First, both models are run without LCS as an explanatory variable. Then, both models are re-run with LCS added and the results are compared with the first version. When the results of the two versions are compared, it is good to check whether adding LCS improves the fit of the regression. In addition, one may check to see whether adding LCS detracts from CDS (or CDP/CRR) as an explanatory variable. If LCS is a useful explanatory variable, one would expect to see an improvement in the adjusted $R^2$ and a significant (and positive) LCS coefficient, with little disturbance to the significance and magnitude of the CDS coefficient.

This example uses monthly data from January 2007 to April 2010. For a bond to be included in the sample set, it must satisfy the criteria discussed above (i.e., trader-quoted LCS and the issuer's CDS must be a member of the CDX universe for the month the regression is run). The number of bonds in this sample also varies depending on the regression model, as one may have more bonds with CDP/CRR data than with liquid CDS. One also may analyze both investment grade and high yield bonds, but report them in separate regressions. One drawback to having such parsimonious spread decomposition models is that liquidity and default are unlikely to be completely independent of each other, so multicollinearity may be a concern. However, these sample sizes are relatively large and there are only two explanatory variables, so multicollinearity is unlikely to be a serious problem.

What Drives Differences in OAS across Bonds?

FIG. 40 presents exemplary regression results for investment grade bonds for April 2010. The regression for the first version of the CDS model (i.e., without LCS) produced an $R^2$ of 0.54 with a significant CDS coefficient and an intercept that was not significantly different from zero. When the second version is run by including LCS, the $R^2$ improves to 0.60. More importantly, the LCS coefficient is both positive and significant. In other words, in April 2010, bonds with higher LCS have higher OAS, holding expected loss from default constant. Bond-level LCS are important in explaining relative OAS levels across bonds.

One may use the exemplary results described above to look at the contribution of default and liquidity effects on OAS for various sectors, as shown in FIG. 41. The chart in FIG. 41 is constructed by using the regression coefficients in the right panel of FIG. 40 and multiplying them by the respective averages for each sector. In the subject environment, liquidity effects are relatively small and uniform across sectors. In contrast, the default component varies more across sectors.

How Has the Composition of OAS Changed?

The spread decomposition exercise may be repeated for every month in the sample period to show how the relative effect of the three spread components has fluctuated. FIG. 42 presents the monthly regression results for investment grade bonds for both versions of the CDS spread decomposition model for all 40 months. (Results for the CDP/CRR model are shown in FIG. 54).

In the first half of 2007, when liquidity was abundant, LCS might not have played an important role in explaining spread differences across bonds. In fact, adding LCS to the regression did not meaningfully improve the $R^2$ (this is also related to the LCS-related data discussed above, which shows the very low dispersion of LCS across bonds in early 2007). In contrast, when liquidity was poor from late 2007 through the first quarter of 2009, the $R^2$ increased significantly when LCS was added to the regression. This suggests a heightened role for LCS in explaining cross-sectional spreads. Note that the inclusion of LCS in the regression did not affect the size and significance of the CDS coefficient for most months. This confirms that LCS is providing new information.

The regression intercept captures the portion of (average) spread that is independent of CDS and/or LCS. As discussed above, the market risk premium is likely to be an important contributor to the level of OAS, and one may use the time series of the intercept as an indicator of the variation of the market risk premium that is not already embedded in the bond-level default and liquidity variables.

For example, for the CDS model with LCS (the right-hand side of FIG. 42), the intercept increases to 2.76 in March 2009 from about 0.5 in early 2007, before subsiding to near zero in later months. Although part of this movement probably reflects the market's lack of liquidity concerns in early 2007, the general movement in the intercept over time aligns well with investors' perception of fluctuations in the level of the market risk premium.

The regression coefficients for CDS and LCS are both positive and statistically significant for most months (except CDS from December 2007 to February 2008 and May 2008, and LCS in June 2007). In other words, LCS has a consistently large and significant effect on the distribution of OAS values across bonds. Since default risk for high grade bonds has been very low over time, a relatively large proportion of the OAS is potentially liquidity related. As shown in FIG. 42, the relation of CDS with OAS is naturally tight, but maybe not as close as one might have thought.

The magnitudes of the CDS and LCS coefficients move broadly with the intercept value. This is not surprising because the CDS and LCS coefficients can be interpreted as the compensation (in spread space) that the market is currently paying, per unit of the corresponding cost. The prices of default and liquidity risk are likely to move similar to the market risk premium.

Whenever the intercept explains a relatively high proportion of OAS, this suggests that market factors rather than bond-specific factors are driving spreads. In periods when spreads are high, this may occur because of very high aggregate risk aversion (e.g., late 2008/early 2009). In periods when spreads are low (e.g., early 2007), this may be because the market was pricing bonds with little concern for issuer-specific information. For example, in September 2007, the OAS was similar to current levels but the intercept was a large component of total spreads. However, in the current period, the relative importance of the intercept is very small, suggesting that the market is possibly more discerning at present.

One can take the results in FIG. 42 and break the OAS value down into the three components. In December 2009, for example, the average values of OAS, LCS, and CDS were 2.09%, 0.73%, and 1.14%. The coefficients of LCS and CDS were 1.41 and 0.67, respectively, and the intercept value was 0.3. As expected, 0.3+0.67×1.14%+1.41×0.73%=2.09%, which is the average OAS. The product of the average value of the variable and its coefficient (i.e., 0.67×1.14% and 1.41×0.73%) is referred to herein as the contribution of average CDS and LCS, respectively, to average OAS in December 2009. Note: the results in FIG. 42 were used to present the contributions of CDS and LCS to OAS for KFT in FIG. 37 and the contributions for all sectors in FIG. 41.

FIG. 43 presents the contribution, in basis points, of the market risk premium, default cost, and liquidity cost to the market OAS every month since January 2007. The contribution pattern in FIG. 43 diverges from the time series of coefficient values in FIG. 42 during periods in which the mean value of the attribute and the OAS change a lot. For example, from September 2008 to October 2008, the average CDS spread jumped to 413 bp from 166 bp, but the coefficient of the CDS spread fell to 0.2 from 0.5, leading to a decline in the amount of OAS explained by CDS. This is because aggregate risk aversion, as measured by the intercept, shot up during this period. In October 2008, as FIG. 43 shows, out of the average OAS of 6.76%, 383 bp was explained by the intercept, 82 bp by CDS, and 211 bp by LCS.

FIG. 44 shows the same information as FIG. 43, but expresses the contributions of the three spread components as a percent of the average OAS value. This makes some earlier observations clearer. For instance, although the average OAS levels in April 2010 are similar to those in September 2007, the market in early 2007 was attributing OAS levels to overall market uncertainties, whereas in more recent times, this can be explained by larger variation in CDS spreads across bonds.

If an investor is looking to hedge the default and/or liquidity component of the spread separately, then the contribution to OAS in basis points is the appropriate measure to look at. If an investor is analyzing current market compensation for taking on additional amounts of expected default/liquidity cost, the coefficient provides that information. Nevertheless, a view on liquidity or default should be based not just on the coefficients, but also on the expected future levels of these attributes.

FIG. 45 compares data from April 2010 and March 2009 to provide a sense of how contributions to a sector's OAS can change over time. Observe that for every sector, a large proportion of the spread on March 2009 consisted of market risk aversion and liquidity components; these factors play a far smaller role in April 2010. Most of the OAS in April 2010 is attributed to CDS spreads. Of course, the OAS went down to 1.64% in April 2010 from 6.70% in March 2009, so the total contribution of CDS did not change nearly as much. Also, while there is a significant difference in cross-sectional contributions to spreads in March 2009, the market appears to be more homogeneous in April 2010.

Spread Decomposition Using Alternative Measure of Expected Default Losses—CDP and CRR So far, in an exemplary embodiment an issuer's CDS has been used to measure the expected default loss of one of its bonds. As expected, issuers' CDS spreads are significant in explaining the OAS variation across bonds. In addition, adding LCS to the regression significantly improves the regression's cross-sectional fit. However, both OAS and CDS are market spreads, and the good fit observed may be the result of both spreads' being quoted in relationship to each other. In addition, even though LCS may be measured directly from trader quotes, a bond's liquidity cost is heavily influenced by the bond's spread volatility. To better test the model's fit, it may be preferable to have the expected default loss variable be independent of market spreads. Fortunately, such expected default probability and loss given default measures are available: Conditional Default Probability (CDP) and Conditional Recovery Rate (CRR). Using CDP and CRR also provides a larger sample, because there are more tickers with CDP/CRR data than tickers in the CDX.

One may run month-by-month regressions (i.e., model (2b)) using $CDP_i$, $t \times (1-CRR_{i,t})$ as the expected default loss variable. These results, for investment grade and high yield indices, are reported in FIGS. 54-56. The regressions use a larger sample size and largely confirm the results presented above. The $R^2$ using CDP×(1-CRR) is lower than the $R^2$ using CDS spreads in many months, especially in 2007. This is not surprising, because market CDS spreads are more closely related to OAS compared with a modeled default probability estimate. The intercept is of a magnitude similar to that described above. The one notable difference is that the CDP×

(1-CRR) coefficient changes more on including LCS as an additional variable than did the CDS spreads coefficient in FIG. 42, suggesting that there is some collinearity between CDP×(1-CRR) and LCS. This is expected, as some modeling ingredients of CDP and LCS are likely to be correlated.

Spread Decomposition of High Yield Bonds

One may perform the same analysis for high yield bonds, with CDS spreads and CDP×(1-RR) as alternative default measures. Exemplary results are provided in FIGS. 54-56. Because high yield bonds have a higher expected default loss, it is only natural that default loss will be more important compared with investment grade bonds and play a more dominant role in explaining cross-sectional OAS. Until October 2008, LCS is insignificant in explaining cross-sectional high yield OAS. However, after October 2008 LCS consistently and significantly improves the regression fit until November 2009. These results suggest that liquidity cost provides additional explanatory power for the cross-sectional variation in high yield spreads only during periods of market stress. This may also be because CDS spreads of high yield issuers may be less liquid and contaminated with liquidity effects, which weakens the effect of adding LCS to the regression.

Overall, the CDS coefficient is similar in magnitude for both investment grade and high yield bonds, but the LCS coefficient is smaller for the high yield sector early in the sample period. The intercept is larger for high yield, suggesting that risk aversion, unrelated to the bond's default or liquidity characteristics, may drive a large proportion of the high yield spread. Despite the low importance of liquidity in the earlier part of the sample period, the adjusted $R^2$ is always high, pointing to the greater importance of default.

Applications of Spread Decomposition

Identifying Relative Value

So far, the exemplary analysis has used contemporaneous monthly data to attribute levels and changes in OAS to levels and changes in default and liquidity cost components ex-post. Worth investigating is whether one can apply spread decomposition analysis to ex-ante investment.

In principle, spread decomposition should help to identify relative value. To the extent that a bond's OAS is compensation for expected default and liquidity cost, a bond's market OAS can be compared with the estimated OAS using the parameters from the spread decomposition model. If the actual OAS is wider than the estimated OAS, it suggests that the bond is trading too wide, and vice versa. This may be a signal that the bond's OAS may change in the direction of reducing this "mispricing."

So as a first step, one may examine whether the residuals (Residual$_{i,t}$) of Regression (2a) can help predict future OAS changes. Specifically, if the residual (observed OAS—estimated OAS) is large and positive in a given month, is it likely that the bond's OAS will tighten in the near future? One may run this test for OAS changes for various horizons, ranging from one month to six months. In other words, one may take the residual from the spread decomposition model for any bond this month and examine whether the bond's future OAS changes are of opposite sign to the sign of the residual. If so, in which future month does this reversal occur? One may run the following Regression (6), where $\beta$ is expected to be negative:

$$\Delta OAS_{it,t+j} = \alpha + \beta Residual_{i,t} + \delta MonthDummy_t + \eta_{it} \quad (6)$$

Since six out-of-sample months are needed for each in-sample monthly prediction error dataset, one can run this regression only through October 2009. FIG. 46 shows that results for investment grade bonds are significant and strong at all horizons from one to six months, suggesting that even this simple model has some predictive power, on average. Note that the graph in FIG. 46 shows the coefficient ($\beta$) and the 95% confidence intervals of the independent variable (Residual) in Equation 5, estimated using various horizons (values of j). The values of the month dummy variables (not shown) are also as expected: they are large and positive in the second half of 2008 and consistently negative since Q2 2009. One exemplary method to create a portfolio for a simple relative value trading strategy that makes use of spread decomposition is now illustrated.

For an exemplary trading strategy, one may use bonds with LCS between the 10th and 90th percentile in any month (to avoid outliers owing to data problems) and examine the largest and smallest residuals within that universe. One may go long all bonds with residuals in the top 20% (of residuals), and short all bonds with negative residuals in the bottom 20%. For this exercise, one may use a one-bond-per-ticker version of Regression (2a) because one does not want to inadvertently have high issuer concentration in one's relative value trading portfolio. For every ticker, one may select the bond closest to the 5 y point.

Once one selects the bonds, one needs to choose their weights in the long-short portfolio. One may set the long and the short side to be $50 mn each. To choose individual bond weights, one may use the Barclays Capital Global Risk Model and Optimizer, although those skilled in the art may wish to use other risk models and optimizers. Based on the exemplary spread decomposition residual analysis described above, one may define the separate universes from which the Optimizer can go long and short. Then, using the POINT Optimizer, one minimizes systematic and idiosyncratic exposures (i.e., TEV) of the target long-short portfolio relative to cash. Finally, one may impose the requirement that the final long-short portfolio have no cash. The long-short portfolio as of Sep. 30, 2009, is shown in FIG. 47.

In light of the above, those skilled in the art will envision many modifications to this relative value strategy. For instance, the size of the exposure can be adjusted every month depending on how well the regression fits the data (e.g., using adjusted $R^2$). Transaction and funding costs can be incorporated to adjust the returns. These adjustments have not been highlighted here because the purpose is to illustrate an application of the spread decomposition exercise, rather than to robustly document the performance of an alpha strategy.

In addition to designing alpha strategies, investors may choose to take specific liquidity/default exposures. For example, as mentioned above, portfolio managers may decide to overweight or underweight liquidity-related compensation in their portfolios based on the investment horizon. The liquidity/default coefficients and contributions can assist investors in choosing securities.

Hedging a Credit Bond Portfolio

Investors who hedge credit bonds with CDS are exposed to fluctuations in the CDS-cash basis. One method to determine a hedge for a credit is to use regression to examine the historical relationship between the bond's OAS and potential hedge variables. As mentioned above, VIX has been closely related to both LCS and the intercept of the monthly regression. VIX futures can, therefore, potentially be used as a hedging instrument to counter spread changes related to changes in liquidity and aggregate risk aversion. The issuer's CDS may be an effective hedge against changes in expected default losses. If the relationship is stable and tight, then a hedge can be set up using the coefficients of the regression. However, the success of such a hedge depends on the goodness of fit and whether the historical relationship will hold in the future. Time series regressions are notoriously noisy, and the resulting hedge ratios are often unstable. To avoid these problems, investors can opt to set up a hedge against default or liquidity exposures using an alternative method that relies more directly on spread decomposition. This is discussed below.

Because a hedge is put on essentially to neutralize spread changes, one may begin by repeating the above month-by-month spread decomposition exercise using changes in OAS, CDS, and LCS. One may estimate this cross-sectional regression every month. One may use the regression coefficients at the end of each month to determine hedges for the next month for an equally weighted portfolio of all the bonds in our regression. The 5 y CDS for each bond and the 1 m VIX futures are the hedging instruments. VIX and LCS are highly correlated, even in changes, so one can use VIX to get exposure to LCS changes. Since VIX is far more volatile than LCS, one may use the ratio of the volatilities of VIX returns and LCS changes as a scaling factor for the regression coefficient for LCS changes. The average hedge ratio for CDS is about 0.6. If one were to get direct exposure to LCS changes, the LCS hedge ratio would be 0.26, on average. If one uses VIX futures instead, the allocation to VIX is usually about 0.02.

FIG. 49 graphs the actual out-of-sample returns of the unhedged portfolio and the returns of the hedged portfolio over time. This is also compared with a hedge using only the CDS, using the cross-sectional univariate regression hedge ratios. A time series analysis based on hedge ratios computed using rolling regressions has not been presented, since there are only 40 months of observations for both in-sample and out-of-sample analysis. However, it did not perform better than the cross-sectional hedge using VIX futures and CDS, for the few out-of-sample months for which there is data, based on 18 m rolling window regressions. Also, this short time series does not provide an insight into the crisis and pre-crisis months.

The summary statistics of the return time series are presented in FIG. 50. The standard deviation is lowest in the portfolio hedged with CDS and VIX. The extreme values are also lower, because the VIX usually moves in a direction opposite to the OAS. Despite the improvement in hedged results, significant portfolio volatility unfortunately remains even after hedging with CDS and VIX.

Alternative Spread Decomposition Model Specifications

In addition to the month-by-month regressions described above, one also may pool the data and run a single regression with month dummies and the default and liquidity proxies, as in Regression 2. This confirms the results presented above regarding the importance of expected default and liquidity cost variables to explain cross-sectional OAS variation.

As discussed above, the analysis so far has ignored bond-level risk premium variables. Instead, it was assumed that either the risk premium would be highly related to the expected liquidity cost itself or it would be captured by the market factor term, the constant. Another exemplary embodiment comprises an alternative spread decomposition model that includes a term to represent bond-level liquidity risk premium. This is the additional spread investors demand as compensation for the risk that the actual liquidity cost may be different from the expected liquidity cost as measured by LCS. As a measure of liquidity risk, one may calculate each bond's LCS volatility over the prior 12 months. So two bonds may have the same LCS today, but bond A may have had a much more volatile LCS history than bond B. An investor may then view bond A as having a riskier expected liquidity cost and demand an OAS premium versus bond B, all else being equal.

Regression (3) shows the spread decomposition model to incorporate a bond-level liquidity risk factor, $LCSVol_{i,t}$. The results, shown in FIG. 51, indicate that $LCSVol_{i,t}$ is highly significant but absorbs part of the effect of LCS (the coefficient of LCS declines by more than 20%, from 0.98 to 0.80), thereby not improving the regression's adjusted $R^2$ substantially, despite the high significance.

$$OAS_{it}=\alpha+\beta CDS_{it}+\gamma LCS_{it}+\phi LCSVol_{i,t}+\delta MonthDummy_t+\eta_{it} \quad (3)$$

One also may run a regression in differences, to check if the changes in OAS are explained by changes in LCS and CDS spreads. The results, in this example, hold in differences, too, suggesting that changes in liquidity and default proxies affect contemporaneous returns. Regression (4) details the specification, where $\Delta OAS_{it}$, $\Delta CDS_{it}$ and $\Delta LCS_{it}$ refer to changes in a bond's characteristics in consecutive months. The results are shown in FIG. 52, in which one can observe the significant coefficients of the explanatory variables.

$$\Delta OAS_{it}=\alpha+\beta \Delta CDS_{it}+\gamma \Delta LCS_{it}+\delta MonthDummy_t+\eta_{it} \quad (4)$$

One could also argue that the results above may be driven by outliers, especially since default and liquidity are arguably more important considerations for higher spread bonds. However, does this relationship hold as well for the bulk of the sample? To confirm this, one may run log regressions using the variables above (e.g., the dependent variable is log(OAS) instead of OAS, similarly for the independent variables), as in Regression (5). The conclusions from FIG. 53 are similar to those of Regression 2a, indicating that outliers are not driving the results.

$$\ln(OAS_{it})=\alpha+\beta \ln(CDS_{it})+\gamma \ln(LCS_{it})+\eta_{it} \quad (5)$$

The above discussion describes exemplary embodiments that decompose credit bond (OAS) spreads into risk premium, default cost, and liquidity cost components. One may find therein strong explanatory power for both investment grade and high yield bonds, using either CDS spreads or CDP/CRR as default proxies and LCS as a liquidity proxy. Liquidity is incrementally important (after considering default effects) throughout the sample period for investment grade bonds. However liquidity is generally important for high yield bonds only during stressful times. The results hold in a variety of specifications and datasets, including differences, logs, and additional controls. Spread decomposition can help portfolio managers understand spread movements better. Preliminary analysis suggests that this decomposition can be used for hedging, forecasting future OAS changes, and developing alpha strategies.

REFERENCES

Asvanunt, A. and A. Staal. Corporate Default Probability model in the Barclays Capital POINT platform, Barclays Capital, April 2009.

Asvanunt, A. and A. Staal. The POINT Conditional Recovery Rate (CRR) Model, Barclays Capital, August 2009.

Bhattacharya, B. and M. Trinh. Anatomy of the Risk Premium in Credit Markets, Lehman Brothers, 2006.

Collin-Dufresne, P., R. S. Goldstein, and J. S. Martin. The Determinants of Credit Spread Changes, Journal of Finance, Vol. 56, No. 6, pp. 2177-2207, (December 2001).

Dastidar, S. and B. Phelps, Introducing LCS: Liquidity Cost Scores for US Credit Bonds, Barclays Capital, Oct. 6, 2009.

Elton, E. J., M. J. Gruber, D. Agrawal, and C. Mann. Explaining the Rate Spread on Corporate Bonds, The Journal of Finance, Vol. 56: pp 247-277, 2001.

Ng, Kwok-Yuen and B. Phelps, Capturing Credit Spread Premium, Barclays Capital, Jun. 3, 2010.

FIGS. 54 and 56 include month-by-month regression results for an exemplary spread decomposition model using CDP as a default proxy for both IG (FIG. 54) and the HY bonds (FIG. 56). Results also are included for the HY bonds using CDS Spreads as the default proxy (FIG. 55).

Exemplary Embodiments: Tradable Credit Portfolio (TCX)

In an exemplary embodiment, TCX is a portfolio of 50 highly liquid cash bonds designed to track the Barclays Capital USD IG Credit Index. Those skilled in the art will recognize that similar portfolios may constructed based on other bond indices. Liquid bonds are identified by their Liquidity Cost Scores (LCS), an objective measure of bond-level liquidity. TCX's composition is rebalanced and published monthly.

TCX can be used to manage short-term credit beta exposure. It also may be used as a "creation" basket for credit ETFs benchmarked to the Credit Index. For investors looking for leveraged credit exposure, the high liquidity of TCX facilitates term repo financing. Investors also can combine opposite positions in the TCX and a Credit RBI swap to get exposure to the CDS-cash basis.

One may construct a TCX using a transparent stratified sampling approach that follows a set of rules and seeks to maintain very good issuer diversification (one example of TCX has averaged approximately 43 different issuers each month) and match the sector, duration, and DTS characteristics of the Credit Index.

From February 2007 through March 2010, TCX experienced an average excess return difference versus the Credit Index of −4 bp per month with a tracking error volatility of 90 bp per month.

Although there are rules to limit monthly TCX turnover, the TCX's high liquidity requirement can produce large monthly turnover in its composition. Over a three year period, the average monthly turnover was 35%.

To control turnover, investors who are looking for credit exposure for longer than a month can initially hold the monthly TCX portfolio and rebalance less frequently. For example, holding a TCX portfolio constant for three months significantly reduces the turnover (20% versus 35%), while still tracking the US Credit Index (TEV of 73 bp per month).

A quarterly version of the TCX may form the basis for a highly liquid credit index and total return swaps.

A Credit RBI® basket swap may be the best solution for investors seeking a much longer-term credit beta and who are less sensitive to monthly tracking error volatility. A Credit RBIS swap has produced reasonable long-term tracking (4.6 bp/month) at a modest cost with no turnover. However, the Credit RBI has experienced very high monthly excess return tracking error volatility (188 bp) relative to the Credit Index.

From time to time, investors wish to obtain exposure to short-term USD IG Credit beta in a form that is easy to trade (both long and short). Total return swaps (funded or unfunded) on the Credit Index are often unavailable. Index replication using cash bonds is difficult as it is sometimes hard to discern which bonds are liquid and, once identified, how to combine them into a portfolio to track the Credit Index.

In response, the present inventors have created TCX, which in an exemplary embodiment comprises a small portfolio of highly liquid cash bonds constructed to track the excess returns of the IG Credit Index. One may utilize Liquidity Cost Scores (LCS) to identify objectively the liquid universe of cash bonds from which to construct the TCX. One can also use a transparent proxy construction methodology (stratified sampling) that follows a set of rules.

The following description presents and analyzes exemplary TCX realized performance over a 38 month period (February 2007 to March 2010) and compares it with that of the IG Credit Index. In terms of excess returns (versus US Treasuries), the TCX has a monthly tracking error volatility of 89.9 bp versus the Credit Index, with an average excess return difference of −4.2 bp.

Since the set of the most liquid bonds is constantly changing, the composition of the TCX can experience high turnover and transactions cost from month-to-month despite controls to limit turnover. Investors looking for longer term (say, three months) credit beta can further limit turnover by holding the TCX composition constant for three months before rebalancing. Over the above 38 month period, the quarterly version of the TCX had more than 40% less turnover and transactions cost than the monthly TCX. The quarterly version also maintained good tracking to the Credit Index (monthly tracking error volatility of 73.1 bp). In this example, TCX and quarterly TCX all contained Lehman Brothers bonds immediately prior to its bankruptcy filing. Lehman Brothers was a very liquid bond right up to its filing. The lower TEV of the quarterly TCX was due to its more limited exposure to Lehman Brothers compared with the monthly TCX. This issue is discussed below. Despite the lower transactions cost and good tracking of the quarterly TCX, it is likely to be a costly source of credit beta for very extended periods.

For much longer-term (e.g., a year or more) credit beta needs, synthetic replication has produced reasonable long-term tracking at a modest cost. Synthetic replication of the Credit Index is typically executed via an RBI basket swap that uses a combination of funded interest rate swap indices and unfunded CDX indices. Over short periods, however, the Credit RBI has experienced very high tracking errors versus the Index due to the substantial volatility of the CDS-cash basis. Over the above 38 month period, the Credit RBI experienced excess return TEV of 188.3 bp versus the Credit Index. Consequently, investors looking for credit beta in expectation of short-term spread tightening or widening may be disappointed with the performance of synthetic replication.

Nevertheless, as the CDS-cash basis has (so far) demonstrated a tendency to mean revert, the Credit RBI has tracked the Credit Index well over longer horizons (average excess return difference of 4.6 bp/month). Given the liquidity and low cost of a Credit RBI, investors seeking much longer-term credit beta, and who have a low sensitivity to short-term tracking errors, may find the Credit RBI to be a cost effective solution.

Constructing an Exemplary TCX Portfolio

The goal of this exemplary TCX embodiment is to construct a small portfolio of highly liquid bonds to match the excess returns of the IG Credit Index. To create the TCX portfolio, one may divide the US Credit Index into five sectors (basic, consumer, financial, technology, and other) and five duration categories (0-3, 3-5, 5-7, 7-10, and 10+). For each of the resulting 25 buckets, one may identify the top 20% most liquid ("top LCS quintile") index bonds according to their LCS rank. One may augment this set of liquid bonds with the top LCS quintile of bonds by duration category. This combined set of bonds forms the "eligible" universe of bonds for the TCX. One may then use stratified sampling to select eligible bonds to match the contribution to DTS (spread duration-times-spread), as well as the market value percentage, of the Credit Index for each of the 25 sector-duration buckets. One could have used the Global Risk Model and its associated optimizer in POINT to construct TCX, but a stratified sampling approach that is broadly consistent with the risk model framework (i.e., sector/DTS) may be preferable. Stratified sampling offers two benefits. First, it allows one to construct the TCX in a transparent manner, and second, it provides some robustness to the portfolio's construction by making it less susceptible to risk parameter estimation errors.

One may match the contribution to DTS, as opposed to matching contribution to duration (OAD) or spread duration (OASD), because DTS is the best measure of a bond's credit spread volatility. However, matching contribution to DTS does not ensure that the TCX matches the OAD or key rate duration (KRD) profile of the IG Credit Index. Consequently, there may be a mismatch (usually minor) in OAD between the TCX and Credit Index. For investors who are looking to match duration as well, there will be a need for a duration adjustment elsewhere in the portfolio or a Treasury futures overlay. This is discussed in more detail below.

Exemplary TCX Construction Rules

In an embodiment, TCX is designed to be transparent and replicable. Consequently, TCX construction methodology may follow a set of rules. Exemplary rules comprise one or more of (but are not limited to) the following:

(1) TCX contains 50 bonds (generally two bonds from each of 25 sector-duration buckets).

(2) Each bond must be part of the TCX eligible universe (i.e., a member of IG Credit Index and top LCS quintile in given sector-duration bucket) at the beginning of the month. TCX excludes securities with embedded options (callables/putables). Composition of the Credit Index and LCS values are available from POINTS or Barclays Capital Live.

(3) For each sector-duration bucket, calculate a mean DTS ("$DTS_{avg}$"). Then calculate a mean DTS for all bonds in the Index belonging to the bucket with a DTS greater than $DTS_{avg}$ and for all bonds with a DTS less than $DTS_{avg}$. One may label these "higher" and "lower" means, $DTS_{hi}$ and $DTS_{lo}$, respectively. Then select two eligible bonds, one closest to $DTS_{hi}$ and the other closest to $DTS_{lo}$, and weight them to match the $DTS_{avg}$ and market value percentage of the bucket. If all eligible bonds in a given bucket are above or below $DTS_{avg}$, select the two eligible bonds closest to $DTS_{avg}$. The bond farther from $DTS_{avg}$ is assigned 50 bp and the bond closer to $DTS_{avg}$ is assigned the remaining weight. If a bucket has less than two bonds in the eligible universe, bonds are selected from the next higher duration bucket for the respective sector. The TCX will still look to match DTS and market value percentage for the original bucket.

(4) Maximum market value limit per issuer (ticker) at beginning of the month is 5%. In most months, all 25 sector-duration buckets had a market weight of less than 10%. One may match market weights and choose two bonds in each bucket without automatically violating the 5% ticker constraint. However, in some instances, the bucket weight may exceed 10%. As a rule, when that occurs, continue to choose two bonds and assign them equal weight within the bucket (thereby violating the 5% constraint) so long as the weight of the bucket does not exceed 12%. (If a bucket's weight were to exceed 12%, one may then add a 51st bond to the TCX and assign the additional bond to that bucket.) In a three-year period, a bucket exceeded 10% during 8 months (most recently in September 2008). The maximum bucket weight was 10.4%. The maximum ticker weight during those three years was 5.2%.

(5) Minimum market value limit per bond at beginning of the month is 0.5%.

(6) TCX contains no cash at the beginning of the month (interest payments received during the month are re-invested at daily Libor).

(7) TCX composition is held fixed for a calendar month. Any bond downgraded below investment grade remains in the TCX until the following month.

(8) Rebalance TCX on the last business day of each month. To help minimize turnover, if a bond in the current TCX remains in the eligible universe, the bond will remain in the new month's TCX (provided the other TCX construction constraints are satisfied), although its market value weight may change.

FIG. 57 presents an exemplary composition of a TCX as of 31 Mar. 2010. As measured by LCS, the TCX has a liquidity score almost twice as good (i.e., low) as the Index (0.43 vs. 0.84). The superior liquidity of the TCX is also manifested in other dimensions: As of 31 Mar. 2010, the average volume (from TRACE) of the TCX was approximately 80% higher than that of the index (~$298 mn vs. ~$163 mn).

Note that one may select bonds for the TCX based entirely on their risk and liquidity characteristics, not on any relative value considerations. However, investors using the TCX have latitude to make substitutions of their own according to their views.

Properties of an Exemplary TCX Portfolio

Number of Issuers

Using bond and LCS data from as far back as February 2007, an exemplary 50-bond TCX portfolio would have contained approximately 43 different issuer names (see FIG. 58), compared with approximately 650 different names in the IG Credit Index. Any small proxy will have higher issuer concentration than the Index. However, to ensure issuer diversity, the TCX imposes a maximum issuer market value constraint of 5% at the beginning of each month. FIG. 58 shows that the number of issuers in the TCX would have ranged from 39 to 47 over a 39 month period.

Liquidity

Since only bonds in the top LCS quintile (by sector-duration bucket) are eligible for the TCX, the TCX has a liquidity advantage versus the IG Credit Index. FIG. 59 shows the magnitude of this advantage since February 2007. The average beginning-of-the-month LCS of the TCX has been approximately 48% lower than that of the US Credit Index with the absolute difference varying with the overall LCS market level. Furthermore, not only does the TCX have a better (i.e., lower) average LCS, but the cross-sectional distribution of its LCS scores is much tighter than that of the Index (see FIG. 60).

Portfolios with better liquidity often trade at a yield concession to the market. TCX is no exception. FIG. 61 shows the yield of the TCX and the US Credit Index over a three year period. Over this period, the TCX would have traded, on average, at a yield concession of 7 bp to the Credit Index. As of 31 Mar. 2010, however, the TCX actually had a 1 bp yield advantage over the Credit Index.

DTS

By construction, the exemplary TCX closely matches the DTS of the IG Credit Index. As credit investors typically focus on capturing the excess return of credit to Treasuries, as opposed to total return, it is preferable to match the index's spread change sensitivity (which one may measure by DTS) rather than Treasury-duration sensitivity. In some months, an exact DTS match may not be possible if the set of liquid bonds in a sector-duration bucket do not have sufficient DTS range, or if the minimum and maximum issuer constraints prevent a perfect DTS match. Nevertheless, as shown in FIG. 62, the DTS match for TCX and the Credit Index has been very close.

OAD

As discussed, since the TCX does not explicitly match the OAD of the Index, there may, at times, be an OAD mismatch between the TCX and Credit Index. The TCX will tend to have a slightly higher OAD than the Credit Index, due to the positive relationship between LCS and OAS. Since TCX selects bonds from the top LCS quintile, within a given sector-duration category, the set of eligible TCX bonds will likely be bonds with relatively tighter spreads. As a result, the TCX will tend to select longer-duration bonds to match to DTS, all else constant. FIG. 63 shows the OADs of TCX and the Credit Index. The largest beginning-of-the-month absolute OAD gap (0.24) occurred in May 2008. The average absolute OAD gap since February 2007 was 0.08, with an average OAD gap of 0.06.

For investors needing an OAD match as well, an adjustment can be made. For example, suppose the TCX matches the contribution to DTS of the Credit Index but is short 0.10 in OAD terms. A manager investing $100 mn in the TCX expects to earn the excess return of the Credit Index on his or her investment. However, the total return on the TCX may differ from the Credit Index due to the OAD mismatch. If desired, the investor can make up for this by either extending the duration of the Treasury-portion elsewhere in his or her portfolio or executing a Treasury futures overlay to the TCX to match the Index's duration.

TCX Performance vs. USD IG Credit Index

Excess Returns

An objective of an exemplary embodiment of TCX is to match the monthly excess returns (to US Treasuries) of the IG Credit Index. FIG. 64 compares the TCX and Credit Index excess return performance since February 2007. For the 38-month period, the average monthly excess return for the TCX was −4.7 bp, compared with −0.5 bp for the US Credit Index, a difference of −4.2 bp per month. FIG. 65 shows that in terms of monthly excess returns, the TCX and Index have tracked each other closely since February 2007.

Most of the average monthly excess return difference between the TCX and Credit Index occurred in September 2008 when the TCX held a 3.5% position in Lehman Brothers, much higher than the Credit Index's 1.2% weight. Had the TCX held the same weight of Lehman as the Credit Index during that month, the average monthly excess return difference between the TCX and Credit Index would have been 1.1 bp. For reference, FIG. 64 shows, in brackets, the excess return statistics assuming TCX did not have the 2.3% overweight to Lehman in September 2008. The excess return number was adjusted by assuming in September 2008 that the TCX held 1.2% of Lehman Brothers and that the remaining weight (2.3%) earned the average financial sector return for the month (−12.9%). This adjustment alone would have increased the performance of the TCX by ~200 bp, producing a tracking error of −238 bp in that month rather than −438 bp.

Over the entire 38-month period, the standard deviation of excess returns was 284 bp and 239 bp for the TCX and Index, respectively. The correlation of their monthly excess returns over the period was 0.96. Without the overweight to Lehman Brothers, the standard deviation would have been 264 bp and 239 bp for the TCX for the Index, respectively, and the correlation of their monthly excess returns would have been 0.97.

In addition to analyzing the period as a whole, one may look (see FIG. 64) at how the tracking effectiveness of TCX differed before and after the onset of the credit crisis.

Prior to the full onset of the crisis, the TCX tracked the Credit Index with relatively low volatility (27.9 bp/month), as expected. However, there were some months with large return differences, resulting in an average tracking error of −7.2 bp/month. These outlier months were the result of some poor-performing financial bonds held by the TCX, particularly from March 2008 onward.

However, as mentioned, the TCX's overexposure to Lehman Brothers produced a large tracking error in September 2008 (−438 bp) that caused the TEV of the TCX with respect to the Credit Index to increase to 122.6 bp for the second period. Nevertheless, during each sub-period, the correlation of their excess returns was at least 0.95. Overall, TCX tracked the excess returns of the Credit Index well despite a particularly volatile three-year period. FIG. 66 shows the time series in the monthly difference in excess returns between the TCX and Credit Index.

FIG. 67 shows the cumulative excess return difference between the TCX and the Index over the period. Until the crisis, the TCX had a maximum cumulative underperformance of about 160 bp. While the full onset of the crisis produced a cumulative underperformance of 567 bp (September 2008), this was, nevertheless, relatively modest to the Index's cumulative excess return at the time of 2,500 bp—see FIG. 76. Moreover, as the crisis persisted and TCX stuck with highly liquid bonds, the cumulative excess return underperformance quickly reversed. By March 2010, the net cumulative underperformance was −160 bp, in large part owing to the permanent effect of the Lehman Brothers bankruptcy in September 2008. Without the aforementioned overweight to Lehman during that month, the cumulative excess return difference between TCX and Credit Index would have been 40 bp by March 2010.

Total Returns

As discussed above, from time to time, there may be a modest OAD (and KRD) mismatch between TCX and the Credit Index. To more precisely compare the total return performance of TCX and the Credit Index, one may add the returns from a Treasury futures overlay to the TCX to match the KRDs of the Credit Index. One may then compare the TCX's (with overlay) total returns with those of the Credit Index.

FIG. 68 shows summary statistics for the TCX total returns with and without the futures overlay. (FIG. 69 shows the time series of total returns for the TCX, with overlay, and the Credit Index—very similar to the time series for excess returns.) As expected, given the small OAD (and KRD) mismatches, the impact of the futures overlay on total returns is small in terms of mean and standard deviation. The effect on the extreme maximum and minimum returns is small as well. Over the entire 38-month period, the TCX (with and without the futures overlay) tracked the total returns of the US IG Credit Index well.

The worst and best months for TCX versus the Index in terms of total returns were the same as for excess returns.

Exemplary TCX Turnover and Transactions Cost

While a bond's liquidity (e.g., LCS) is persistent, it is not constant. It fluctuates with changes in the bond's attributes (e.g., DTS and age) and with its level of trading volume and trader quoted status. In addition, new bonds are constantly entering the Credit Index which, given the attention often bestowed on new issues, may give them relatively good LCS. As a result, bonds will move in and out of TCX over time. This generates TCX monthly turnover as bonds lose eligibility and new, more liquid bonds become available. Turnover also arises from reweighting the market value weights of bonds remaining in the TCX to match contribution to DTS each month.

FIG. 70 shows the monthly total change in the market value percentages across all bonds entering, leaving, and remaining (but with a revised market value weight) in the exemplary TCX each month. Over the entire three-year period, the TCX averaged a monthly turnover of 35%. However, turnover varied throughout the period. For example, turnover was much higher in November 2008-December 2008 (average=49%), when newly illiquid bonds needed to be replaced, and is currently below 30% as the credit markets have stabilized. Note that this description presents exemplary ongoing TCX monthly rebalancing costs, not initial cost to enter into a TCX or liquidation cost to close it out.

While turnover is a good indicator of the cost of maintaining the TCX portfolio over time, one can use LCS to obtain an even better estimate of transactions cost. Since the exemplary TCX uses the same bid-side pricing as the Credit Index, one could estimate transactions cost for the TCX by simply multiplying the transaction market value for all buy transactions by the bond's LCS at the time of entering (or increasing its market value weight in) the TCX. For sell transactions, one could assume that the bonds are sold at the index bid price with no additional cost. However, since bonds leaving the TCX are generally less liquid than when they entered it, one can estimate a more conservative value for transactions cost by using 70% of a bond's LCS when the bond is purchased and 30% of its LCS at the time of sale. Liquidity Cost Scores are based solely on the bid-ask spreads of Barclays Capital traders. The effective bid-ask spread faced by investors may be tighter as they have the benefit of approaching multiple broker/dealers. The true cost of transacting on the TCX may be lower. The 70%-30% split is a way to be more conservative in estimating the TCX's transactions cost.

FIG. 71 shows the monthly transactions cost over the 38-month period. The average monthly cost was 30 bp (allocating 100% of the transactions cost using the LCS at time of entering the TCX, one may estimate the monthly TCX transactions cost to be 27 bp). The monthly transactions cost was more volatile than the monthly turnover as it changed with the overall market LCS level. From March 2007 through July 2008, the average cost was 21 bp per month. Following the onset of the crisis, LCS scores increased significantly, resulting in an average monthly transactions cost of 38 bp, peaking at 102 bp going into November 2008. This is not surprising given the combination of high percentage turnover and the elevated level of LCS. Monthly transactions cost for TCX is currently below 20 bp.

Quarterly Rebalancing to Control TCX Turnover and Transactions Cost

Given the high monthly turnover, investors wanting longer-term credit exposure may wish to hold a TCX portfolio for a quarter before rebalancing, rather than rebalancing monthly. While the "quarterly" TCX rebalancing strategy may produce higher excess return tracking errors, the increase may be tolerable, given the possibility of much lower turnover and transactions cost. While the quarterly TCX does have significantly lower transactions cost, there is only a modest change in its TEV versus the Credit Index. In fact, its TEV falls relative to the monthly TCX, but this is due to the relatively lower Lehman Brothers exposure in the quarterly TCX.

In an exemplary embodiment, one may define a quarterly rebalancing strategy for the TCX as follows: given the initial month's TCX, hold the composition fixed for three months and then rebalance according to the TCX rules. This strategy generally may produce more turnover at each quarterly rebalancing point compared with a typical monthly rebalancing, but the overall amount of rebalancing may be reduced over the three-month period. If so, the issue would then be the excess return tracking error performance of the quarterly TCX.

One may construct three versions of the quarterly TCX. Each version corresponds to the starting month. Version 1 ("V1") begins February 2007, V2 on March 2007 and V3 on April 2007. Each quarterly TCX version is held unchanged for three months. Any cash received during the course of the quarter is invested at Libor. FIG. 72 presents the monthly excess returns and excess return tracking errors versus the Credit Index for the three quarterly TCX versions.

Over the 38 month period, the quarterly TCX tracked the Credit Index with a TEV of 73.1 bp averaged over the three quarterly TCX versions. As shown in FIG. 72, the tracking performance of the quarterly TCX varied quite a bit among the three versions. This can be entirely attributed to September 2008 and name selection risk inherent in small proxy portfolios. As the quarterly versions of the TCX are rebalanced at different times, their compositions will vary and performances can deviate in the identical time period. V2 had a 2.3% overweight to Lehman and a 3.6% overweight to AIG during the month. In contrast, V1 had the same overweight to Lehman, but did not own AIG. V3 has the lowest tracking error of the quarterly versions as it did not own AIG and had less exposure to Lehman (0.8% overweight). The net excess return of V3 was −154.6 bp during September, compared with −320.7 bp and −438.7 bp for V1 and V2, respectively.

FIG. 72 also shows that the monthly TCX had higher TEV than the average quarterly TCX. This, too, can be explained by September 2008, when the holdings of the monthly TCX were the same as those of V2. With the overweight to Lehman and AIG, the monthly TCX underperformed V1 and V3 by 118.0 bp and 284.1 bp, respectively. This outlier month was enough to cause the TEV of the monthly TCX to be significantly higher than that of V1 and V3. To more clearly evaluate the effect on TEV of holding a TCX constant for three months, one may compare the monthly TCX and V2 which had the same performance in September. Their nearly identical TEV illustrates that holding a monthly TCX for three months produces comparable tracking error volatility to the monthly TCX. This result is not too surprising. Given that the composition of the Credit Index changes slowly over time, and the TCX contains highly liquid bonds that match the sector-duration DTS of the Index, tracking should generally remain close over three months.

FIG. 72 also shows the average relative LCS of the quarterly TCX (as a percentage of the Credit Index LCS) at the beginning and end of each quarter and compares it with the average relative LCS of the monthly TCX at the beginning and end of each month. As one might expect, the monthly and quarterly TCX show a drop-off in relative liquidity versus the index. However, the quarterly TCX incurs only a modest relative LCS deterioration, despite holding the portfolio constant for an additional two months.

The quarterly TCX does help reduce turnover. From February 2007 to February 2010, the average monthly turnover (i.e., quarterly turnover divided by 3) for the quarterly TCX was 20% for all three versions of the quarterly TCX, compared with 35% for the monthly TCX. FIG. 73 shows the turnover pattern for the monthly and quarterly TCX versions.

The quarterly TCX helps reduce transactions cost as well (see FIG. 74), whereas rebalancing the TCX monthly generated 30 bp of transactions cost, holding the TCX for a quarter reduced the monthly cost to 17 bp. Allocating 100% of the transactions cost using the LCS at time of entering the TCX, one may estimate the monthly transactions cost to be 15 bp.

Long-Term Credit Beta: Synthetic Credit Replication (Credit RBI® Swaps)

For clients looking for credit beta over sustained periods, the high turnover of the TCX is likely to be cost prohibitive. For clients needing a much longer-term (say, a year or more) credit beta, and one not sensitive to monthly tracking error, a Credit RBI basket swap is an effective alternative. To track the Credit Index, in an exemplary embodiment a Credit RBI basket uses a combination of six par interest rate swaps to match the KRD profile of the Index and a blend of CDX 5 y and 10 y swaps to match the Index's Libor spread duration. (See, for example, Replicating Bond Index Baskets (RBI®s): Performance, Risks and Alternative RBI Baskets, Barclays Capital, Oct. 7, 2009).

In an exemplary embodiment, a client can enter into a Credit RBI swap to receive the total return on the RBI basket and pay Libor plus a spread. An advantage of a Credit RBI swap is that the underlying components of the RBI basket are very liquid instruments, enabling quick and efficient execution (either long or short). Also, given the low transactions costs of the underlying instruments, a Credit RBI basket swap can be executed at relatively low cost (i.e., at a modest spread over Libor). Finally, a Credit RBI swap allows investors to gain unfunded exposure to the Credit Index. While exposure to the TCX can be obtained via repo, many investors will obtain TCX exposure only on a fully funded basis.

An issue for the Credit RBI is that using CDX to track credit spreads to swaps is susceptible to the particularly volatile CDX-cash basis. Especially during periods of illiquidity, the basis can become very negative, causing the Credit RBI to outperform the Index as credit excess returns deteriorate, and vice versa. Over a three year period, the Credit RBI displayed very high excess return tracking errors. However, to the extent that the basis has tended to mean revert over time to a level close to zero, the Credit RBI has shown good long-term tracking potential. In addition, while the Credit RBI is susceptible to the volatility of the CDX-cash basis, it avoids the idiosyncratic risk of name selection inherent with any small cash proxy.

FIG. 75 shows the excess returns (to US Treasuries) for the Credit Index and Credit RBI. From February 2007 to March 2010, the Credit RBI displayed a different pattern of excess returns than the Credit Index. The mean excess return for the Credit RBI was 4.1 bp, with a standard deviation of 140 bp, compared with −0.5 bp, and a standard deviation of 239 bp, for the Index. Over the period, the monthly TEV between the Credit RBI and Credit Index was 188 bp, twice that of the TCX.

Looking at the two sub-periods, the Credit RBI performed much better than the Index through July 2008 and performed worse since August 2008. The Credit RBI also had somewhat larger extreme returns than the Index in the first sub-period, but much smaller extreme returns in the second. The TEV for the Credit RBI in the first sub-period was 140 bp (compared with the TCX's 28 bp), and in the second sub-period it was 226 bp (123 bp).

Unlike the TCX, the Credit RBI exhibited large deviations in excess returns to the Credit Index. FIG. 76 presents the cumulative excess returns (to US Treasuries) for TCX, Credit RBI, and Credit Index since February 2007 and shows that the excess return for the Credit RBI did not track the excess returns of the Index. This is not surprising as the Credit RBI is composed of interest rate swaps whose returns may not always track the Index due to fluctuations in credit spreads to swaps. In addition, while the Credit RBI does contain a blend of 5 y and 10 y CDX swaps to pick up changes in credit spreads to swaps, the CDX-cash basis became very negative as the credit crisis unfolded but reverted back toward zero as the crisis abated. This caused the Credit RBI to have large (positive) tracking errors to the Credit Index during the crisis and large (negative) tracking errors as the credit market recovered.

While the correlation of monthly excess returns between the TCX and Credit Index was 0.96 for the entire period, the correlation in excess returns between the Credit RBI and Credit Index was only 0.61. To see this another way, one may plot the monthly excess returns for the Credit RBI against those of the Credit Index and do the same for TCX. As shown in FIG. 77, the excess returns for the TCX-Index pair line up closely to the 45 degree line, whereas those for the Credit RBI-Index pair do much less so.

Despite the tendency for high monthly tracking errors during volatile periods, if investors are insensitive to monthly volatility, and if they have a view that the movement in the CDX-cash basis will always tend to revert (eventually), then the Credit RBI can be a productive source of long-term credit beta (see FIG. 78).

For the Credit RBI, one may consider data covering a longer period (say, April 2004 to February 2010). For this longer time, the tracking error of excess returns versus the Credit Index is much lower (138 bp) than the recent three-year period (188 bp). From April 2004 to January 2007, the excess return tracking error volatility for the Credit RBI was only 22 bp. This suggests that for periods with stable index excess returns, the Credit RBI does a good job tracking the Index.

In this context, the advantage of the Credit RBI is its low cost, compared with a strategy of investing in the TCX as a source of long-term credit beta.

Investors seeking long-term credit beta via a Credit RBI are advised to exercise caution. Since the Credit RBI can have large deviations from the Index, investors need to guard against receiving on the Credit RBI swap in periods following large negative Index excess returns, and vice versa.

Summary Regarding Exemplary Embodiments of TCX

TCX provides a transparent approach to tracking the US Credit Index with a small set of highly liquid cash bonds. Overall, it did so quite well, even through a tumultuous period and holding an overweight to defaulted bonds. During the exemplary three year period, the TCX proved to be a better tracking alternative than synthetic replication, with a lower mean tracking error and significantly lower tracking error volatility than the Credit RBI. Nevertheless, cash replication involves relatively high transactions cost, which may limit TCX to investors seeking short-term tactical credit beta.

For clients needing intermediate term credit beta, a quarterly TCX strategy has much lower transactions cost with good tracking. The properties of the quarterly TCX make it useful as the basis for a liquid credit index and total return swaps.

For much longer-term credit exposure, of a year or longer, synthetic replication has done reasonably well with significantly lower transactions cost.

The exemplary TCX methodologies described herein can be extended to the US Long Credit Index and the US HY Index, as will be apparent to those skilled in the art Exemplary Embodiments Comprising Long Tradable Credit Portfolio (LTCX)

LTCX, in an exemplary embodiment, is a portfolio of 36 highly liquid cash bonds designed to match the excess returns of the Barclays Capital USD IG Long (i.e., 10+ years) Credit Index. Liquid bonds may be identified by their Liquidity Cost Scores (LCS). LTCX's composition is rebalanced and published monthly.

LTCX can be used to manage short-term exposure to long credit beta. It may also be used as a "creation" basket for credit ETFs benchmarked to the Long Credit Index. For investors looking for leveraged credit exposure, the high liquidity of LTCX facilitates term repo financing.

One may construct an exemplary embodiment of LTCX using a transparent stratified sampling approach that follows a set of rules, has good issuer diversification (the LTCX has averaged approximately 34 different issuers each month), and closely matches the sector and DTS characteristics of the Long Credit Index.

Using data from February 2007 through April 2010, LTCX experienced an average excess return difference versus the Long Credit Index of −1.2 bp per month with a tracking error volatility of 50.3 bp per month.

Investors who are looking for credit exposure of longer than a month could initially hold the monthly LTCX portfolio and then rebalance less frequently. For example, holding an LTCX portfolio constant for three months significantly reduces the turnover while still tracking the US Long Credit Index quite well (average excess return of 4.4 bp and TEV of 54.6 bp per month).

A quarterly version of the LTCX may form the basis for a highly liquid long credit index and total return swaps.

A Credit RBI® basket swap may be the best solution for investors seeking a much longer-term credit beta and who are less sensitive to tracking error volatility. A Credit RBI® swap has produced reasonable long-term tracking (4.4 bp/month) at a modest cost with no turnover. However, the Credit RBI has experienced very high monthly excess return tracking error volatility (336 bp) relative to the Credit Index.

Described above are exemplary embodiments of TCX, Tradable Credit Portfolio, a small basket of liquid bonds designed to track the US IG Credit Index. TCX offers investors a way to obtain short-term exposure to US IG Credit beta in a form that is easy to trade (both long and short). Described below are exemplary embodiments of LTCX, a small basket of liquid credit bonds constructed to track the IG Long Credit Index.

One may again use Liquidity Cost Scores (LCS) to identify the liquid universe of cash bonds from which to objectively construct the LTCX. One also may use a transparent proxy construction methodology (stratified sampling) that follows a set of rules.

Exemplary LTCX realized performance based on data over a 39 month period (February 2007 to April 2010) is described and compared to that of the IG Long Credit Index. In terms of excess returns (versus US Treasuries), this exemplary LTCX has a monthly tracking error volatility of 50.3 bp relative to the Long Credit Index, with an average excess return difference of −1.2 bp.

Since the set of the most liquid bonds is constantly changing, the composition of the LTCX can experience high turnover and transactions cost from month-to-month despite controls to limit turnover. To help address this issue, investors can hold the monthly rebalanced LTCX for a quarter with minimal deterioration in the portfolio's tracking properties. Despite the lower transactions cost and good tracking of the quarterly LTCX, it is likely to be a costly source of credit beta for very extended periods.

As discussed above regarding TCX, for investors seeking much longer-term (e.g., a year or more) credit beta, synthetic replication has produced reasonable long-term tracking at a modest cost. Synthetic replication of the Long Credit Index is typically executed via an RBI basket swap that uses a combination of funded interest rate swap indices and unfunded CDX indices. Over short periods, however, the Long Credit RBI has experienced very high tracking errors versus the Index because of the substantial volatility of the CDX-cash basis. Over the exemplary 39 month period, the RBI experienced excess return TEV of 335.9 bp versus the Long Credit Index. Given this short-term tracking error volatility, investors using synthetic replication for long credit beta in expectation of short-term spread tightening or widening may be disappointed.

Nevertheless, as the CDX-cash basis has (so far) demonstrated a tendency to mean revert, the Long Credit RBI has tracked the Long Credit Index well over longer horizons (average excess return difference of 4.3 bp/month). Given the liquidity and low cost of a Credit RBI, investors seeking much longer-term credit beta, and who have a low sensitivity to short-term tracking errors, may find the Credit RBI to be a cost effective solution.

Constructing an Exemplary LTCX Portfolio

To create an exemplary LTCX portfolio, one may follow the same general approach as for the TCX. First, divide the US Long Credit Index into nine sectors (banking, basic, communications, electric, energy, financial, government-related, industrial, and non-cyclical). Within each sector, break down bonds between those below and above the average duration of the sector. For each of the resulting 18 buckets, identify the top 20% most liquid ("top LCS quintile") index bonds according to their LCS rank. Augment this set of liquid bonds with the top LCS quintile of bonds by duration category. This combined set of bonds forms the "eligible" universe of bonds for the LTCX. Then use stratified sampling to select eligible bonds to match the contribution to DTS (spread duration-times-spread), as well as the market value percentage, of the Long Credit Index for each of the 18 sector-duration buckets. Note that one also use, for example, POINT's Global Risk Model and optimizer to construct an LTCX, but a more transparent stratified sampling approach may be preferable.

Next, match the contribution to DTS for each of the sector-duration buckets. Since matching contribution to DTS does not ensure that the LTCX matches the OAD or key rate duration (KRD) profile of the Index, there may be a mismatch in OAD between the LTCX and the Index. For investors who are looking to match duration as well, there will be a need for a duration adjustment elsewhere in the portfolio or a Treasury futures overlay.

Exemplary LTCX Construction Rules

LTCX is designed to be transparent and replicable. In an exemplary embodiment, LTCX construction methodology follows a set of rules:

(1) LTCX contains 36 bonds (two bonds from each of the 18 sector-duration buckets).

(2) Each bond must be part of the LTCX eligible universe (i.e., a member of IG Long Credit Index and top LCS quintile in given sector-duration bucket) at the beginning of the month. LTCX excludes securities with embedded options (callables/putables) as well as zero-coupon bonds. Composition of the Long Credit Index and LCS values may be obtained, for example, from POINT® or Barclays Capital Live.

(3) For each sector-duration bucket, one may calculate a mean DTS ("DTSavg").

Then calculate a mean DTS for all bonds in the Index belonging to the bucket with a DTS greater than DTSavg and for all bonds with a DTS less than DTSavg. Label these "higher" and "lower" means, DTShi and DTSlo, respectively. Then select two eligible bonds, one closest to DTShi and the other closest to DTSlo, and weight them to match the DTSavg and market value percentage of the bucket. If all eligible bonds in a given bucket are above or below DTSavg, select the two eligible bonds closest to DTSavg. The bond farther from DTSavg is assigned 50 bp and the bond closer to DTSavg is assigned the remaining weight. If a bucket has less than two bonds in the eligible universe, bonds are selected from the next higher duration bucket for the respective sector. The LTCX will still look to match DTS and market value percentage for the original bucket.

(4) Maximum market value limit per issuer (ticker) at beginning of the month is 6%.

(5) Minimum market value limit per bond at beginning of the month is 0.5%.

(6) LTCX contains no cash at the beginning of the month (interest payments received during the month are reinvested at daily Libor).

(7) LTCX composition is held fixed for a calendar month. Any bond downgraded below investment grade remains in the LTCX until the following month.

(8) Rebalance LTCX on the last business day of each month. To help minimize turnover, if a bond in the current LTCX remains in the eligible universe, the bond will remain in the new month's LTCX (provided the other LTCX construction constraints are satisfied), although its market value weight may change.

FIG. 79 presents an exemplary composition of an LTCX as of 30 Apr. 2010. As measured by LCS, the LTCX has a liquidity score 43% better (i.e., lower) than the Index (0.82 vs. 1.43). The superior liquidity of the LTCX is also manifested in other dimensions: As of 30 Apr. 2010, the average volume (from TRACE) per bond of the LTCX was approximately double that of the Index (~$182 mn vs. ~$94 mn).

As with TCX, one may select bonds for the LTCX based entirely on their risk and liquidity characteristics, not on any relative value considerations. However, investors using the LTCX have latitude to make substitutions of their own according to their views.

Properties of an Exemplary LTCX Portfolio

Some exemplary properties of an exemplary LTCX portfolio are described below.

Number of Issuers

Based on data starting in February 2007, an exemplary 36-bond LTCX portfolio has contained approximately 34 different issuer names (see FIG. 80), compared with approximately 350-400 different names in the IG Long Credit Index. Although any small proxy will have higher issuer concentration than the Index, the LTCX forces diversification by imposing a maximum issuer market value constraint of 6% at the beginning of each month. FIG. 80 shows that the number of issuers in the LTCX has ranged from 32 to 36 over a 40 month period.

Liquidity

Because each bond in an exemplary embodiment of LTCX comes from the top LCS quintile (by sector-duration bucket), the LTCX has a liquidity advantage versus the Index. FIG. 81 shows how this advantage has varied over time. The average beginning-of-the-month LCS of the LTCX has been approximately 43% lower than that of the US Long Credit Index. Furthermore, not only does the LTCX have a better (i.e., lower) average LCS, but also the cross-sectional distribution of its LCS scores is much tighter than that of the Index (see FIG. 82).

Portfolios with better liquidity often trade at a yield concession to the market. LTCX is no exception. Over this period, the LTCX has traded, on average, at a 6 bp lower yield than the Index.

DTS

By construction, the LTCX closely matches the DTS of the IG Long Credit Index. As credit investors typically focus on capturing the excess return of credit to Treasuries, as opposed to total return, it is preferable to match the index's spread change sensitivity (which one may measure by DTS) rather than Treasury-duration sensitivity. In some months, an exact DTS match may not be possible if the set of liquid bonds in a sector-duration bucket do not have sufficient DTS range, or if the minimum and maximum issuer constraints prevent a perfect DTS match. Nevertheless, as shown in FIG. 83, the DTS match for LTCX and Long Credit Index has been very close.

OAD

Since the LTCX does not explicitly match the OAD of the Index, there may be an OAD mismatch between the LTCX and Long Credit Index. The LTCX will tend to have a slightly higher OAD than the Index, owing to the positive relationship between LCS and OAS. (See the TCX section above for a discussion of this issue.) FIG. 84 shows the OADs of LTCX and the Long Credit Index. The largest beginning-of-the-month absolute OAD gap (0.48) occurred in August 2009. The average absolute OAD gap since February 2007 was 0.20, with an average OAD gap of 0.18.

For investors needing an OAD match as well, an adjustment can be made. For example, suppose the LTCX matches the contribution to DTS of the Long Credit Index but is long 0.10 in OAD terms. Managers investing $100 mn in the LTCX expect to earn the excess return of the Long Credit Index on their investment. However, the total return on the LTCX may differ from the Long Credit Index because of the OAD mismatch. If desired, the investors can make up for this by either shortening the duration of the Treasury-portion elsewhere in their portfolio or executing a Treasury futures overlay to the LTCX to match the Index's duration.

Exemplary LTCX Performance vs. USD Long IG Credit Index

Excess Returns

An objective of one or more exemplary embodiments of LTCX is to match the monthly excess returns (to US Treasuries) of the IG Long Credit Index. FIG. 85 compares an exemplary embodiment of LTCX and Index excess return performance since February 2007. For the 39-month period, the average monthly excess return for the LTCX was 1.1 bp, compared with 2.3 bp for the US Long Credit Index, a difference of −1.2 bp per month. FIG. 86 shows that in terms of monthly excess returns, the LTCX and Index have tracked each other closely since February 2007.

Over the entire 39-month period, the standard deviation of excess returns was 389 bp and 367 bp for the LTCX and Index, respectively. The correlation of their monthly excess returns over the period was 0.99. Overall, LTCX tracked the excess returns of the Index well despite a spectacularly volatile three-year period.

Total Returns

As discussed above, from time to time, there may be a modest OAD (and KRD) mismatch between LTCX and the Long Credit Index. To more precisely compare the total return performance of the LTCX and the Credit relative to the Index, one may add the returns from a Treasury futures overlay to the LTCX to match the KRDs of the Credit Index. One may then compare the LTCX's (with overlay) total returns with those of the Long Credit Index.

FIG. 87 shows exemplary summary statistics for the LTCX total returns with and without the futures overlay. FIG. 88 shows the time series of total returns for the LTCX, with overlay, and the Long Credit Index—very similar to the time series for excess returns. Given the small OAD (and KRD)

mismatches, the effect of the futures overlay on total returns is small in terms of mean and standard deviation. The effect on the extreme maximum and minimum returns is small as well. Over the entire 39-month period, the LTCX (with and without the futures overlay) tracked the total returns of the US IG Long Credit Index well.

Exemplary Embodiments Comprising Quarterly LTCX

Although there are rules to limit monthly LTCX turnover, the LTCX's high liquidity requirement can produce large monthly turnover in its composition. Although a bond's liquidity (e.g., LCS) is persistent, it is not constant. It fluctuates with changes in the bond's attributes (e.g., DTS and age) and with its level of trading volume and trader-quoted status. In addition, new, perhaps more liquid, bonds are constantly entering the Index. As a result, bonds will move in and out of LTCX over time. Turnover also arises from re-weighting the market value weights of bonds remaining in the TCX to match contribution to DTS each month.

To reduce turnover, investors wanting longer-term credit exposure may opt to hold an LTCX portfolio for a quarter before rebalancing, rather than rebalancing monthly. One may define a quarterly rebalancing strategy for the LTCX as follows: Given the initial month's LTCX, hold the composition fixed for three months and then roll the portfolio into the new monthly LTCX. Construct three versions of the quarterly LTCX. Each version corresponds to the starting month. For example, Version 1 ("V1") begins February 2007, V2 on March 2007 and V3 on April 2007. Each quarterly LTCX version is held unchanged for three months. Any cash received during the course of the quarter is invested at Libor.

As with the TCX, investors can have confidence using the LTCX for their credit beta for at least three months, while significantly reducing turnover and transactions cost. FIG. 89 presents the monthly excess returns and excess return tracking errors for the three quarterly LTCX versions compared with the Long Credit Index. Over the 39 month period, the quarterly LTCX has tracked the Credit Index with a TEV of 54.6 bp averaged over the three quarterly LTCX versions. This compares quite favorably with the monthly LTCX, for which the TEV was 50.3 bp, only 4 bp lower. Given that the composition of the Long Credit Index changes slowly over time, and the LTCX contains highly liquid bonds that match the sector-duration DTS of the Index, tracking should generally remain close over at least three months.

FIG. 89 also shows the average relative LCS of the quarterly LTCX (as a percentage of the Credit Index LCS) at the beginning and end of each quarter and compares it with the average relative LCS of the monthly LTCX at the beginning and end of each month. The monthly and quarterly LTCX show a drop-off in relative liquidity versus the index. However, the quarterly LTCX incurs only a modest relative LCS deterioration, despite the quarterly holding period.

FIG. 90 shows an exemplary turnover pattern for the LTCX. Turnover is calculated as the monthly total change in the market value percentages across all bonds entering, leaving, and remaining (but with a revised market value weight) in the LTCX each month. Over the entire three-year period, turnover for the monthly LTCX averaged 39%. Although turnover is a good indicator of the cost of maintaining the LTCX portfolio over time, one may use LCS to obtain an even better estimate of transactions cost. Using a transactions cost estimation method such as that described above in the TCX section, one may compute average monthly transactions cost of 56 bp.

The quarterly LTCX helps substantially reduce both turnover and transactions cost. Whereas rebalancing the LTCX monthly generated turnover of 39% and 56 bp of transactions cost, holding the LTCX for a quarter reduced the monthly turnover to 20% and the monthly cost to 30 bp.

Exemplary Embodiments relating to Long-term Credit Beta: Synthetic Credit Replication (Credit RBI® Swaps)

For clients looking for credit beta over sustained periods, the turnover of the LTCX is likely to be cost prohibitive. For clients needing a much longer-term (say, a year or more) credit beta, and are not sensitive to monthly tracking error, a Long Credit RBI basket swap is an effective alternative. To track the Long Credit Index, the RBI basket uses a combination of six par interest rate swaps to match the KRD profile of the Index and a blend of CDX 5 y and 10 y swaps to match the Index's Libor spread duration. See Replicating Bond Index Baskets (RBI®s): Performance, Risks and Alternative RBI Baskets, Barclays Capital, 7 Oct. 2009.

A client can enter into a Long Credit RBI swap to receive the total return on the RBI basket and pay Libor plus a spread. An advantage of a Long Credit RBI swap is that the underlying components of the RBI basket are very liquid instruments, enabling quick and efficient execution (either long or short). Also, given the low transactions cost of the underlying instruments, a Long Credit RBI basket swap can be executed at relatively low cost (i.e., at a modest spread over Libor). Finally, a Long Credit RBI swap allows investors to gain unfunded exposure to the Long Credit Index. Although exposure to the LTCX can be obtained via repo, many investors will obtain LTCX exposure only on a fully funded basis.

An issue for the Long Credit RBI is that using CDX to track credit spreads to swaps is susceptible to the particularly volatile CDX-cash basis. Over an exemplary three year period, the Long Credit RBI displayed very high excess return tracking errors. However, to the extent that the basis has tended to mean revert over time to a level close to zero, the RBI has shown good long-term tracking potential. In addition, while the Long Credit RBI is susceptible to the volatility of the CDX-cash basis, it avoids the idiosyncratic risk of name selection inherent with any small cash proxy.

FIG. 91 shows excess returns (to US Treasuries) for the Credit Index and Credit RBI. From February 2007 to April 2010, the mean excess return for the Credit RBI was 6.7 bp, with a standard deviation of 237 bp, compared with 2.3 bp, and a standard deviation of 366.8 bp, for the Index. Over the period, the monthly TEV between the Credit RBI and Credit Index was 336 bp, more than six times that of the LTCX.

Unlike the LTCX, the Long Credit RBI also exhibited large deviations in excess returns to the Index. FIG. 92 presents the cumulative excess returns (to US Treasuries) for LTCX, Long Credit RBI, and Long Credit Index since February 2007 and shows that the excess return for the RBI did not track the excess returns of the Index. In fact, the RBI sometimes had positive excess returns when the Index had negative excess returns during the recent financial crisis, and vice versa when the credit market recovered.

While the correlation of monthly excess returns between the LTCX and Long Credit Index was 0.99 for the entire period, the correlation in excess returns between the RBI and Index was only 0.45. To see this another way, one may plot the monthly excess returns for the Long Credit RBI against those of the Long Credit Index and do the same for LTCX. As shown in FIG. 93, the excess returns for the LTCX-Index pair line up closely to the 45-degree line, whereas those for the RBI-Index pair do much less so.

Despite the tendency for high monthly tracking errors during volatile periods, if investors are insensitive to monthly volatility, and if they have a view that the movement in the CDXcash basis will always tend to revert (eventually), then the Credit RBI can be a productive source of long-term credit beta. For the RBI, there is data covering a longer period (April 2004 to April 2010). For this longer time, the tracking error of excess returns versus the Long Credit Index is almost 25% lower (246 bp) than the recent three-year period (336 bp). From April 2004 to January 2007, the excess return tracking error volatility for the Long Credit RBI was only 51 bp. This suggests that for periods with stable index excess returns, the Long Credit RBI does a good job tracking the Index. In this context, the advantage of the Credit RBI is its low cost, compared with a strategy of investing in the LTCX as a source of long-term credit beta.

Exemplary LTCX Construction: Stratified Sampling vs. Portfolio Optimization

In constructing an LTCX embodiment, one may employ a stratified sampling approach which provides the benefits of being easily replicable, transparent and simple. However, one also may use, for example, the Global Risk Model and Optimizer in POINT® to construct the LTCX and more efficiently minimize the expected TEV of the basket. To be sure, the LTCX construction methodology is broadly consistent with the Global Risk Model framework, as it looks to match the Index DTS for each sector rather than spread duration. But the Global Risk Model estimates TEV looking at 27 credit sectors (not nine), takes into account the correlation between credit sectors and looks at the idiosyncratic volatility and default probability of individual names. Thus, using the Risk Model and Optimizer would likely reduce the expected TEV of the LTCX, albeit without the transparency benefits of the stratified sampling approach. This section looks back to 30 Apr. 2010 and evaluates the Risk Model/Optimizer approach.

As of month-end, the Global Risk Model estimates 51.2 bp of monthly TEV for the LTCX (with futures overlay) versus the Long Credit Index. With no exposure to curve, credit/swap spreads (11.4 bp) and idiosyncratic/default risk (39.8 bp) are the sole contributors to risk (see FIG. 94).

In evaluating the Global Risk Model and Optimizer as a potential alternative for LTCX construction, one may perform two exercises. First, one may ask the Optimizer to minimize the total expected tracking error volatility of the basket (assuming a futures overlay) using the same 36 bonds that were in the LTCX as of 30 Apr. 2010. One may wish to impose on the problem only the 6% maximum ticker concentration. The resulting optimized portfolio would have an expected TEV of 43.0 bp, a reduction of 8.2 bp. From a structural perspective, the Optimizer takes advantage of the additional construction flexibility to go overweight/underweight particular sectors (e.g., banking: −2%; basic: −2%; electric: +3%; and industrials: +3.5%).

FIG. 95 shows an exemplary contribution to TEV by factor group. There was no reduction in idiosyncratic/default risk, as the Optimizer was not given latitude as to which bonds to select, only how to allocate their weights. However, the Optimizer was able to reduce the contribution of credit/swap spreads to TEV by 8.3 bp (to 3.1 bp from 11.4 bp).

While allowing the Optimizer to re-allocate the existing LTCX holdings produced a meaningful decrease in expected TEV, another way to realize the benefits of this more sophisticated alternative construction approach is to allow the Optimizer to start from scratch. Accordingly, one may perform a second exercise using the Optimizer to minimize expected tracking error (assuming a futures overlay to hedge curve exposure), while letting it choose any 36 bonds from the Long Credit Index. In addition to the 6% maximum ticker constraint, one may add an LCS constraint that requires the resulting portfolio to have an average LCS less than or equal to that of the LTCX on, say, 30 April (0.81).

FIG. 96 shows the TEV from this newly constructed basket and compares it with that of the LTCX and "Re-Allocated LTCX." Allowing more flexibility enables the Optimizer to construct a portfolio with just 33.0 bp of TEV, 36% less than that of the LTCX. In addition to being able to take even larger overweights/underweights to specific sectors (e.g., banking: +2.5%; basic: −4.5%; communications: +4%; energy: +8%; and non-cyclical: −8%), in this exercise the Optimizer is also able to choose names with lower idiosyncratic risk and default probability. However, while the Optimizer is able to effectively reduce the systematic risks of the portfolio to 3.8 bp from 11.4 bp (a reduction of 67%), the idiosyncratic/default contribution to risk is still 29.2 bp (a more modest reduction of 27%). This shows that while using the more sophisticated approach should allow for an improved ability to hedge systematic exposures, a 36-bond basket looking to track a 1,000-bond index will always have significant idiosyncratic risk that can be mitigated but not eliminated.

Overall, POINT's Global Risk Model and Optimizer could be used to more effectively reduce expected TEV in the LTCX construction process. However, the risk reduction and added sophistication comes at the cost of less simplicity and transparency.

Summary of Description of Exemplary Embodiments of LTCX

LTCX provides a transparent approach to track the US Long Credit Index with a small set of highly liquid cash bonds. Overall, performed quite well, even when using data from a tumultuous period. For data from the exemplary three year period, the LTCX proved to be a better tracking alternative than synthetic replication, with a lower mean tracking error and significantly lower tracking error volatility than the Long Credit RBI. Nevertheless, cash replication involves relatively high transactions cost, which may limit LTCX to investors seeking short-term tactical credit beta.

For clients needing intermediate term credit beta, a quarterly LTCX strategy has much lower transactions cost with good tracking. The properties of the quarterly LTCX make it useful as the basis for a liquid credit index and total return swaps.

For much longer-term credit exposure, of a year or longer, synthetic replication via a Long Credit RBI swap has done reasonably well with significantly lower transactions cost.

Exemplary Embodiments: Pan-European Liquidity Cost Scores

In one or more exemplary embodiments, a Pan-European LCS is based on one or more of the following data sources:

(1) Barclays Capital Trader Bid-Ask Data, obtained from daily emails. Each email has about 4,000 observations, so 20 days will contain 80,000+ observations. Each row of the file includes ISIN, bid price, ask price, bid volume, ask volume. Each ISIN is included only once per file. One may also use an alternate source of this data.

This bid-ask data is quoted and monitored by traders, and published on client quote systems such as Bloomberg. A trader is expected to honor these quotes in most situations. Traders signal their eagerness to transact at the quoted levels by the levels of the bid/ask volume.

(2) Xtrakter is a subsidiary of EuroClear which clears a large majority of Pan-European corporate bond trades. Xtrakter records the size of each trade (one side only) it clears and generates monthly trade volume.

One may download the data (http://dw.xtrakter.com) and save them in an appropriate folder, then copy the file into UNIX directory. Some minor changes may be required. ISIN header needs to be fixed. Some numbers have commas in them and may need to be reformatted. One may set volume=0 for all bonds with volume <8,000,000 over the month.

Data are ready on the 1st (or 2nd) day of the month. Only monthly data are available. No historical data are available, so the monthly file for each month should be downloaded.

(3) Index Data

One may load the PE HY, IG and FRN index data from POINT (month-end Stats Universe).

(4) Sector Classification file

The sector maps are included in Table 3. They are the same as those for the US-modified Class 3, into 6 sectors.

TABLE 3

Sector categories

| class3 | newclass3cat |
|---|---|
| BANKING | 1 |
| BROKERAGE | 1 |
| FINANCE_COMPANIES | 1 |
| FINANCIAL_OTHER | 1 |
| INSURANCE | 1 |
| REITS | 1 |
| GOVERNMENT_GUARANTEE | 2 |
| GOVERNMENT_SPONSORED | 2 |
| LOCAL_AUTHORITIES | 2 |
| OWNED_NO_GUARANTEE | 2 |
| SOVEREIGN | 2 |
| SUPRANATIONAL | 2 |
| ELECTRIC | 3 |
| ENERGY | 3 |
| NATURAL_GAS | 3 |
| UTILITY_OTHER | 3 |
| BASIC_INDUSTRY | 4 |
| CAPITAL_GOODS | 4 |
| INDUSTRIAL_OTHER | 4 |
| TRANSPORTATION | 4 |
| COMMUNICATIONS | 5 |
| TECHNOLOGY | 5 |
| CONSUMER_CYCLICAL | 6 |
| CONSUMER_NON_CYCLICAL | 6 |

(5) Subordination Classification File

Each bond is designated either senior or subordinate, according to Table 4. So, there are 12 sector-seniority combinations, each of which has its own sector dummy. Government-related AAA bonds are designated sector 13.

TABLE 4

Subordination categories

| subordin | Subcat |
|---|---|
| SRNOTES | 1 |
| COLLEAS | 1 |
| 1STMTG | 1 |
| 2NDMTG | 1 |
| NOTES | 1 |
| SENIOR | 1 |
| SRDEB | 1 |
| DEBNTRS | 1 |
| EETC | 1 |
| GENREF | 1 |
| SRSUBDB | 2 |
| SUBDEB | 2 |
| LT1 | 2 |
| LT2 | 2 |
| T1 | 2 |
| CCRDT | 2 |
| SUBORD | 2 |

(6) Historical LCS Output Files, to Determine Benchmark Status, Etc

A bond gets the full benefit of being a benchmark (discussed below) depending on how often it has been a benchmark in the previous 2 months. This information is extracted from data for the prior months.

All the above files may be merged into one file, by ISIN.

LCS Computation

Once this data is put together, an exemplary embodiment of the Pan-European LCS method begins by computing "Raw LCS" for the quoted bonds, and then adjusting this LCS on some bonds for which one thinks that the trader quotes are unrealistic (details below). One may then use the LCS of all quoted bonds (as the dependent variable) and their attributes (as the independent variables) in a cross-sectional regression to estimate LCS for the non-quoted bonds. These LCS values also may be adjusted post-estimation, as detailed below. Separate regressions may be run, based on the OAS level and the IG/HY flag of the bond.

Step 1

Raw LCS Computation.

Using the bid-ask data file, one may first computes an LCS for each observation (i.e., an observation level LCS) by computing the relative difference between the bid and the ask price. One may then average this for all the observations in the month, ISIN by ISIN.

$$RawLCS = Avg[(Ask\ price - Bid\ Price)/Bid\ Price]*100$$

These are the raw LCS scores. One should have raw LCS for about 65%-70% of the IG universe and about 50% of the HY universe.

For each quoted bond, one also may compute the standard deviation of its observation-level LCS, and delete those bonds from the dataset of quoted bonds with a standard deviation greater than 8 and estimate their LCS instead. This is to ensure that outliers/bad data (e.g., a erroneous quote on a given day) do not drive the model estimation.

If IG=1 (i.e., it is IG) and OAS<800 bps then flag the bond a "spread" bond, else a "price" bond. Estimate each of these categories of bonds separately.

To reduce the effect of outliers and a further data filter, delete bonds from the quoted universe based on the following criteria:

if Raw LCS<0.1; OR
if Raw LCS>8.0 and the bond is "spread"; OR if Raw LCS>20.0 and the bond is "price";

Step 2

Quoted LCS Adjustments/Benchmark. As with US LCS, one may not always take the trader's bid-ask spread at face value. One needs to distinguish between those bonds where one believes trader bid-offer quotes to be an accurate reflection of the market ("benchmark bonds"), and those trader quotes that one believes are only indicative information and need to be adjusted to better reflect the market. Exemplary rules are provided below.

Benchmark Bond Determination:

Begin by placing bonds in one of, say, five redemption categories. Define redemption category (redcat) of the bond as if yrstored>1.5 and yrstored<2.5 then redcat=2;
else if yrstored>4 and yrstored<6 then redcat=5;
else if yrstored>8 and yrstored<12 then redcat=10;
else if yrstored>27 and yrstored<33 then redcat=30;
else redcat=0;

where yrstored=years to redemption.

A bond may be designated a "true benchmark" (i.e. truebm=0) if either:

1. The bond has on-the-run (minimum age within ticker and redemption category (except redcat=0)) status;
AND
The ticker is popular (i.e. has at least 6 bonds);

AND

ISIN has at least 15 million volume (as per xtrakter);

AND

ISIN has at least 0.5 billion size (amt out) for IG (0.3 billion for HY);

OR

2. Trading volume of bond (from xtrakter)>90 million;

OR

3. BCS trader bid quote size>1,000 and ask quote size>1,000.

benchmark=this month's truebm*0.5+last month's truebm*0.3+2 months ago truebm*0.2

The benchmark value is a weighted average of the true benchmark status in the most recent 3 months, with decreasing weights for older months.

Else, benchmark=1 (i.e., no benchmark status).

For the first two months, the benchmark number is only based on the current benchmark value.

If bond is truebm=0 today, then Final LCS=Raw LCS.

If bond is truebm=1, the Final LCS=Raw LCS*(1+(Adj Fact–1)*benchmark).

One may use a modified benchmark (benchmarkhat) definition to compute interactions with the age variable. This reflects the fact that while older bonds are generally less liquid, this is not true for bonds that had long maturities when they were issued and placed in pension fund/insurance company portfolios, but are now of shorter maturities (but much older). This short maturity causes these long-term investors to sell these bonds, causing a flurry of liquidity even though the bonds are old.

A bond is designated a "modified benchmark" (i.e. truebmhat=0) if either:

1. The bond has on-the-run (minimum age within ticker and redemption category (except redcat=0)) status

AND

The ticker is popular (i.e. has issued at least 6 bonds);

AND

ISIN has at least 15 million volume (as per Xtrakter);

AND

ISIN has at least 0.5 billion size for IG (0.3 billion for HY)

OR

2. Original Maturity>7 years and years to redemption<3 years;

OR

3. If BCS trader bid quote size>1000 and ask quote size>1000.

benchmarkhat=this month's truebmhat*0.5+last month's truebmhat*0.3+2 months ago truebmhat*0.2

The benchmarkhat value is a weighted average of the true modified benchmark status in the most recent 3 months, with decreasing weights for older months.

Step 3

Estimating an LCS for bonds that have no trader quote data.

Using this quoted universe, regress LCS (adjusted as above) on variables such as DTS, benchmark, sectordummy, benchmarkintseci, non-linear price term, amt outstanding, ageintbench, volume, and volume dummy:

Non-linear price term=(100–P)^2, where P is bond price.

Ageintbench=age*modifiedbenchmarkdummy(1 if non-modified benchmark).

DTS=OASD*OAS_to_worst.

Volume=Monthly xtrakter Volume, ignoring buy/sell.

Volumedummy=0 if volume=0, else volumedummy=1.

benchmarkdum=a dummy variable that is 1 if non-benchmark, as defined above.

sectordumi=a variable that takes the value 1 if the bond belongs to sector i. Sector is defined as the intersection of the newclasscat and the subcat variables tabulated earlier—there are 13 sectors—6 newclasscat segments and 2 subcat segments+AAA gov-related.

benchmarkintseci=benchmarkdum*sectordumi, i=1 . . . 13.

Estimate one regression (the "spread" regression) if IG=1 and OAS<800 bps, and another regression (price regression) for HY (i.e. IG=0) and OAS>800 bps bonds. The specifications are the same.

Step 4

As described above, the regression coefficients may be estimated using quoted bonds. Using these coefficients to estimate LCS for non-quoted bonds may cause a bias towards better liquidity, since liquidity is correlated with whether a bond is quoted by the trader. So, one may wish to adjust the LCS of estimated bonds. One may do this by considering the number of months in which a bond has been quoted in each of the past six months. If the bond has been quoted for each of these months, then the regression value is not adjusted; if it has never been quoted, the full adjustment factor (explained above) is applied. An exponential function determines the size of the adjustment if it has been quoted for a few of the past six months. For the first six months of the exemplary analysis, one does not adjust the regression-based LCS values (i.e. one assumes that they were all quoted in the last 6 months). One may treat bonds issued less than 6 months ago the same way.

There are some optional further specific enhancements to LCS:

when the price is <15 and coupon rate>1%, double the computed LCS;

the estimated LCS has a floor equal to the average of the 5th and the 10th percentile in the sector.

Exemplary Embodiments: Trade Efficiency Score (TES)

In certain exemplary embodiments, LCS uses trader bid-ask data to come up with a measure of round-trip transaction costs at the bond level for the US and Pan-European Investment Grade and High Yield Credit Indices' constituents. LCS may be based on the assumption of a trade size of USD3-5 mm.

However, many bonds in the universe rarely trade. A bond with low trading volume generally has a higher LCS to reflect a higher cost of executing a regular trade. LCS may not adequately reflect the ease of implementing large or numerous trades. Investors and trading desks have shown interest in applying LCS to pinpoint such issues.

In such cases, one may use a Trade Efficiency Score (TES), which considers a bond's LCS and monthly trading volume relative to the overall distributions to come up with a score from 1-10, 1 being the most liquid. Since the TES is a rank, unlike the LCS, a bond's TES is unlikely to move very much over time with general liquidity conditions in the market, as long as the bond holds its relative position. This makes it easier for portfolio managers to decide whether to transact in a certain bond, and for trading desks to gauge how easily they can close out their positions in a certain bond.

Each bond in the universe is first assigned to a LCS quintile and a volume decile, based on the relative position of the bond's respective attributes. These numbers are then added, and the sum (which can range from 2-15) is then mapped to a TES score from 1-10, using Table 5 below.

TABLE 5

| Sum of Volume Decile and LCS Quintile |
|---|
| 2 |
| 3 |

TABLE 5-continued

Sum of Volume Decile and LCS Quintile 4
5
6
7
8
9
10
11
12
13
14
15

Other applications of LCS comprise:
(1) Margin setting;
(2) Internal Crossing Systems: measure value added of an internal crossing network;
(3) Risk management: monitor liquidity levels, provide liquidity budgets to managers; liquidity-enhanced VaR;
(4) Transition management: estimate transaction costs due to portfolio restructuring; and
(5) Investor reporting: indicate liquidity levels of portfolios (relative to benchmark).

For ease of exposition, not every step or element of the present invention is described herein as part of a computer system using software, but those skilled in the art will recognize that each step or element may have a corresponding computer system and/or software component. Such computer system and/or software components are therefore enabled by describing their corresponding steps or elements (that is, their functionality), and are within the scope of the present invention.

Exemplary embodiments comprise computer components and computer-implemented steps that will be apparent to those skilled in the art. For example, calculations and communications can be performed electronically, and results can be displayed using a graphical user interface.

An exemplary such system is depicted in FIG. 97. Computers 9700 communicate via network 9710 with a server 9730. A plurality of sources of data 9720-9721 relating to, for example, bond information, also communicate via network 9710 with a server 9730, processor 9750, and/or other components operable to calculate and/or transmit, for example, LCS information. The server 9730 may be coupled to one or more storage devices 9740, one or more processors 9750, and software 9760.

Other components and combinations of components may also be used to support processing data or other calculations described herein as will be evident to one of skill in the art. Server 9730 may facilitate communication of data from a storage device 9740 to and from processor(s) 9750, and communications to computers 9700. Processor 9750 may optionally include or communicate with local or networked storage (not shown) which may be used to store temporary or other information. Software 9760 can be installed locally at a computer 9700, processor 9750 and/or centrally supported for facilitating calculations and applications.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described in detail herein for brevity. Moreover, it will be appreciated by those of ordinary skill in the art that unless otherwise indicated, the particular sequence of steps described is illustrative only and can generally be varied without departing from the scope of the invention. Unless otherwise stated, the method steps described and claimed herein are unordered—that is, the steps can be performed in any reasonable order.

All steps described herein will be understood by those skilled in the art as being capable of implementation by software running on corresponding hardware components. Moreover, such software will be understood by those skilled in the art to be storable on a non-transitory computer readable medium and implementable by one or more computer processors.

While this invention has been described in conjunction with the exemplary embodiments outlined herein, many alternatives, modifications and variations will be apparent to those skilled in the art. Accordingly, the exemplary embodiments of the invention, as set forth herein, are intended to be illustrative, not limiting. Various changes may be made without departing from the spirit and scope of the invention.

We claim:

1. A computer system comprising:
a non-transitory computer readable memory that stores price information for a plurality of bonds; and
a processor unit in communication with said non-transitory computer readable memory that calculates a liquidity cost score for one or more of said plurality of bonds;
wherein said liquidity cost score calculation is based on data regarding quoted bid price and quoted ask price if a bond is a quoted bond,
wherein said liquidity cost score calculation is based on a regression analysis if a bond is a non-quoted bond,
wherein, if a quoted bond is a spread-quoted benchmark bond, said liquidity cost score calculation is further based on option adjusted spread duration data and said liquidity cost score (LCS) is based on a formula equivalent to $$LCS = (\text{Ask spread} - \text{Bid spread}) * \text{OAspread duration},$$

where OAspread duration is option adjusted spread duration, and
wherein said processor unit comprises one or more processors.

2. A computer system as in claim 1, wherein said liquidity cost score calculation is based on data regarding quoted bid price and quoted ask price and further based on an adjustment factor if a bond is a quoted, non-benchmark bond.

3. A computer system as in claim 1, wherein if a quoted bond is a price-quoted benchmark bond, said liquidity cost score (LCS) is based on a formula equivalent to $$LCS = \frac{\text{Ask price} - \text{Bid price}}{\text{Bid price}}.$$

4. A computer system as in claim 1, wherein said liquidity cost score calculation is further based on an adjustment factor selected to convert a bid-ask indicative spread to a bid-ask market spread, if a quoted bond is not a benchmark bond.

5. A computer system as in claim 1, wherein, for non-quoted bonds, said liquidity cost score is calculated using a regression analysis that relates liquidity cost scores for quoted bonds to select bond characteristics.

6. A computer system as in claim 5, wherein said select bond characteristics comprise one or more of: trading volume; and amount outstanding.

7. A computer system as in claim 5, wherein said select bond characteristics comprise one or more of: option adjusted spread; benchmark status; and sector.

8. A computer system as in claim 5, wherein calculation of said liquidity score for said non-quoted bonds further comprises multiplication of a regression estimated LCS value by a non-quoted adjustment factor.

9. A computer system as in claim 5, wherein said regression analysis is tested using out-of-sample testing.

10. A computer system as in claim 9, wherein said out-of-sample testing comprises calculating non-quoted liquidity cost scores for quoted bonds and then comparing said non-quoted liquidity cost scores to liquidity cost scores based on quoted data for said quoted bonds.

11. A computer system as in claim 9, wherein said out-of-sample testing comprises calculating non-quoted liquidity cost scores for bonds in months in which when said bonds are non-quoted and then comparing said non-quoted liquidity cost scores to liquidity cost scores based on quoted data for months in which said bonds are quoted.

12. A computer system as in claim 9, wherein said out-of-sample testing comprises comparing non-quoted liquidity cost scores for non-quoted bonds to subjective liquidity rankings provided by traders.

13. A computer system as in claim 1, wherein benchmark bonds comprise bonds having a trading volume above a specified threshold.

14. A non-transitory computer readable memory storing software operable to direct one or more processors to perform steps comprising:
   storing price information for a plurality of bonds; and
   calculating a liquidity cost score for one or more of said plurality of bonds;
   wherein said liquidity cost score calculation is based on data regarding quoted bid price and quoted ask price if a bond is a quoted bond,
   wherein said liquidity cost score calculation is based on a regression analysis if a bond is a non-quoted bond, and
   wherein, if a quoted bond is a spread-quoted benchmark bond, said liquidity cost score calculation is further based on option adjusted spread duration data and said liquidity cost score (LCS) is based on a formula equivalent to LCS=(Ask spread−Bid spread)*OAspread duration, where OAspread duration is option adjusted spread duration.

* * * * *